United States Patent
Fan et al.

(10) Patent No.: US 8,501,105 B2
(45) Date of Patent: Aug. 6, 2013

(54) SEPARATION OF CARBON DIOXIDE ($CO_2$) FROM GAS MIXTURES BY CALCIUM BASED REACTION SEPARATION ($CARS-CO_2$) PROCESS

(75) Inventors: Liang-Shih Fan, Columbus, OH (US); Himanshu Gupta, Lorton, VA (US); Mahesh V. Iyer, Houston, TX (US)

(73) Assignee: The Ohio State University, Columbus, OH (US)

( * ) Notice: Subject to any disclaimer, the term of this patent is extended or adjusted under 35 U.S.C. 154(b) by 0 days.

(21) Appl. No.: 13/555,054

(22) Filed: Jul. 20, 2012

(65) Prior Publication Data
US 2013/0078159 A1 Mar. 28, 2013

Related U.S. Application Data

(60) Division of application No. 11/994,316, filed as application No. PCT/US2006/025266 on Jun. 28, 2006, now Pat. No. 8,226,917, which is a continuation of application No. 11/255,099, filed on Oct. 20, 2005, now Pat. No. 7,618,606, which is a continuation-in-part of application No. 10/359,763, filed on Feb. 6, 2003, now Pat. No. 7,067,456.

(60) Provisional application No. 60/694,594, filed on Jun. 28, 2005.

(51) Int. Cl.
*B01D 50/00* (2006.01)

(52) U.S. Cl.
USPC .......................................... 422/177; 422/168

(58) Field of Classification Search
USPC .................................................. 422/177, 168
See application file for complete search history.

(56) References Cited

U.S. PATENT DOCUMENTS
8,226,917 B2 * 7/2012 Fan et al. ................. 423/244.03

* cited by examiner

*Primary Examiner* — Edward Johnson
(74) *Attorney, Agent, or Firm* — Standley Law Group LLP

(57) ABSTRACT

A reaction-based process developed for the selective removal of $CO2$ from a multicomponent gas mixture to provide a gaseous stream depleted in $CO2$ compared to the inlet $CO2$ concentration. The proposed process effects the separation of $CO2$ from a mixture of gases by its reaction with metal oxides. The Calcium based Reaction Separation for $CO2$ ($CaRS-CO2$) process consists of contacting $CO2$ laden gas with $CaO$ in a reactor such that $CaO$ captures $CO2$ by the formation of $CaCO3$. $CaCO3$ is regenerated by calcination leading to the formation of fresh $CaO$ sorbent and the evolution of a concentrated stream of $CO2$. The "regenerated" $CaO$ is then recycled for the further capture of $CO2$. This carbonation-calcination cycle forms the basis of the $CaRS-CO2$ process. This process also may use a mesoporous $CaCO3$ structure that attains >90% conversion over multiple carbonation and calcination cycles.

12 Claims, 59 Drawing Sheets

Flow sheet depicting the integration of the current process in the overall coal-gasifier electric production facility.

Effect of reaction temperature on the ratio of carbonation to sulfation for increasing residence time (10% $CO_2$, 3000 ppm $SO_2$)

Effect of reaction temperature on the extent of carbonation of PCC-CaO for increasing residence time (10% CO2, 3000 ppm $SO_2$)

Effect of Temperature on LC calcination rate [Sample size: 500mg; T: 700-750°C; $P_{vac}$: 25" Hg; $F_{SG(N2)}$= 50ml/min]

SEPARATION OF CARBON DIOXIDE ($CO_2$) FROM GAS MIXTURES BY CALCIUM BASED REACTION SEPARATION (CARS-$CO_2$) PROCESS

CROSS-REFERENCE TO RELATED APPLICATIONS

This application is a divisional of U.S. patent application Ser. No. 11/994,316 filed Apr. 14, 2008 and now U.S. Pat. No. 8,226,917, which is a 371 national stage filing of PCT/US2006/025266 filed Jun. 28, 2006. International Patent Application No. PCT/US2006/025266 filed Jun. 28, 2006 is a continuation of U.S. patent application Ser. No. 11/255,099 filed Oct. 20, 2005 and now U.S. Pat. No. 7,618,606, which is a continuation-in-part of U.S. patent application Ser. No. 10/359,763 filed Feb. 6, 2003 now U.S. Pat. No. 7,067,456. International Patent Application No. PCT/US2006/025266 filed Jun. 28, 2006 also claims benefit of U.S. Patent Application No. 60/694,594 filed Jun. 28, 2005. All aforementioned applications are hereby incorporated herein by reference.

TECHNICAL FIELD OF THE INVENTION

The present invention relates to the application of chemical sorbents for the separation of $CO_2$ from gas mixtures.

BACKGROUND OF THE INVENTION

As used herein, the term "supersorbent" shall mean a sorbent as taught in U.S. Pat. No. 5,779,464 entitled "Calcium Carbonate Sorbent and Methods of Making and Using Same", the teachings of which are hereby incorporated by reference.

As used herein, the term "microporous" shall mean a pore size distribution of less than 5 nanometers. As used herein, the term "mesoporous" shall mean a pore size distribution of from about 5 nanometers to about 20 nanometers.

Atmospheric $CO_2$ concentration has been increasing steadily since the industrial revolution. It has been widely accepted that the while the $CO_2$ concentration was about 280 ppm before the industrial revolution, it has increased from 315 ppmv in 1959 to 370 ppmv in 2001 [Keeling, C. D. and T. P. Whorf. 2002. Atmospheric $CO_2$ records from sites in the SIO air sampling network. In Trends: A Compendium of Data on Global Change. Carbon Dioxide Information Analysis Center, Oak Ridge National Laboratory, U.S. Department of Energy, Oak Ridge, Tenn., U.S.A. This data is also available from http://cdiac.esd.ornl.gov/ftp/maunaloa-co2/maunaloa.co2]. Rising $CO_2$ concentrations has been reported to account for half of the greenhouse effect that causes global warming [IPCC Working Group I. IPCC Climate Change 1995—The Science of Climate Change: The Second Assessment Report of the Intergovernmental Panel on Climate Change; Houghton, J. T., Meira Filho, L. G., Callander, B. A., Harris, N., Kattenberg, A., Maskell K, Eds.; Cambridge University Press: Cambridge, U.K., 1996]. Although the anthropogenic $CO_2$ emissions are small compared to the amount of $CO_2$ exchanged in the natural cycles, the discrepancy between the long life of $CO_2$ in the atmosphere (50-200 years) and the slow rate of natural $CO_2$ sequestration processes leads to $CO_2$ build up in the atmosphere. The IPCC (Intergovernmental Panel on Climate Change) opines that "the balance of evidence suggests a discernible human influence on the global climate." Therefore, it is necessary to develop cost effective $CO_2$ management schemes to curb its emission.

Many of the envisaged $CO_2$ management schemes consist of three parts—separation, transportation and sequestration of $CO_2$ [FETC Carbon Sequestration R&D Program Plan: FY 1999-2000. National Energy Technology Laboratory, Department of Energy, Washington, D.C., 1999]. The cost of separation and compression of $CO_2$ to 110 bar (for transportation of $CO_2$ in liquid state) is estimated at $30-50 per ton $CO_2$, and transportation and sequestration would cost about $1-3 per ton per 100 km and $1-3 per ton of $CO_2$, respectively [Wallace, D. Capture and Storage of $CO_2$. What Needs To Be Done. Presented at the 6th Conference of the Parties, COP 6, to the United Nations Framework Convention on Climate Change; The Hague, The Netherlands, Nov. 13-24, 2000; www.iea.org/envissu/index.htm]. The capture of $CO_2$ imposes severe energy penalties thereby reducing the net electricity output by as much as 13-37% [Herzog, H.; Drake, E.; Adams, E. $CO_2$ Capture, Reuse, and Storage Technologies for Mitigating Global Climate Change. A White Paper; Final Report No. DE-AF22-96PC01257, January 1997]. The dominating costs associated with the current $CO_2$ separation technologies necessitate development of economical alternatives.

Historically, $CO_2$ separation was motivated by enhanced oil recovery [Kaplan, L. J. Cost-Saving Processes Recovers $CO_2$ from Power-Plant Flue gas. Chem. Eng. 1982, 89 (24), 30-31; Pauley, C. P.; Smiskey, P. L.; Haigh, S. N-ReN Recovers $CO_2$ from Flue Gas Economically. Oil Gas J. 1984, 82(20), 87-92]. Currently, industrial processes such as limestone calcination, synthesis of ammonia and hydrogen production require $CO_2$ separation. Absorption processes employ physical and chemical solvents such as Selexol and Rectisol, MEA and KS-2 [Reimer, P.; Audus, H.; Smith, A. Carbon Dioxide Capture from Power Stations. IEA Greenhouse R&D Programme, www.ieagreen.org.uk, 2001. ISBN 1 898373 15 9; Blauwhoff, P. M. M.; Versteeg, G. F.; van Swaaij, W. P. M. A study on the reaction between $CO_2$ and alkanoamines in aqueous solution. Chem. Eng. Sci. 1984, 39(2), 207-225. Mimura, T.; Simayoshi, H.; Suda, T.; Iijima, M.; Mitsuake, S. Development of Energy Saving Technology for Flue Gas Carbon Dioxide Recovery by Chemical Absorption Method and Steam System in Power Plant. *Energy Convers. Mgmt.* 1997, 38, *Suppl. P.* S57-S62]. Adsorption systems capture $CO_2$ on a bed of adsorbent materials such as molecular sieves and activated carbon [Kikkinides, E. S.; Yang, R. T.; Cho, S. H. Concentration and Recovery of $CO_2$ from flue gas by pressure swing adsorption. *Ind. Eng. Chem. Res.* 1993, 32, 2714-2720]. $CO_2$ can also be separated from the other gases by condensing it out at cryogenic temperatures. Polymers, metals such as palladium, and molecular sieves are being evaluated for membrane based separation processes [Reimer, P.; Audus, H.; Smith, A. Carbon Dioxide Capture from Power Stations. IEA Greenhouse R&D Programme, www.ieagreen.org.uk, 2001. ISBN 1 898373 15 9].

Reaction based processes, as promulgated in this work, can be applied to separate $CO_2$ from gas mixtures. This process is based on a heterogeneous gas-solid non-catalytic carbonation reaction where gaseous $CO_2$ reacts with solid metal oxide (represented by MO) to yield the metal carbonate ($MCO_3$). The reaction can be represented by:

$$MO + CO_2 \rightarrow MCO_3 \qquad (1)$$

Once the metal oxide has reached its ultimate conversion, it can be thermally regenerated to the metal oxide and $CO_2$ by the calcination of the metal carbonate product. The calcination reaction can be represented by:

$$MCO_3 \rightarrow MO + CO_2 \qquad (2)$$

As an example of the above-mentioned scheme, FIG. 1 shows the variation in the free energy of the carbonation reaction as a function of temperature for calcium oxide. From the figure, we can see that the carbonation reaction is thermodynamically favored with a decrease in temperature (Gibbs free energy declines with a decrease in temperature). However, at lower temperatures, the carbonation reaction is kinetically slow. In fact, it takes geological time scales for the formation of $CaCO_3$ by the reaction between CaO and atmospheric $CO_2$ (at 280-360 ppm) at ambient temperatures. It should also be noted that the carbonation reaction would be favored as long as the free energy is negative. This creates an upper bound of 890° C. for carbonation to occur under a $CO_2$ partial pressure of 1 atm. The equilibrium temperature for this reaction is a function of the partial pressure of $CO_2$. A reaction based $CO_2$ separation process offers many advantages. Under ideal conditions, MEA captures 60 g $CO_2$/kg, silica gel adsorbs 13.2 g $CO_2$/kg and activated carbon adsorbs 88 g $CO_2$/kg. The sorption capacity of some metal oxides (such as the modified CaO, presented in this study) is about 700 g $CO_2$/kg of CaO. This is about an order of magnitude higher than the capacity of adsorbents/solvents used in other $CO_2$ separation processes and would significantly reduce the size of the reactors and the material handling associated with $CO_2$ separation.

Numerous metal oxides exhibit the carbonation and calcination reaction. The calcination temperature of a few metal carbonates ($CaCO_3$ ~750° C., $MgCO_3$ ~385° C., $ZnCO_3$ ~340° C., $PbCO_3$ ~350° C., $CuCO_3$ ~225-290° C. and $MnCO_3$ ~440° C.) makes them viable candidates for this process. Apart from CaO, gas-solid carbonation of other metal oxides has not been widely studied. The carbonation of ZnO to $ZnCO_3$ at 8-13° C. was low when exposed to $CO_2$ and $H_2O$ for over 100 days (Sawada, Y.; Murakami, M.; Nishide, T. Thermal analysis of basic zinc carbonate. Part 1. Carbonation process of zinc oxide powders at 8 and 13° C. *Thermochim. Acta.* 1996, 273, 95-102.). $MnCO_3$ undergoes a more complex thermal degradation phenomena. $MnCO_3$ first decomposes to $MnO_2$ at 300° C., which in turn changes to $Mn_2O_3$ at 440° C. At higher temperatures (~900° C.), the final thermal decomposition product was identified as $Mn_3O_4$ (Shaheen, W. M.; Selim, M. M. Effect of thermal treatment on physicochemical properties of pure and mixed manganese carbonate and basic copper carbonate. *Thermochim. Acta.* 1998, 322(2), 117-128.). Different oxides of manganese provide the flexibility of exploiting the carbonation/calcination reaction over a wider temperature range. Aqueous phase MgO carbonation has been studied for its suitability for mineral-based $CO_2$ sequestration (Fernandez, A. I.; Chimenos, J. M.; Segarra, M.; Fernandez, M. A.; Espiell, F. Kinetic study of carbonation of MgO slurries. *Hydrometallurgy.* 1999, 53, 155-167). The carbonation extent of $Mg(OH)_2$ was about 10% between 387-400° C. and 6% formation between 475-500° C. (Butt, D. P.; Lackner, K. S.; Wendt, C. H.; Conzone, S. D.; Kung, H.; Lu, Y.-C.; Bremser, J. K. Kinetics of Thermal Dehydroxylation and Carbonation of Magnesium Hydroxide. *J. Am. Ceram. Soc.* 1996, 79(7), 1892-1898). They attributed the low conversions to the formation of a non-porous carbonate product layer. This layer hinders the inward diffusion of $CO_2$ and the outward diffusion of $H_2O$ (a product of the carbonation reaction) leading to low conversions. The carbonation of PbO was studied as a part of the chemical heat pump process (Kato, Y.; Saku, D.; Harada, N.; Yoshizawa, Y. Utilization of High Temperature Heat from Nuclear Reactor using Inorganic Chemical Heat Pump. *Progress in Nuclear Energy.* 1998, 32(3-4), 563-570. & Kato, Y.; Harada, N.; Yoshizawa, Y. Kinetic feasibility of a chemical heat pump for heat utilization from high temperature processes. *Applied Thermal Engineering.* 1999, 19, 239-254). They reported 30% conversion in an hour under 100% $CO_2$ atmosphere at 300° C. Furthermore, they found the reactivity of PbO to drop with the number of carbonation-calcination cycles.

Carbonation of calcium oxide has been widely studied. Related applications of the CaO carbonation and calcination include the storage of energy (Barker, R. The Reversibility of the Reaction $CaCO_3=CaO+CO_2$. *J. Appl. Chem. Biotechnol.* 1973, 23, 733-742) and the zero emission coal alliance process, consisting of hydrogasification of coal fueled by the heat of the carbonation reaction (Tinkler, M. J.; Cheh, C. Towards a Coal-capable Solid Oxide Fuel Cell System. *Proceedings of the 26$^{th}$ International Technical Conference on Coal Utilization and Fuel Systems;* Clearwater, Fla., Mar. 5-8, 2001; pp 569-570). The gas-solid CaO—$CO_2$ reaction proceeds through two rate-controlling regimes. The first regime involves a rapid, heterogeneous chemical reaction. In the second regime, the reaction slows down due to the formation of an impervious layer of $CaCO_3$. This product layer prevents the exposure of unreacted CaO in the particle core to $CO_2$ for further carbonation. The kinetics of the second regime is governed by the diffusion of ions through the $CaCO_3$ product layer. The activation energy was estimated to be 21 kcal/mol below 688 K and 43 kcal/mol above it for the product layer diffusion, based on the counter migration of $CO_3^{2-}$ and $O^{2-}$ ions through the product layer (Bhatia, S. K.; and Perlmutter, D. D. Effect of the product layer on the kinetics of the $CO_2$-Lime Reaction. *AIChE J.* 1983, 29(1), 79-86).

The extent of the carbonation reaction reported in many studies has also shown considerable variation. Stoichiometrically, 56 g of CaO should react with 44 g of $CO_2$ to form 100 g of $CaCO_3$. This translates to about 78.6-wt % capacity for CaO. However, the structural limitations prevent the attainment of theoretical conversion. The extent of carbonation was only 23-wt % in 30 minutes at 600° C. (Dedman, A. J.; Owen, A. J. Calcium Cyanamide Synthesis, Part 4.—The reaction $CaO+CO_2=CaCO_3$. *Trans. Faraday Soc.* 1962, 58, 2027-2035). A higher surface area CaO sorbent provided 55-wt % $CO_2$ sorption (Bhatia, S. K.; and Perlmutter, D. D. Effect of the product layer on the kinetics of the $CO_2$-Lime Reaction. *AIChE J.* 1983, 29(1), 79-86). 64-wt % $CO_2$ sorption was achieved at 1050° C. temperature and 11.74 atm $CO_2$ pressure in 32 hours (Mess, D.; Sarofim, A. F.; Longwell, J. P. Product Layer Diffusion during the Reaction of Calcium Oxide with Carbon Dioxide. *Energy and Fuels.* 1999, 13, 999-1005). However, the extent of carbonation at lower temperature/pressure conditions that are more characteristic of $CO_2$ containing gaseous mixtures is absent in their work. The limitation in total conversion stems essentially from the nature of the initial pore size distribution of the CaO sorbent. Microporous sorbents (pore size <2 nm) are very susceptible to pore blockage and plugging due to the formation of higher molar volume product (molar volume of CaO: 17 $cm^3$/mol; molar volume of $CaCO_3$: 37 $cm^3$/mol). CaO sorbents obtained from naturally occurring precursors are usually microporous in nature. At the end of the kinetically controlled regime, diffusion processes through the product layer control the reaction rate. Similar structural limitations have prevented calcium-based sorbents from attaining theoretical conversion for the sulfation reaction between CaO and sulfur dioxide ($SO_2$) as well (Wei, S.-H.; Mahuli, S. K.; Agnihotri, R.; Fan, L.-S. High Surface Area Calcium Carbonate: Pore Structural Properties and Sulfation Characteristics. *Ind. Eng. Chem. Res.* 1997, 36(6), 2141-2148). They suggested that a mesoporous structure, which maximizes porosity in the 5-20 nm pore size range, would be less susceptible to pore pluggage. This structure would also be able to provide sufficient surface area to ensure rapid kinetics. Their modified precipitation technique resulted in a mesoporous $CaCO_3$ structure that also had a high BET surface area determined by nitrogen (60 m$^2$/g). A similar approach could also enhance the reactivity of CaO sorbents towards the carbonation reaction, which is the focus of this study.

Lastly, it is important that the CaO sorbents maintain their reactivity over many carbonation and calcination cycles. The conversion of CaO dropped from about 73% in the first carbonation cycle to 43% at the end of the 5$^{th}$ cycle at 866° C. (Barker, R. The Reversibility of the Reaction $CaCO_3$=CaO+ $CO_2$. *J. Appl. Chem. Biotechnol.* 1973, 23, 733-742 & Barker, R. The Reactivity of Calcium Oxide Towards Carbon Dioxide and its use for Energy Storage. *J. Appl. Chem. Biotechnol.* 1974, 24, 221-227). Barker suggested that the $CaCO_3$ layer is about 22 nm thick and his latter work showed repeated 93% conversion over 30 cycles at 629° C. on 10 nm CaO particles. In another study, cyclical studies conducted at a carbonation temperature of 880° C. and calcination at 860° C. led to a drop in conversion from 70% in the first carbonation to 38% in the 7$^{th}$ carbonation step (Kato, Y.; Harada, N.; Yoshizawa, Y. Kinetic feasibility of a chemical heat pump for heat utilization from high temperature processes. *Applied Thermal Engineering.* 1999, 19, 239-254). The process described here leads to >95% conversion due to the application of novel mesoporous CaO sorbents for $CO_2$ capture and maintains their reactivity over repeated cycles of carbonation and calcination.

Part I (CO2/SO2 Combined Reaction Optimization)

Introduction

Carbon dioxide (CO2) accounts for more than half of the enhanced greenhouse effect, which is responsible for global warming. 'The atmospheric concentration of CO2 has increased from 280 ppm before the Industrial Revolution to ~365 ppm today. 2'[2,3] This is mainly due to the unabated emission of CO2 as a result of increasing consumption of fossil fuels such as coal, oil and natural gas. Point sources, such as electric utility plants that contribute to about one-third of all anthropogenic CO2 emissions[4], are ideal candidates for implementing CO2 reduction practices due to the relatively high concentration and quantity of CO2 emitted compared to smaller, mobile sources. Coal consumption leads to high CO2 emissions at these large point sources due to its dominant use in electricity generation (~52%) and higher energy specific CO2 emission due to its high carbon to hydrogen content compared to other fossil fuels (g CO2BTU).[5] Comprehensive CO2 management scenarios involve a three-step process that includes separation, transportation and safe sequestration of CO2. Economic analysis has, shown that CO2 separation accounts for 75-85% of the overall cost associated with carbon sequestration.[6] Current CO2 separation technologies based on absorption, adsorption, membrane separation, and cryogenic separation necessitate a low temperature and/or high pressure of flue gas to enhance the CO2 sorption capacity of the sorbent/solvent or the diffusion flux of CO2 through the membrane. However, flue gas is typically characterized by sub-atmospheric pressure and high temperature. Metal oxides are capable of reacting with CO2 under existing flue gas conditions, thereby reducing downstream process modifications. We have detailed elsewhere the advantages of a high temperature reactive separation process based on the carbonation and calcination reactions (CCR) of CaO to separate CO2 from flue gas.[7] The key advantage offered by this process is the enhanced C02 sorption capacity (35-70 weight %) exhibited by the high reactivity CaO particles under existing flue gas conditions over multiple cycles of CCRs.

Extensive screening of metal oxides has identified CaO as a potential candidate for the CCR scheme.[7] The carbonation reaction of CaO has been studied for its role in chemical heat pumps[8,9], energy storage systems[10], zero emission coal alliance processes", and in the enhanced production of hydrogen from fossil$^{fuels.}$ 'This reaction typically goes through a raid kinetic controlled regime, followed by a slower product-layer diffusion controlled regime.' Naturally occurring precursors (limestone and dolomite), are unable to achieve stoichiometric conversion in any carbonation step due to the predominant microporous structure which is susceptible to pore pluggage and pore mouth closure. In contrast, mesoporosity, which dominates the pore structure of precipitated calcium carbonate (PCC), synthesized under the influence of negatively charged polyacrylate ions yields greater than 90% carbonation conversion.[7,4]

For the viability of a CCR process, it is imperative that the CaO sorbent maintain high reactivity over multiple cycles. Previous studies in the literature have reported the performance of numerous CaO sorbents over multiple cycles. Abanades and co-workers summarized the CCR experimental data of previous studies on a variety of CaO sorbents differing in their physical properties. They were able to develop a single correlation between the extent of carbonation as a function of the number of CCR cycles.[15,16] These sorbents experienced a similar loss in reactivity towards the carbonation reaction regardless of differences in particles size, reactor types, reaction conditions, sorbent characteristics and cycle times. They observed that the highest C02 sorption capacity retained by the sorbent was 24 wt % after 20 cycles.

Sulfur present in coal oxidizes to S02 during combustion. Calcium based sorbents are widely used for the control of S02 emissions. The two principal calcium utilization processes are low temperature wet scrubbing and high temperature furnace sorbent injection (FSI). In wet scrubbing, SO2 capture occurs through ionic reactions in the aqueous phase. In high temperature (>900° C.) FSI systems, calcium oxide precursors (dolomite, Ca(OH)2 and limestone) and their calcines reacts with SO2 to form CaSO4 via the heterogeneous non-catalytic gas solid reaction. Sulfation under these conditions has been extensively studied and simulated using various models.", ";" PCC achieves a higher extent of sulfation (~70%) compared to naturally occurring limestone (~30%) at greater than 900° C. within a residence time of 700 milliseconds.

The flue gas generated by coal combustion typically contains 10-15% C02, 3-4% 02, 5-7% H2O, 500-3000 ppm SO2 and 150-500 ppm NOx in addition to trace quantities of HCl, arsenic, mercury, and selenium. Separation of CO2 by its absorption in monoethanolamine (MEA) is currently the most viable option for commercial scale deployment. However, MEA forms thermally stable salts with SO2 and NOx, which do not decompose under the regeneration conditions employed in the MEA process. It is necessary to lower SO2 concentration to below 10 ppm to minimize the loss of the costly solvent. Economic analysis of this process, based on a parasitic consumption of MEA of 0.5-2 g MEA/kg C02 separated, show that the cost associated with CO2 separation lies in the $33-73/ton CO2 avoided.[21] A similar hurdle is posed by SO2 for a CaO based CCR process. CaO undergoes sulfation with SO2 forming CaSO4, which cannot be thermally decomposed back to CaO within the operating temperature range of the proposed CCR process (400-800° C.) as it requires greater than 1100° C. for its decomposition. Exposure of CaO to higher temperatures leads to a loss in surface area and porosity due to excessive sintering, which drastically reduces its reactivity. Eventually, the CaSO4 buildup in each cycle reduces the regenerative capacity of the CaO sorbent over subsequent cycles ultimately rendering it inactive. However, literature on the sulfation of CaO in the temperature range where CaCO3 is thermodynamically stable is scant. Sulfation of calcium species in this temperature range is crucial for the experiments covered in this paper because this study aims to investigate the effect of SO2 on the carbonation of CaO.

The simultaneous hydration, carbonation and sulfation of reagent grade 5 micron CaO particles have been previously investigated for an exposure time of 2 hours in the 170-580° C. temperature range under differential conditions.[22] Low temperatures favor hydration over sulfation and carbonation. 380° C. marks the termination of hydration and the onset of carbonation and sulfation. Carbonation peaked at 520° C. whereas sulfation dominated beyond 580° C. Furthermore, the sulfur species in the form of CaSO3 peaks at 24% at 300° C. and CaSO4 is the only sulfur species above 585° C. A high extent of sulfation has also been attained by 2 mm sized macroporous (>200 run) CaO particles synthesized by a swelling technique involving water-acetic acid mixtures.[23,11] The authors attributed the high sulfation extent to the increased access of SO2 to the particle surface due to the macroporosity of the sorbent. Li et al. investigated combined carbonation and sulfation reactions on commercial grade calcium hydroxide.[25] They carried out these reactions at 425-650° C. by exposing the fines for 2 seconds under entrained flow conditions. The particles were then collected on a hot filter, maintained between 450-510° C. and further exposed to the gas mixture for 2 hours. Their results indicate an increasing extent of direct sulfation of the carbonated product (CaCO3) with higher residence time.[25] The kinetic analysis and modeling of the reaction between SO2 and CaCO3 in the temperature range where CaCO3 is thermodynamically stable, was studied by Snow et al. and Hajaligol et al.[26,27] They exploited the higher porosity of calcium oxalate derived CaCO3 to achieve about 90% sulfation in the 400-550° C. temperature range. Tullin and Ljungstrom conducted thermogravimetric studies on the simultaneous carbonation and sulfation of CaO and CaCO3 for a residence time of 10-180 minutes at 860° C. The gas mixture consisted of 30-80% CO2, 3000 ppm SO2 and 3-4% oxygen[28,29] The initial increase in weight of the sorbent was predominantly due to the carbonation reaction, which occurs to a higher extent than sulfation for the given inlet gas concentration levels. Further exposure of the sorbent to the reactant gas mixture results in the direct sulfation of the CaCO3 so formed, and leads to a decrease in the overall extent of carbonation and an increase in sulfation. In other experiments, they show that although both CaO and CaCO3 have similar reactivity towards the sulfation reaction, CaSO4 formed due to the direct carbonation of CaCO3 is more porous than the CaSO4 product formed by sulfation of CaO.

These literature studies indicate that carbonation occurs at faster rate compared to sulfation at temperatures around 700° C. due to higher concentration of CO2. However, SO2 will eventually react directly with CaCO3 leading to the formation of CaSO4. It is thus imperative to obtain experimental data on combined carbonation and sulfation reactions of CaO over multiple cycles to identify the process conditions under which the extent of carbonation can be maximized in the presence of SO2. Simultaneous high temperature carbonation and sulfation experiments were performed in a Thermogravimetric Analyzer (TGA). The study demonstrates the effect of solid residence time on the overall extent of simultaneous carbonation and sulfation.

Enhanced Hydrogen Production Integrated with CO2 Separation in a Single-Stage Reactor There has been a global push towards the development of a hydrogen economy. The main premise behind this drastic alteration in our energy usage stems from the fact that the use of hydrogen in portable and mobile applications would be the most environmentally beneficial process that leads only to the emission of water. However, the biggest issue that needs to be addressed for the success of the hydrogen-based economy involves the source of hydrogen itself. While hydrogen may be considered as the best "carrier" of energy, there is clearly no hydrogen "wells" on earth. The major processes for hydrogen production from fossil fuels consist of steam reforming of methane (SMR), coal gasification, catalytic cracking of natural gas, and partial oxidation of heavy oils. Other processes consist of water electrolysis, thermo chemical water decomposition, biological processes, etc. (Rosen and Scott, 1998; Rosen, 1996). However, water electrolysis is not a very energy efficient process.

Water gas, a mixture of CO, CO2, H2O and H2, is formed by the gasification of coal by sub-stoichiometric air and/or steam. Irrespective of the initial concentration of these four gases, the reversible water gas shift (WGS) reaction gets initiated until the exact ratio of the concentration of these gases reaches a particular equilibrium constant KWGS that is a function of temperature. The WGS reaction and its equilibrium constant can be written as:

WGS Reaction: CO+H$_2$O<=>CO$_2$+H$_2$ ΔH=−40.6 kJ/mol         (1)

WGS equilibrium constant:

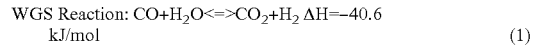

$$K_{WGS} = \frac{[CO_2][H_2]}{[CO][H_2O]} = 812.9 - \frac{6.628e+5}{T} + \frac{1.001e+8}{T} \qquad (2)$$

where T is in ° C. From equation (2), it can be observed that K$_{WGS}$ reduces with increasing temperature. This means that processes aimed at converting coal-derived gas to hydrogen at high temperatures are thermodynamically restricted. While catalysts aid in achieving this equilibrium, they cannot alter the value of K to provide a higher hydrogen yield. An effective technique to shift the reaction to the right for enhanced hydrogen generation has been to remove hydrogen from the reaction mixture. This premise has lead to the development of hydrogen separation membranes. However, membranes cannot completely remove hydrogen from the mixture. Any remaining hydrogen would dilute CO2 after its utilization in either a fuel cell or gas turbine.

Another option for driving the WGS reaction forward is to remove CO2 from the reaction mixture by reacting it with CaO. The carbonation reaction can be written as:

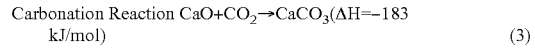

Carbonation Reaction CaO+CO$_2$→CaCO$_3$(ΔH=−183 kJ/mol)         (3)

Under the appropriate reaction temperature, CO2 concentration can be lowered down to ppm levels by reaction (3), thereby enabling the maximum production of hydrogen from carbon via reaction (1). By conducting the reaction such that CO is the limiting reactant, we can ensure complete utilization of the fuel as well. Besides these advantages, CO2 is simultaneously removed from the gas mixture in the form of CaCO3, thereby improving the purity of the hydrogen stream (the other contaminant being only water). The spent sorbent can then be calcined separately to yield pure CO2 stream, which is then amenable for compression and liquefaction before its transportation to sequestration sites. Calcination reaction, reverse of the carbonation reaction can be written as:

Calcination Reaction $CaCO_3 \rightarrow CaO+CO_2$ ($\Delta H=+183$ kJ/mol) (4)

The resulting CaO sorbent is recycled to capture $CO_2$ in the next cycle. This cyclical CCR process can be continued so long as the sorbent provides a satisfactory $CO_2$ capture.

To obtain high purity $H_2$, the WGS reaction is generally carried out in two stages for: (1) high temperature shift (250-500° C.) using iron catalysts and (2) low temperature shift (210-270° C.) using copper-based catalysts (Gerhartz, 1993; Bohlbro, 1969). Copper based catalysts are extremely intolerant to small quantities of sulfur (<0.1 ppm) and hence the fuel gases need to be desulfurized upstream of the WGS reactor. Besides, to achieve satisfactory carbon monoxide conversion a considerable quantity of high-pressure steam is required. For example, to lower the CO content of the typical fuel gas from 45% (inlet) to 3% (outlet) a total steam addition of 1.18 kg/m³ of the gas is required, at a total pressure of 60 bar and 410° C. (Gerhartz, 1993). The steam to CO ratio at 550° C. can be as high as 50 during a single-stage operation or 7.5 for a more expensive dual-stage process to obtain 99.5% pure H2 (David, 1980). This is necessary due to the equilibrium limitation inherent in the WGS reaction. From the point of view of $H_2$ production, even though higher temperatures lead to improved kinetics, WGS has poor equilibrium conditions at the higher temperatures. However, the continuous removal of the carbon dioxide product from the reaction chamber will incessantly drive the equilibrium-limited water-gas shift reaction forward. This will ensure a high yield and purity of hydrogen with near stoichiometric amounts of steam needed for the reaction. Besides, the reaction can now be carried out at higher temperatures leading to superior kinetics in the forward direction. Thus the major equilibrium related drawback in this process could be overcome. The continuous $CO_2$ removal can be brought about by the carbonation reaction of a metal oxide to give the corresponding metal carbonate. We have identified a high reactivity, mesoporous calcium oxide as the potential sorbent for the in-situ $CO_2$ capture given by eqn. 3.

The success of this process would effectively bridge coal gasification to fuel cell usage and chemical synthesis. Other side benefits of this process involve the potential for removal of sulfur and heavy metals such as arsenic and selenium from the fuel gas stream.

Recently, Harrison and co-workers reported a single-step sorption-enhanced process to produce hydrogen from methane (Balasubramanian et al., 1999; Lopez Ortiz and Harrison, 2001). They used the traditional concept of SMR with WGS using Ni-based catalyst to produce hydrogen, coupled with this novel scheme of in-situ continuous $CO_2$ capture using a calcium-based dolomite sorbent. They obtained high hydrogen yields with 97% purity (dry basis).

However, they reported a low "calcium" conversion in the sorbent of about 50% at the beginning of the breakthrough to about 83% at the end of the test. These conversion calculations are based on only the calcium portion of their dolomite sorbent. Their total sorbent conversion will be much lower than these values as dolomite does not entirely contain calcium based material. In fact, dolomite comprises of nearly 50 wt. % calcium, which participates in the reaction to some extent, and the remaining portion of the sorbent (mainly magnesium oxide) stays unreacted. Further, they attribute the incomplete conversions of the calcium material to the concept of pore filling and pluggage at the pore-mouths of these sorbent particles by $CaCO_3$ product layer, preventing the access of $CO_2$ in the gas to unreacted CaO surface at the pore interiors.

Harrison and co-workers regenerated the dolomite sorbent in streams of $N_2$, 4% $O_2$ in $N_2$ and pure $CO_2$. They had to use high regeneration temperatures of 800-950° C., especially while using pure $CO_2$. Exposure of the reforming catalyst to an oxidizing atmosphere (viz. $O_2/N_2$ or $CO_2$) while regenerating the sorbent used to oxidize the Ni catalysts to NiO. Hence, the catalyst had to be reduced back to Ni before every cycle or the sorbent-catalyst mixture had to be separated after every run so that only the sorbent is subjected to the regeneration conditions. Further, the temperature of operation can be lowered by regeneration in a pure $N_2$ stream. However, it would not solve the problem of $CO_2$ separation due to the formation of a $CO_2/N_2$ gas mixture. Calcination in a pure $CO_2$ stream will result in higher operating temperatures due to the thermodynamic limitations of the calcination reaction in presence of the $CO_2$ product. Higher temperatures and the presence of $CO_2$ during calcination would cause the sorbent to sinter. This is in agreement with the results of multiple carbonation-calcination cycle tests for dolomite by Harrison and co-workers (Lopez Ortiz and Harrison, 2001) in pure $CO_2$ stream (800-950° C.). They observed a decrease in "calcium" conversion from 83% in the $1^{st}$ cycle to about 69% in the $10^{th}$ cycle itself. However, a mesoporous high suface area calcium based sorbent (precipitated calcium carbonate, PCC) developed at OSU has undergone 100 cycle experiments. The PCC sorbent has shown 85% conversion in the $1^{st}$ cycle 66.7% in the $10^{th}$ cycle and 45.5% in the $100^{th}$ cycle towards carbonation. These experiments were carried out in a TGA at 700° C. in a 10% $CO_2$ stream in the carbonation cycle and 100% $N_2$ gas in the calcination cycle, with 30 minute residence times for each cycle. Therefore this project aims testing this PCC based sorbent towards further enhancing the WGSR and overcoming some of the problems faced by Harrison and co-workers.

SUMMARY OF THE INVENTION

The present invention includes a calcium oxide, its usage for the separation of $CO_2$ from multicomponent gas mixtures and the optimum process conditions necessary for enhancing the repeatability of the process.

A preferred method for separating carbon dioxide from a flow of gas comprising carbon dioxide comprises the steps of: (1) directing the flow of gas to a gas-solid contact reactor, the gas-solid contact reactor contains at least one sorbent comprising at least one metal oxide; (2) reacting the carbon dioxide with the at least one sorbent so as to remove the carbon dioxide from said flow of gas, thereby converting the at least one sorbent into spent sorbent; (3) calcining the spent sorbent so as to liberate the carbon dioxide from the spent sorbent, thereby regenerating the sorbent; and (4) repeating the aforementioned steps.

Although any metal oxide may be employed, it is preferred that the at least one metal oxide is selected from the group consisting of: ZnO, MgO, $MnO_2$, NiO, CuO, PbO, and CaO. Further, it is preferred that the spent sorbent is a metal carbonate.

It is preferred that the sorbent has a sorption capacity of at least about 70 grams of carbon dioxide per kilogram of sorbent. However, it is even more preferred that the sorbent has a sorption capacity of at least about 300 grams of carbon dioxide per kilogram of sorbent. Irrespective of the sorption capacity of the sorbent, it is preferred that the sorbent has substantially the same sorption capacity after calcining as the sorbent had prior to adsorbing the carbon dioxide.

Although any calcination method may be employed, it is preferred that the calcining is performed under at least partial vacuum. It is also preferred that the calcining is performed by steam.

The present invention includes facilities practicing the aforementioned method.

A method for separating carbon dioxide from a flow of gas comprising carbon dioxide of the present invention comprises the steps of: (1) directing the flow of gas to a first gas-solid contact reactor, the first gas-solid contact reactor containing at least one sorbent, the sorbent comprising at least one metal oxide; (2) reacting the carbon dioxide in the flow of gas on the sorbent in the first gas-solid contact reactor so as to remove the carbon dioxide from the flow of gas; (3) directing the flow of gas to a second gas-solid contact reactor when the sorbent in the first gas-solid contact reactor is spent thereby forming spent sorbent, the second gas-solid contact reactor containing at least one sorbent, the sorbent comprising at least one metal oxide; (4) reacting the carbon dioxide in the flow of gas on the sorbent in the second gas-solid contact reactor so as to remove the carbon dioxide from the flow of gas; (5) calcining the spent sorbent from the first gas-solid contact reactor so as to generate carbon dioxide and to regenerate the sorbent; (6) directing the flow of gas to the first gas-solid contact reactor when the sorbent in the second gas-solid contact reactor is spent, thereby forming spent sorbent; and (7) calcining the spent sorbent from the second gas-solid contact reactor so as to generate carbon dioxide and to regenerate the sorbent.

Although any calcination method may be employed, it is preferred that the calcining is performed under at least partial vacuum. It is also preferred that the calcining is performed by steam. This applies to both gas-solid contact reactors.

Although any metal oxide may be utilized, it is preferred that the at least one metal oxide is selected from the group consisting of: ZnO, MgO, $MnO_2$, NiO, CuO, PbO, and CaO.

It is preferred that the sorbent has a sorption capacity of at least about 70 grams of carbon dioxide per kilogram of sorbent. However, it is even more preferred that the sorbent has a sorption capacity of at least about 300 grams of carbon dioxide per kilogram of sorbent. Irrespective of the sorption capacity of the sorbent, it is preferred that the sorbent has substantially the same sorption capacity after calcining as the sorbent had prior to adsorbing the carbon dioxide.

The present invention also includes facilities practicing the aforementioned method A method for regenerating a spent sorbent for carbon dioxide of the present invention comprises the steps of: (1) providing a spent sorbent, the spent sorbent comprising metal carbonate; and (2) calcining the spent sorbent so as to liberate carbon dioxide gas and so as to regenerate the spent sorbent thereby forming a sorbent comprising a metal oxide.

It is preferred that the spent sorbent is calcium carbonate. It is further preferred that the metal oxide is calcium oxide.

It is preferred that the sorbent has substantially the same sorption capacity after calcining as the sorbent had prior to adsorbing the carbon dioxide.

Although any calcination method may be employed, it is preferred that the calcining is performed under at least partial vacuum. It is also preferred that the calcining is performed by steam. This applies to both gas-solid contact reactors.

The present invention includes facilities practicing the aforementioned method.

A method for producing a sorbent of the present invention comprises the steps of: (1) obtaining a structurally altered high surface area calcium carbonate having a surface area of at least 25.0 $m^2$/g, a pore volume of at least 0.05 $cm^3$/g, and a mesoporous pore size distribution; and (2) calcining the structurally altered high surface area calcium carbonate so as to produce a sorbent having a surface area of less than 22 $m^2$/g, a pore volume of at least 0.005 $cm^3$/g, and a mesoporous pore size distribution.

Although any calcination method may be employed, it is preferred that the calcining is performed under at least partial vacuum. It is also preferred that the calcining is performed by steam. This applies to both gas-solid contact reactors.

The present invention includes sorbents made according to the aforementioned method.

A sorbent according to the present invention comprising calcium oxide having a surface area of at least 12.0 $m^2$/g and a pore volume of at least 0.015 $cm^3$/g, the calcium carbonate sorbent having sorption capacity of at least about 70 grams of carbon dioxide per kilogram of sorbent.

In addition to the novel features and advantages mentioned above, other objects and advantages of the present invention will be readily apparent from the following descriptions of the drawing(s) and preferred embodiment(s).

DETAILED DESCRIPTION OF THE PREFERRED EMBODIMENT(S)

In accordance with the foregoing summary, the following presents a detailed description of the preferred embodiment(s) of the invention that are currently considered to be the best mode.

Chemicals, Sorbents and Gases

Naturally occurring limestone ($CaCO_3$) and hydrated lime ($Ca(OH)_2$), synthesized from it were obtained from Linwood Mining and Minerals. Dolomite ($CaCO_3.MgCO_3$) was procured from the National Dolomite Company. The purity of these ores was above 90%. High purity metal oxides such as ZnO, MgO, $MnO_2$, NiO, CuO, PbO, CaO were obtained from Aldrich Chemical Company. Precipitated calcium carbonate (PCC) was synthesized from Linwood hydrate by the procedure described in a following section. N40V® dispersant, a sodium salt of a carboxylic acid, used in the synthesis of PCC was obtained from Allied Colloid. The synthesis procedure is described in detail in a following section. $N_2$ and $CO_2$ used for calcination and carbonation experiments were 99.999% and 99.9% pure, respectively.

Sorbent Reactivity Testing and Structural Analysis

The reactivity testing of CaO sorbents for carbonation was carried out in a Perkin Elmer Thermogravimetric Analyzer (TGA-7) apparatus. The balance can accurately measure up to 1 microgram. A small sample of the sorbent (5-20 mg) is placed in a quartz boat. The weight of the sample was recorded every second. The structural properties of CaO sorbents and their precursors were tested in a NOVA 2200 analyzer (Quantachrome Company). The BET surface area, pore volume, and pore size distribution were measured at −196° C. using nitrogen as the adsorbent.

Screening of Metal Oxides

Figure 2:
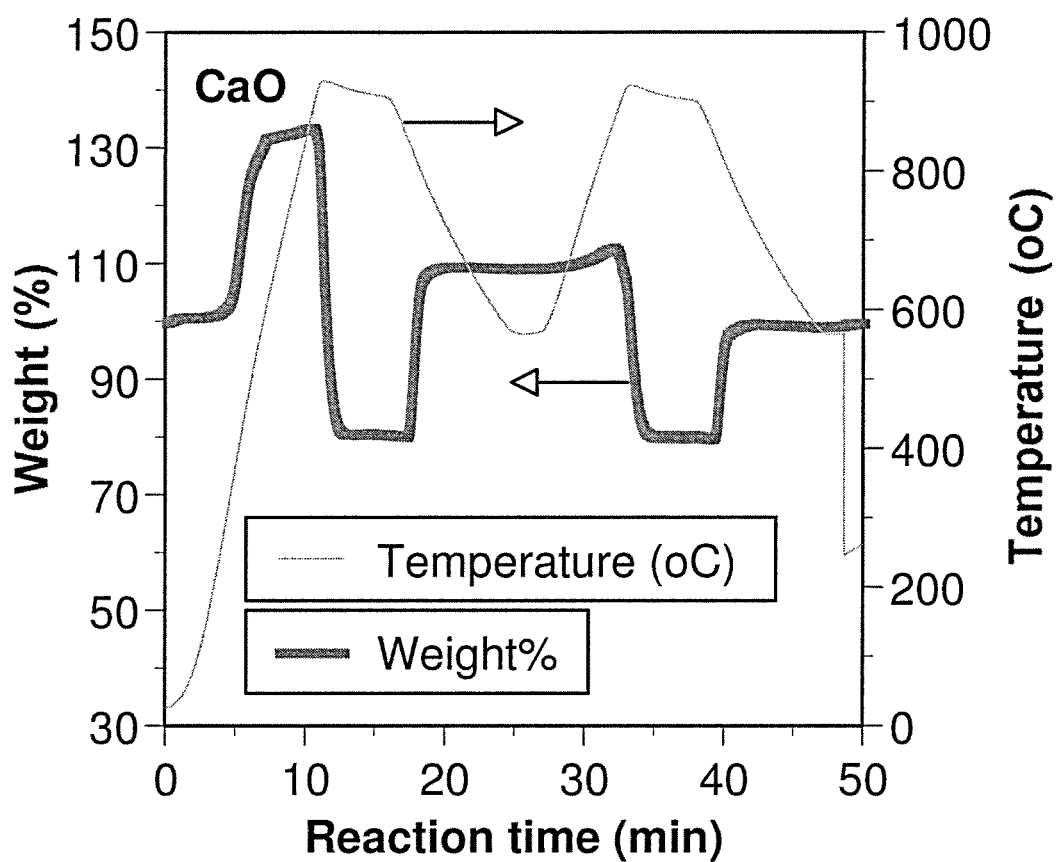
FIG. 2 illustrates the performance of calcium oxide for the carbonation reaction.

Metal oxides such as ZnO, MgO, CuO, $MnO_2$, NiO, PbO and CaO that undergo the CCR scheme in the 800-200° C. temperature range were analyzed for their reactivity in a TGA. A powdered sample of these oxides was placed in a quartz pan and pure $CO_2$ was passed over the sample metal oxide. The temperature was then slowly raised and the weight of the sample was continuously monitored. An increase in the weight of the sample is an indication of the formation of metal carbonate. FIG. 2 provides experimental data for the carbonation of lime ($Ca(OH)_2$) under flowing pure $CO_2$ gas. With an increase in temperature, the weight of the sample increases till the temperature reaches about 890° C. Calcination, which is thermodynamically favored above 890° C. at 1 atm $CO_2$ partial pressure, causes a rapid decrease in weight until the sorbent converts completely to CaO. When the sample is reheated, the weight starts to increase again and the process is repeated once more. Besides proving that CaO is a viable candidate, the data also shows recyclability of the sorbent.

Figure 3:
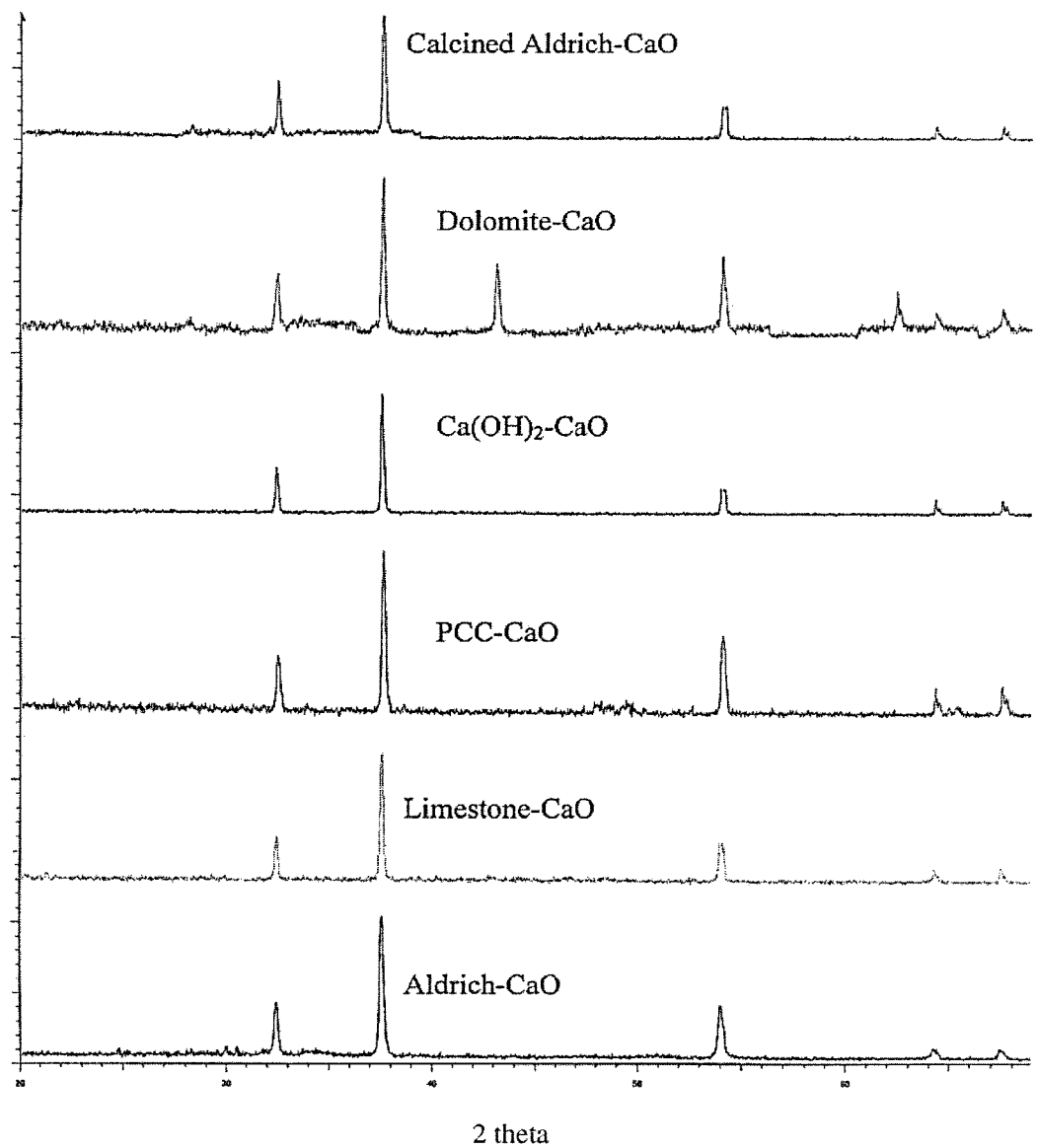
FIG. 3 compares the XRD diffractograms of CaO derived from various precursors.

XRD Analysis of CaO Obtained from its Precursors:

CaO was identified as a viable candidate for the carbonation-calcination reactions. However, a variety of precursors can be calcined to obtain the CaO sorbents necessary for the carbonation reaction. Common and economical precursors include calcium carbonate, calcium hydroxide and dolomite. The other important source of CaO is via the calcination of synthesized high surface area precipitated calcium carbonate. In order to compare the crystal structure of the CaO sorbents obtained from these sources, XRD patterns were obtained on all the CaO sorbents. FIG. 3 depicts these diffractograms (a. Calcined Aldrich-CaO; b. Dolomite-CaO; c. $Ca(OH)_2$—CaO); d. PCC-CaO; e. Limestone-CaO; and f. Aldrich-CaO). From this figure we can conclude that the crystal structure of the CaO sorbents obtained from numerous sources is identical. Only the XRD pattern corresponding to dolomite-derived CaO shows extra peaks due to the presence of MgO in the calcined dolomite. Based on the similarity in all the CaO structures, it can be assumed that any difference in reactivity of CaO for carbonation is an artifact of the sorbent morphology and not due to the chemistry of the gas-solid reaction that occurs on the CaO surface.

Precipitated Calcium Carbonate (PCC) Synthesis

Figure 4:
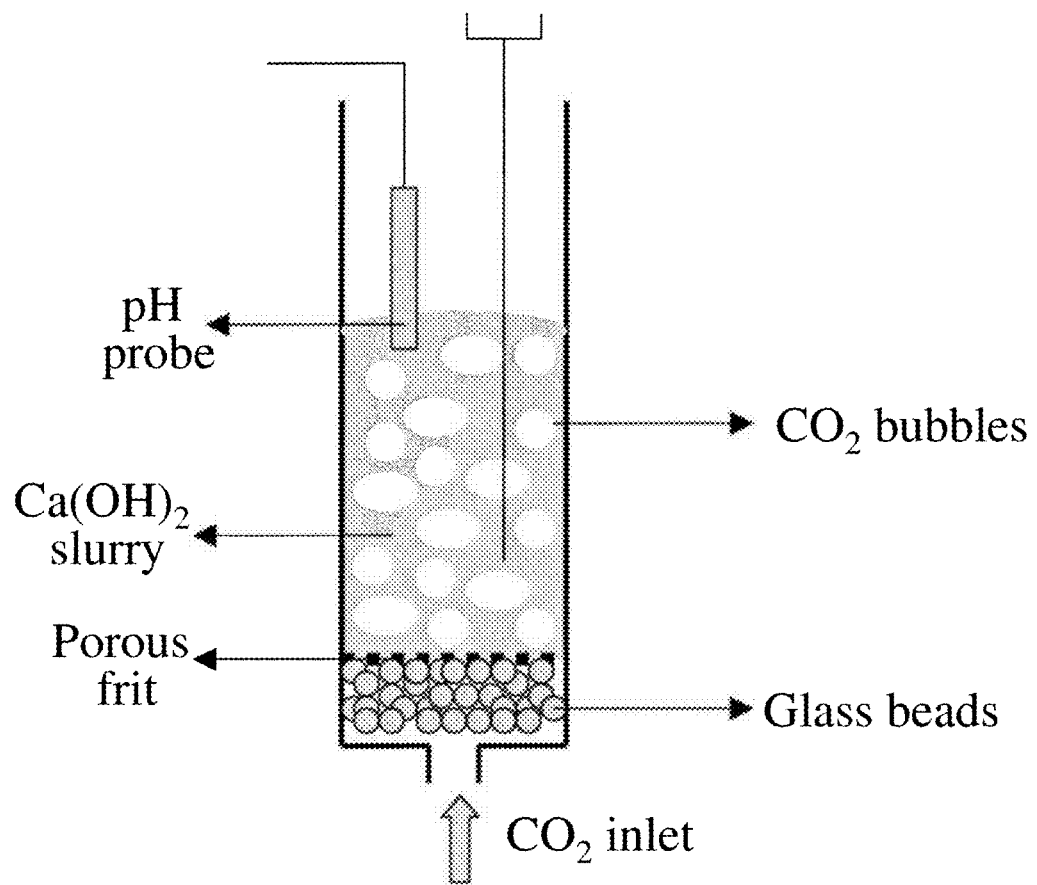
FIG. 4 is a schematic diagram of a carbonator reactor for the synthesis of precipitated calcium carbonate.
Figure 5:
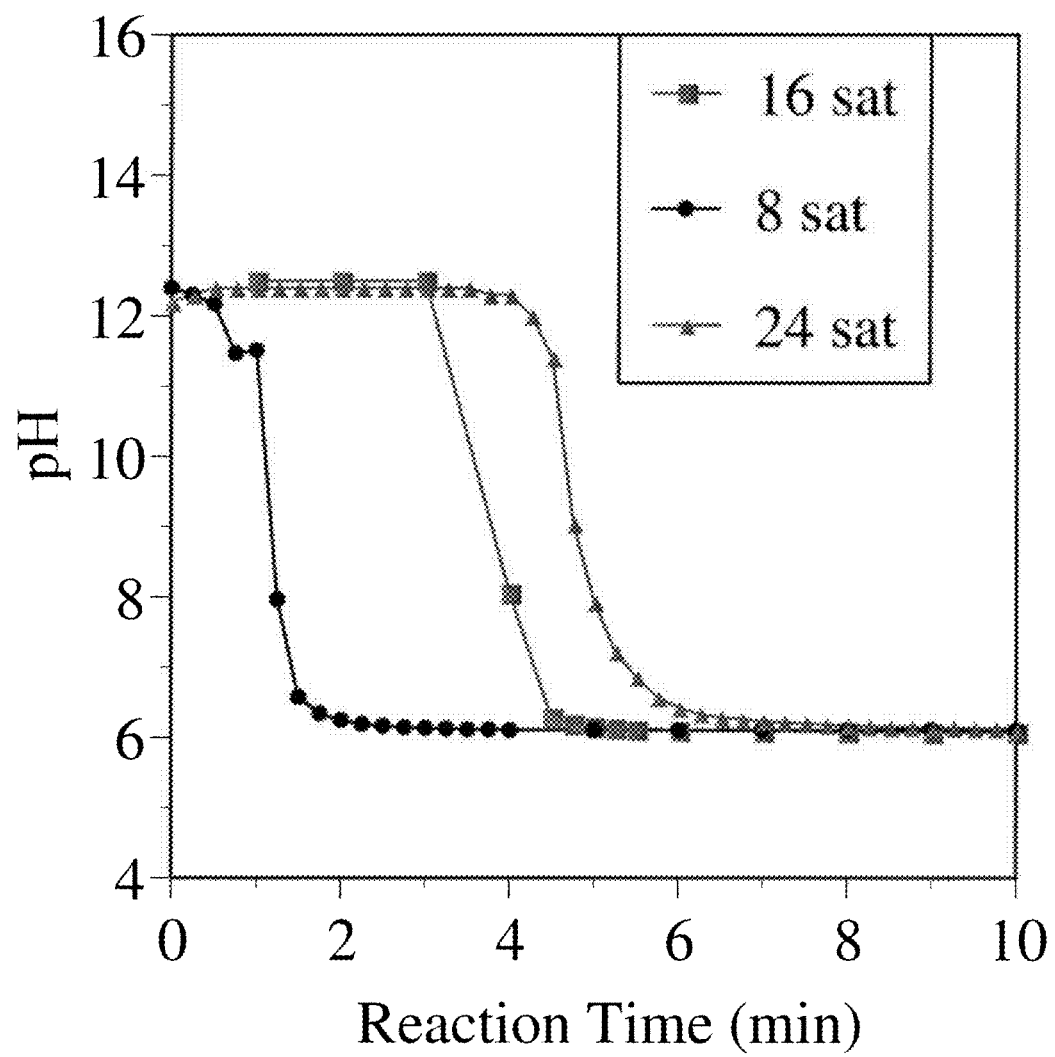
FIG. 5 shows the change in the pH of the slurry as a function of $Ca(OH)_2$ loading. (500 mL water, 0.0575% N40V® dispersant, 4 scfh $CO_2$).

Structurally altered high surface area CaO precursors were synthesized based on the procedure outlined elsewhere (Fan, L.-S.; Ghosh-Dastidar, A.; Mahuli, S.; Calcium Carbonate Sorbent and Methods of Making the Same. U.S. Pat. No. 5,779,464 and Agnihotri, R.; Chauk, S.; Mahuli, S.; Fan, L.-S. Influence of Surface Modifiers on Structure of Precipitated Calcium Carbonate. *Ind. Eng. Chem. Res.* 1999, 38, 2283-2291). A schematic diagram of the slurry bubble column used for this purpose is shown in FIG. 4. The carbonator 40 consists of a 2" OD Pyrex tube 40a. A porous frit 40d at the bottom, disposed over glass beads 40f, provides good distribution of $CO_2$ 40g through the slurry 40c. A K-type thermocouple 40h inserted in the slurry continuously records the slurry temperature. A pH probe 40b monitors the pH of the slurry as the reaction medium changes from a basic to an acidic solution as the reaction proceeds. First, 500 ml of distilled water is poured into the carbonator, followed by the addition of 0.0575 g of N40V®. 12.8 g of $Ca(OH)_2$ is added to the solution to provide a loading of 2.56% by weight. This corresponds to a concentration of 16-sat (concentration of $Ca(OH)_2$ is 16 times its saturation solubility limit). The solubility of $Ca(OH)_2$ (~0.16 g/100 g water) leads to a pH of 12 at the start of the experiment. The remaining $Ca(OH)_2$ remains suspended in the solution. The ratio of N40V® and $Ca(OH)_2$ loading is chosen to create a surface charge of zero on the incipiently formed $CaCO_3$ particles. The flow of $CO_2$ 40e into the carbonator is then started and the pH was continuously monitored. FIG. 5 shows the change in pH with reaction time as a function of $Ca(OH)_2$ loading. $CO_2$ dissolved in water provides carbonate ions that react with $Ca^{++}$ ions to form $CaCO_3$ according to the reaction below:

$$Ca^{2+} + CO_3^{2-} \rightarrow CaCO_3 \quad (3)$$

$CaCO_3$ has a much lower solubility in water (~0.0012 g/100 g water) compared to $Ca(OH)_2$ and thus precipitates out. As the reaction proceeds, $Ca^{2+}$ ions get depleted, but are continuously replenished by the suspended $Ca(OH)_2$. Hence the pH remains 12. As the reaction proceeds, $Ca(OH)_2$ ultimately gets depleted and the concentration of $Ca^{2+}$ ions cannot be maintained at its solubility limit. On the other hand, continued dissolution of $CO_2$ gas leads to the accumulation of $H^+$ ions causing the solution to become acidic. Eventually, the pH settles at about 6.0, corresponding to equilibrium solubility of $CO_2$ in water at ambient temperature. This also signals the end of the carbonation of all $Ca(OH)_2$. The slurry is then removed from the precipitator, vacuum filtered and stored in a vacuum oven at 90-110° C. for 20 hours to completely remove the moisture. Higher $Ca(OH)_2$ loading requires more reaction time as evident from FIG. 5.

Effect of the Ratio of $Ca(OH)_2$ and Dispersant on PCC Morphology

Figure 6:
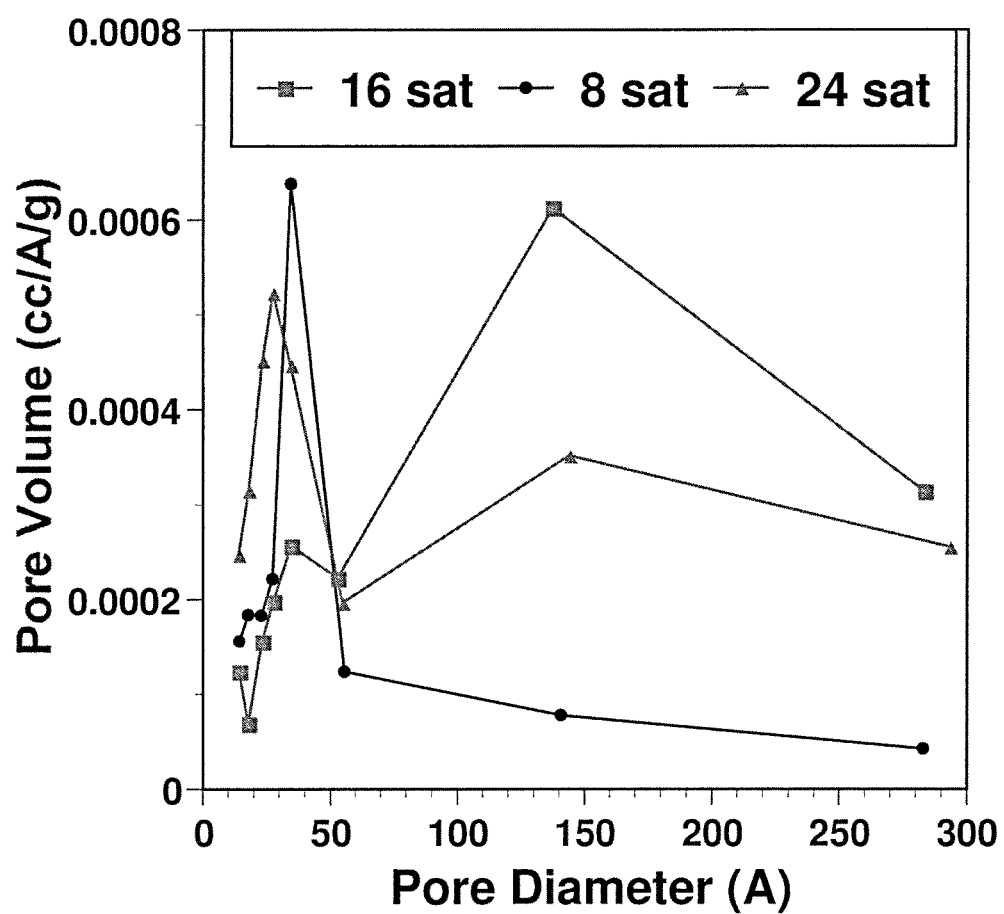
FIG. 6 depicts the effect of $Ca(OH)_2$ loading on the morphology of Precipitated Calcium Carbonate (PCC) (500 mL water, 0.0575% N40V® dispersant, 4 scfh $CO_2$).

Precipitated calcium carbonate can be obtained by the reaction between carbonate and calcium ions in solution. It is known that the $CaCO_3$ nuclei that precipitate out have positive surface charge on them that prevent agglomeration (Agnihotri, R.; Chauk, S.; Mahuli, S.; Fan, L.-S. Influence of Surface Modifiers on Structure of Precipitated Calcium Carbonate. *Ind. Eng. Chem. Res.* 1999, 38, 2283-2291). The resulting structure is also microporous in nature. However, the structural properties of the synthesized PCC can be altered by the use of negatively charged dispersants that neutralize the surface charges. This makes the ratio between the $Ca(OH)_2$ loading and the dispersant used very critical. Besides, the effect of $Ca(OH)_2$ loading in the slurry was studied to enhance the productivity of the precipitation process by synthesizing more PCC from the same slurry volume. 8-sat, 16-sat and 24-sat were used as $Ca(OH)_2$ loading levels, all other factors remaining constant. It can be seen from FIG. 6 and Table 1 that at a concentration of 8-sat, there is proportionally more dispersant in the slurry causing the incipiently formed $CaCO_3$ particles to be negatively charged. The negative charge prevents the agglomeration of these nuclei eventually leading to the formation of microporous PCC as shown in FIG. 6. Its surface area is also relatively lower. At a $Ca(OH)_2$ loading corresponding to 16-sat, the ratio of N40V® and $CaCO_3$ is balanced and the surface charge on the nuclei is zero. This allows optimal association of these nuclei leading to a predominantly mesoporous structure. The SA of PCC under these optimum conditions is also the highest at 38.3 $m^2/g$. As the loading of $Ca(OH)_2$ is raised to 24-sat, there is not enough N40V® dispersant to neutralize the surface charge on all the incipiently formed nuclei. There could possibly be some positively charged particles. This again creates non-optimum conditions leading to a loss in SA and PV compared to the 16-sat case. Another experiment was conducted to process a 32-sat $Ca(OH)_2$ slurry keeping the Ca(OH)$_2$ to N40V® ratio constant. The SA/PV of PCC synthesized from a 32-sat slurry was 37.07 m$^2$/g and 0.139 cm$^3$/g respectively; lending support to the fact that higher mass of PCC can be synthesized from the same amount of slurry.

TABLE 1

Morphological properties of PCC as a function of N40V ®:Ca(OH)$_2$ loading ratio (500 ml water, 0.0575% N40V ® dispersant, 4 scfh CO$_2$).

| Ca(OH)$_2$ loading weight % | Surface Area (m$^2$/g) | Pore Volume (cm$^3$/g) |
|---|---|---|
| 1.28 | 13.8 | 0.03 |
| 2.56 | 38.3 | 0.14 |
| 3.84 | 36.8 | 0.11 |

Pore Structure of CaO Sorbents

Figure 7:
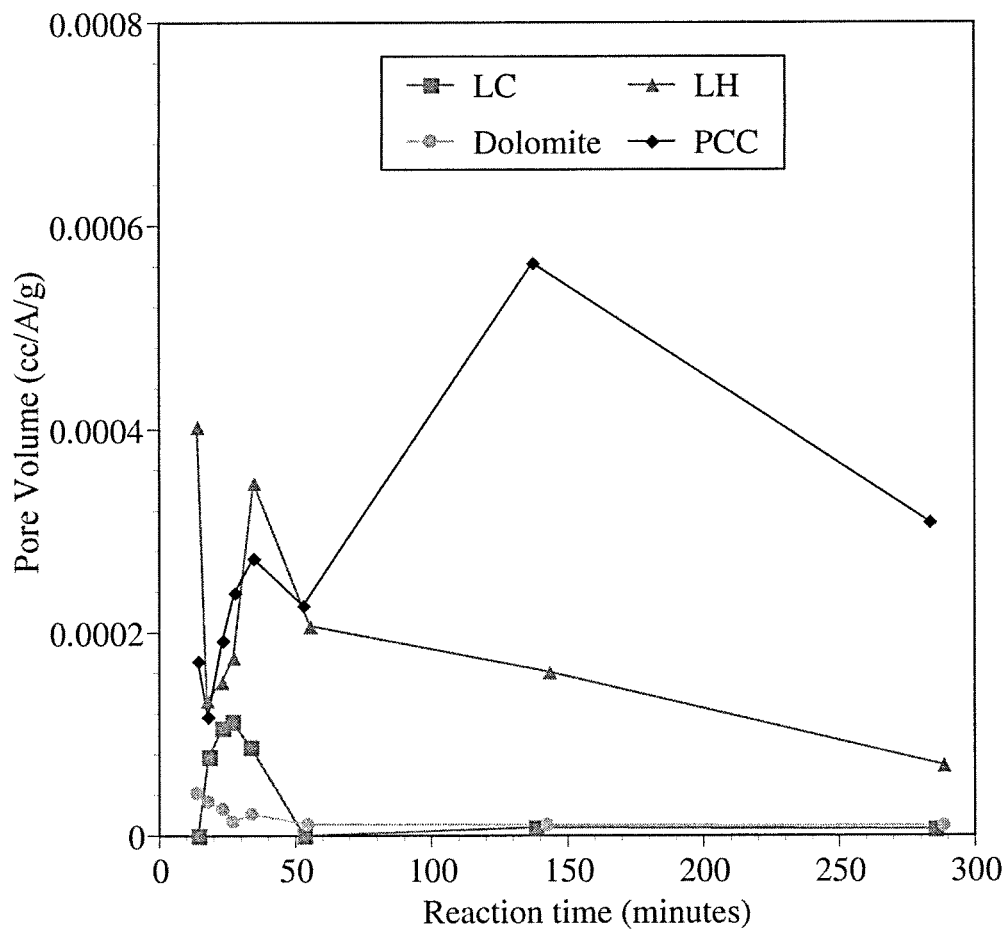
FIG. 7 compares the pore size distribution of four CaO precursors.

CaO sorbents were synthesized by calcining various CaO precursors such as Linwood calcium carbonate (LC), dolomite (DL), Linwood calcium hydroxide (LH), and precipitated calcium carbonate (PCC). For convenience, the oxides derived from these sources are termed as LC-CaO, FCD-CaO (for fully calcined dolomite-CaO), LH-CaO, and PCC-CaO, respectively. The procedure involved heating the precursor in flowing nitrogen beyond the calcination temperature (800-950° C.) for an hour followed by its storage in a desiccator. Structural properties such as surface area (SA) and pore volume (PV) of these chemicals are listed in Table 2 and their pore size distributions are shown in FIG. 7. The SA of naturally occurring minerals, LC and dolomite was very low, 1.06 and 1.82 m$^2$/g, respectively. LH was synthesized by first calcining the LC followed by its hydration. LH exhibited a considerably higher SA (13.19 m$^2$/g) and PV compared to the LC. The SA of PCC (38.3 m$^2$/g), however, was the highest among all precursors. From FIG. 5, we can infer that the structures of LC, DL and LH are predominantly microporous in nature. Most of the porosity lies in pores below 5 nm in diameter. In contrast, the maximum in PV occurs at 15 nm for PCC and most of its PV originates from mesopores in the 5-25 nm range.

TABLE 2

Morphological properties (surface area and pore volume) of various CaO sorbents and their precursors.

| Sorbent Name | Surface Area (m$^2$/g) | Pore Volume (cm$^3$/g) |
|---|---|---|
| LC | 1.1 | 0.003 |
| LC-CaO | 17.8 | 0.078 |
| Dolomite | 1.8 | 0.004 |
| FCD-CaO | 29.8 | 0.08 |
| LH | 13.2 | 0.0453 |
| LH-CaO | 33.3 | 0.1 |
| PCC | 38.3 | 0.11 |
| PCC-CaO | 12.8 | 0.027 |

Carbonation of CaO Sorbents

Figure 8:
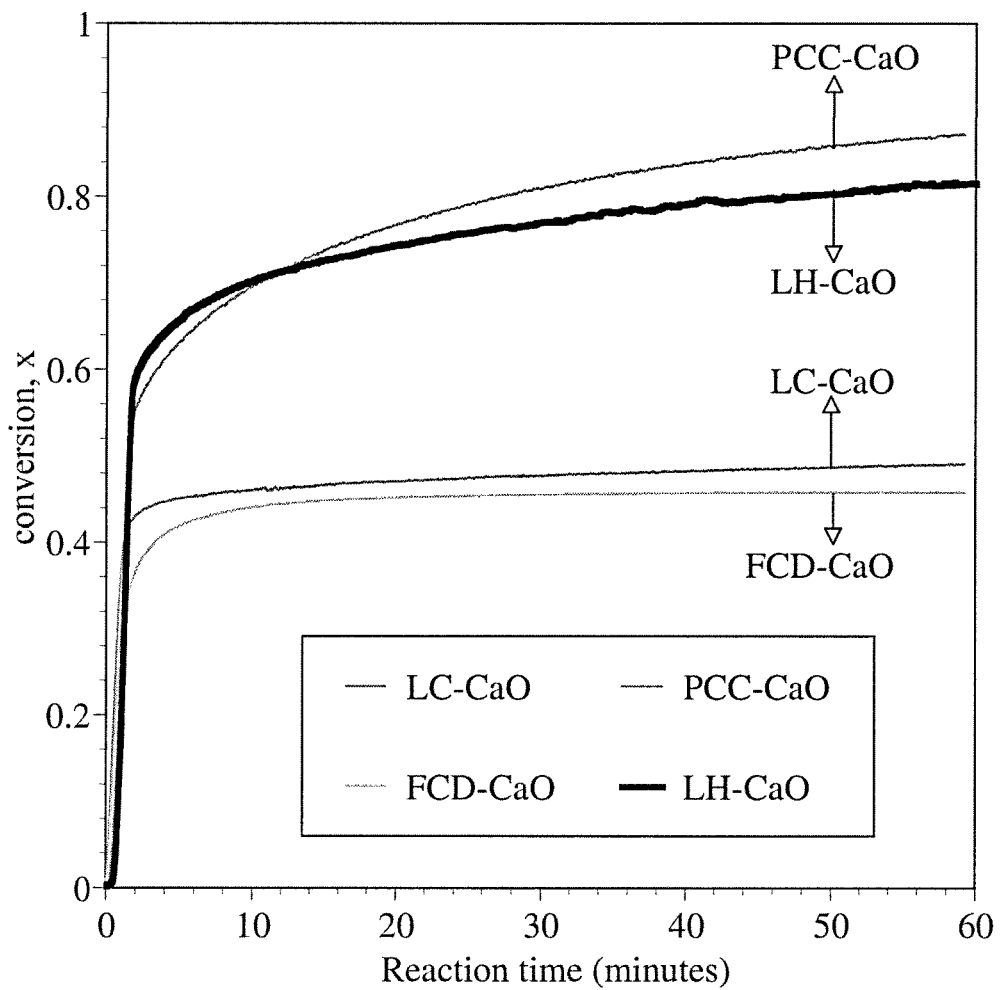
FIG. 8 compares the conversion of four CaO sorbents under pure $CO_2$ at 650° C.
Figure 9:
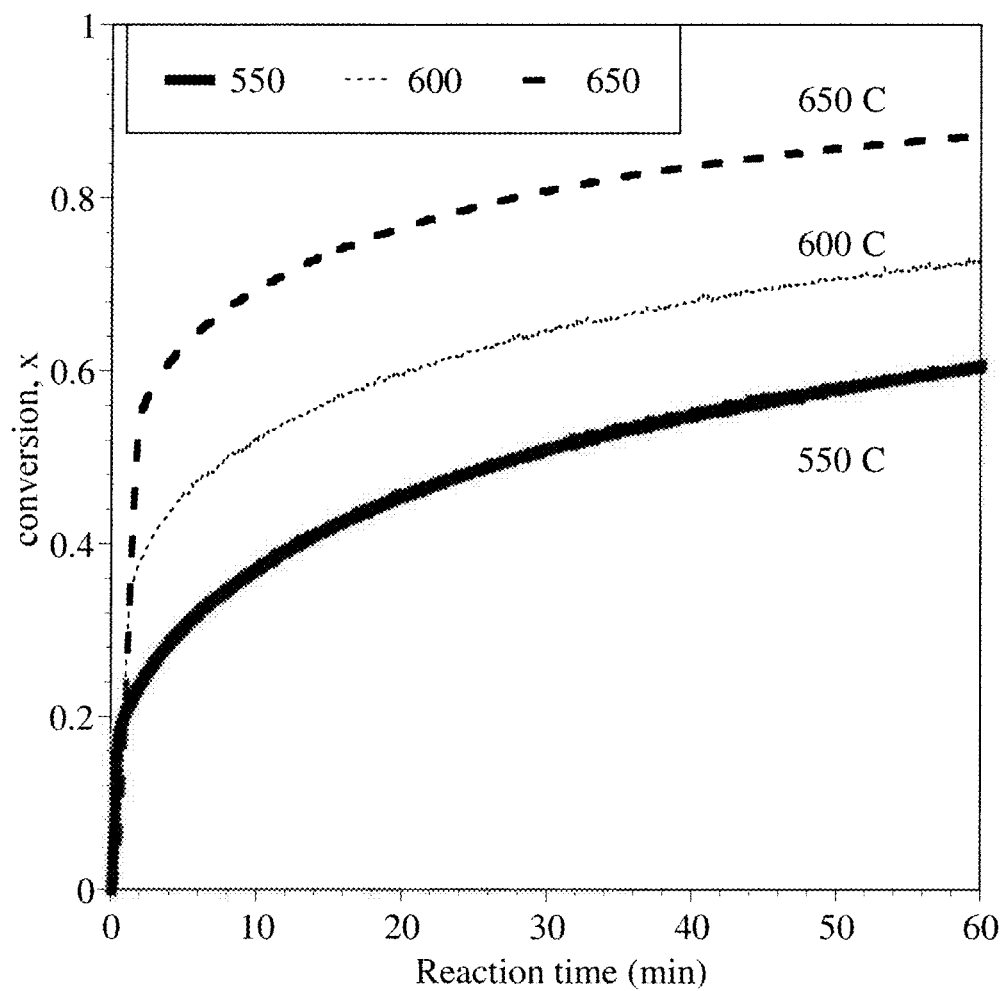
FIG. 9 illustrates the effect of temperature on the carbonation of PCC-CaO.

The performance of these four CaO sorbents was tested in a TGA. The experimental procedure consisted of placing 6-12 mg of the chosen CaO sorbent in a thin layer in a quartz pan to minimize external mass transfer resistances. The sorbent was then heated in flowing nitrogen (5.0 grade, 99.999% pure) to the desired temperature. The representative temperatures used in these experiments were 550° C., 600° C. and 650° C. Once the desired temperature was reached, the flow was switched to 100% CO$_2$ stream. The increase in weight with time was recorded and the conversion of CaO to CaCO$_3$ was calculated from the increase in weight. Only the data obtained at 650° C. is reported here. The performance of the four CaO sorbents, LC-CaO, FCD-CaO, LH-CaO and PCC-CaO at 650° C. is depicted in FIG. 8. Initially, CO$_2$ diffuses into the pores of the LC-CaO and the reaction takes place on the CaO surface provided by the pores. The figure shows that there is a rapid increase in weight in the first 1-2 minutes. The conversion attained in this kinetically controlled regime depends on the initial surface area of the CaO sorbent. LC-CaO and FCD-CaO attained 40-45% conversion, while LH-CaO and PCC-CaO attained about 60% and 54% conversion, respectively, in this regime. After this regime, conversion increases relatively slowly with time. The increase in conversion is only about 2-4% in the next hour for LC-CaO and FCD-CaO. This confirms the susceptibility of micropores to pore filling and pore pluggage described earlier due to the formation of a higher volume product, CaCO$_3$. The trend is not as dramatic for the case of LH-CaO because of its relatively higher initial surface area. The conversion for LH-CaO increases by another 18% in the diffusion controlled regime. However, the increase in conversion for PCC-CaO is about 34-36% more in the second regime. Since the PCC-CaO structure is mesoporous, the formation of CaCO$_3$ product layer is not able to plug all the pore mouths. This in turn allows the heterogeneous reaction to occur on a larger CaO surface. Once the kinetically controlled regime is over, diffusion of ions occurs through a larger area, ultimately leading to a higher conversion of 88-90% for PCC-CaO. FIG. 9 shows the effect of temperature on the carbonation of PCC-CaO. It can be seen that the extent of conversion in the kinetic regime is different at different temperatures. However, unlike LC-CaO, the conversion at any temperature does not seem to taper off and given sufficient time, PCC-CaO is capable of attaining 90% or higher conversion at all of these temperatures.

Cyclic Calcination and Carbonation

Figure 10:
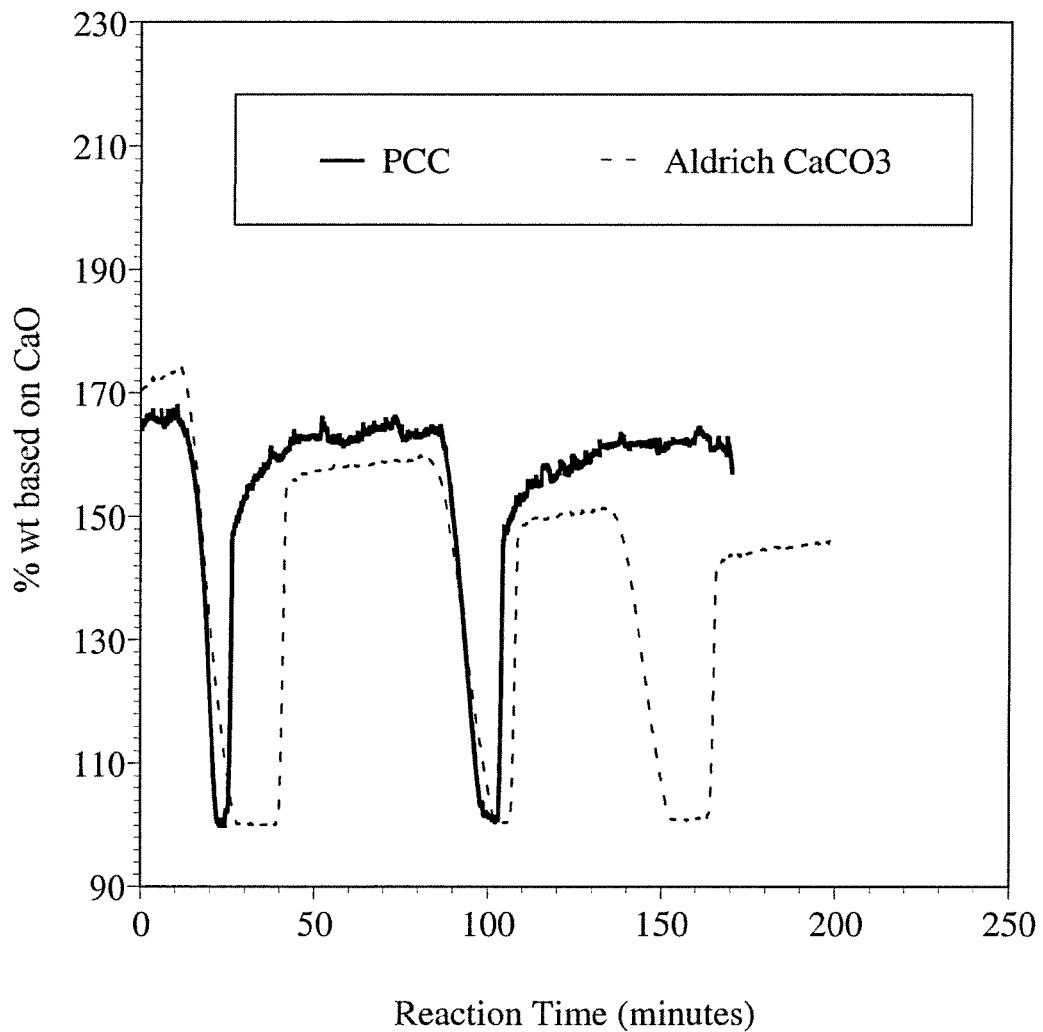
FIG. 10 illustrates the carbonation-calcination cycles on Aldrich $CaCO_3$ and PCC at 700° C.

One of the possible hurdles in the utilization of metal oxides for the carbonation and calcination reaction scheme is its vulnerability to sintering due to the thermal cycling imposed by the cyclical nature of these reactions. Cyclical studies were carried out to quantify any loss in reactivity of these sorbents upon multiple cycles. The temperature chosen for cyclical studies was 700° C. This temperature is sufficient to achieve carbonation in the presence of pure CO$_2$, and also to calcine the CaCO$_3$ so formed after the gas is switched from CO$_2$ to N$_2$. A variety of precursors were first calcined in nitrogen at 700° C. The gas was then switched to pure CO$_2$ and the weight gain continuously tracked. After reaching the ultimate conversion, the gas was switched back to N$_2$. This process was repeated for 2-3 cycles. The data obtained on Aldrich CaCO$_3$ and PCC undergoing this cyclical study is shown in FIG. 10. It can be seen that the reactivity of Aldrich CaCO$_3$ exhibited a gradual decrease even after the first cycle. In contrast, PCC completely regained its mass after the first calcination and carbonation cycle. At 700° C., we can deduce that the conversion is almost complete (>95%). The figure also shows that the reactivity did not decrease in the second cycle either. Under the reaction conditions chosen, any sintering did not seem to adversely affect the sorbent morphology. We continued an extended study of eleven calcination and carbonation cycles lasting over three days on PCC. The data is provided in FIG. 11. It can be seen that the sorbent reactivity remained high and if enough reaction time is provided, the conversion could reach beyond 90% in every cycle. This is a positive result for the structural viability of this sorbent under multiple cycles.

Effect of Vacuum Calcination

Figure 12:
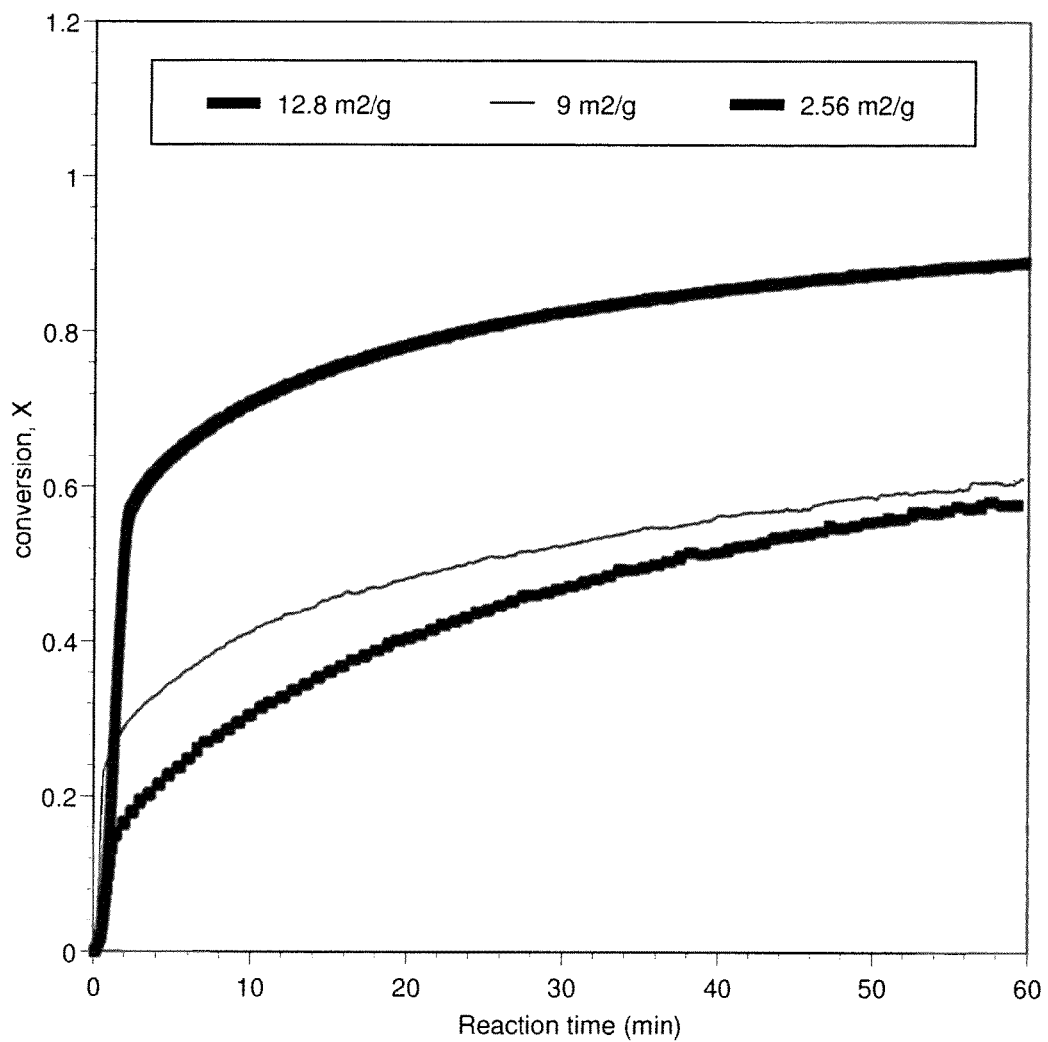
FIG. 12 compares the effect of initial surface area of PCC-CaO to its reactivity towards the carbonation reaction at 700° C.

The effect of initial surface area of CaO sorbents was studied. CaO sorbents were synthesized from PCC under different calcination conditions. The role of surface area on the extent of carbonation is shown in FIG. 12. Different surface area PCC-CaO sorbents were synthesized by the calcination of PCC at a range of calcination temperature to induce varying degrees of sintering. It can be seen that a higher initial surface area (and its associated pore volume) leads to higher reactivity and conversion. Thus, it is necessary to identify calcination conditions that optimize the SA/PV and pore size distribution of PCC-CaO. It has been suggested in literature that CaO procured from the calcination of limestone under vacuum has a higher reactivity. It was observed that under air calcination at 650-800° C., sharp edges of calcite powder were replaced by rounded surfaces and neck areas indicating severe sintering (Beruto, D., and Searcy, A. W., "Calcium oxides of high reactivity." Nature, 1976, 263, 221-222). The resulting CaO structure was highly crystalline as well. In contrast, the sharp edges of calcite were retained in the CaO obtained under vacuum. The CaO however did not possess a high degree of crystallinity. The latter also showed high reactivity towards hydration. Vacuum calcination leads to the formation of a metastable-nanocrystalline calcia structure while calcination in helium atmosphere lead to a stable microcrystalline calcia structure (Dash, S., Kamruddin, M., Ajikumar, P. K., Tyagi, A. K., and Raj, B., "Nanocrystalline and metastable phase formation in vacuum thermal decomposition of calcium carbonate." Thermochimica acta, 2000, 363, 129-135). Beruto et al., [1980] estimated the surface area and pore volume of limestone based CaO to be about 78-89 $m^2/g$ and 0.269 ml/g respectively.

Figure 13:
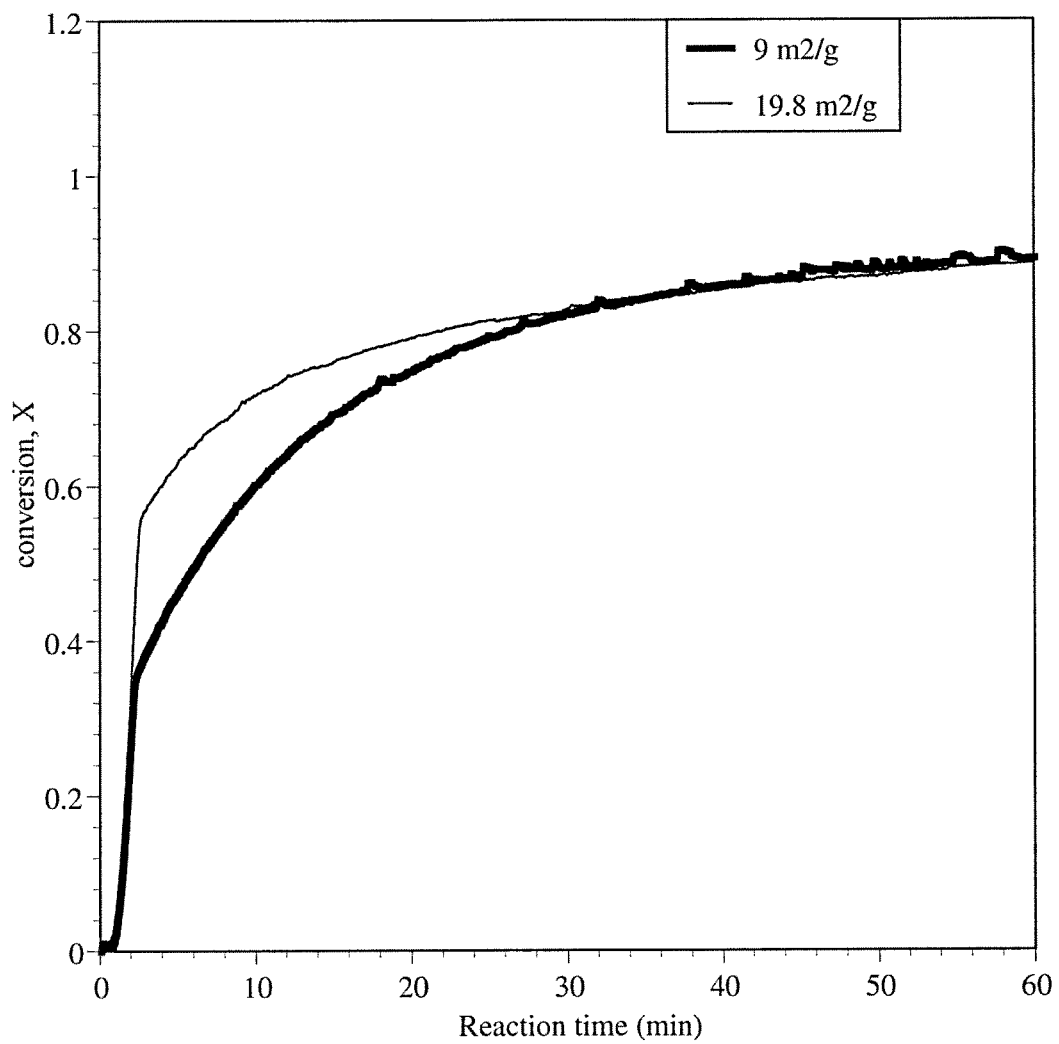
FIG. 13 depicts the effect of vacuum calcination on the reactivity of PCC-CaO towards the carbonation reaction at 700° C.

The effect of vacuum calcination was studied in this process. The surface area of Linwood carbonate increased from 17.79 to 21.93 $m^2/g$ and pore volume from 0.07815 to 0.1117 ml/g for calcination under nitrogen and under vacuum, respectively. Similar enhancements were observed for PCC based CaO sorbents as well. It has been observed that PCC-CaO is susceptible to high degree of sintering and the surface area of the sorbent falls off rapidly. Calcination in nitrogen resulted in surface areas below 13 $m^2/g$ repeatedly. However, vacuum calcination lead to a surface area of 19.84 $m^2/g$ and 0.04089 ml/g pore volume. The carbonation characteristics are shown in FIG. 13.

Vacuum calcination of PCC followed by the carbonation of PCC-CaO was repeated over two cycles. PCC was first vacuum calcined to CaO-1 at 750° C. CaO-1 was carbonated to CC-2 at 700° C. followed by its vacuum decomposition to CaO-2 that is carbonated to CC-3. The values of surface area and pore volume of the sorbent at various stages are provided in Table 3 below:

TABLE 3

Structural properties of Calcium based sorbents undergoing vacuum calcination at 750° C. and carbonation at 700° C.

| | Surface Area ($m^2/g$) | Pore Volume (cc/g) |
|---|---|---|
| PCC | 38.3 | 0.1416 |
| CaO-1 | 12.63 | 0.02409 |
| CC-2 | 6.5 | 0.0103 |
| CaO-2 | 15.93 | 0.04008 |
| CC-3 | 2.361 | 0.004483 |

The data shows that PCC is susceptible to sintering because the CaO obtained in the first cycle has a surface area of only 12.63 m2/g compared to 38.3 m2/g of PCC. As expected, pore filling leads to a drop in both properties when CaO 1 carbonates. The extent of carbonation was beyond 90%. However, it can be seen that the SA of CaO obtained after the second vacuum calcination step, CaO 2, is 15.93 $m^2/g$, which is higher than the SA of CaO 1. The pore volume of CaO 2 is also higher than that of CaO 1. These results prove that there is no systematic decline in SA and PV of sorbents with increasing calcination-carbonation cycles and that this combination is capable of providing a sustained conversion over many cycles.

The article "Carbonation-Calcination Cycle Using High Reactivity Calcium Oxide for Carbon Dioxide Separation from Flue Gas" by Himanshu Gupta and Liang-S. Fan, published on the web Jul. 11, 2002 by *Ind. Eng. Chem. Res.* 2002, 41, 4035-4042 is hereby incorporated in its entirety by reference.

Enhanced Hydrogen Production Integrated with CO2 Separation in a Single-Stage Reactor A variety of chemical processes known to generate syngas include:

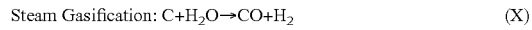

Steam Gasification: $C+H_2O \rightarrow CO+H_2$ (X)

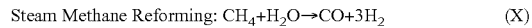

Steam Methane Reforming: $CH_4+H_2O \rightarrow CO+3H_2$ (X)

Partial oxidation of Hydrocarbon: $C_xH_y+O_2 \rightarrow CO+H_2$ (X)

Figure 14:
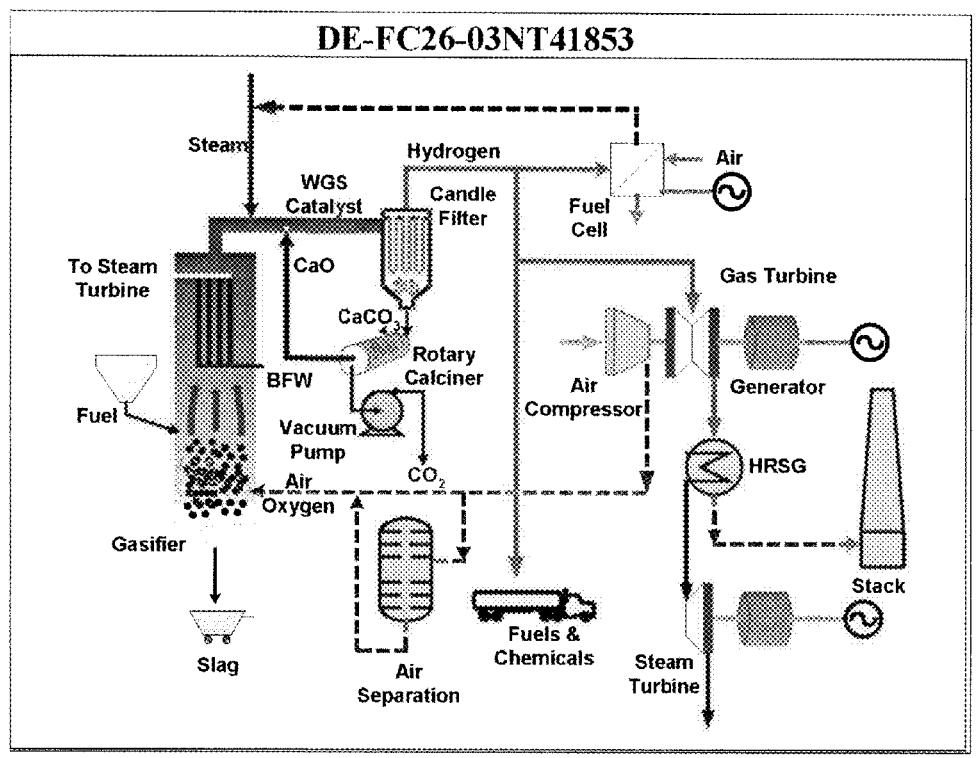
FIG. 14 provides a flow sheet depicting the integration of the current process in the overall coal-gasifier electric production facility.

The flow sheet shown in FIG. 14 integrates the Calcium-based reactive separation process under development in this project with a coal gasifier based electric power/chemical synthesis process plant 140. The main coal gasifier 140a consists of a high pressure and high temperature unit that allows contact between coal 140b, steam 140e and air/pure oxygen 140y in a variety of schemes. Boiler feed water 140d is preheated by passing it through gasifier 140a prior to steam tubine 140c. Waste from the gasifier is collected as slag 140z. Typical fuel gas compositions from various known coal gasifiers are shown in Table 4. Once the water gas mixture is formed at the exit of the gasifier 140a, CaO fines are injected 140f into the gas duct that react with the $CO_2$ present in the gas mixture leading to the formation of solid $CaCO_3$. As the fuel gas flows past the WGS catalyst monoliths 140g, the WGS reaction is effected forming more $CO_2$ in the process. The entrained CaO particles react with the incipiently formed $CO_2$ gas, thereby allowing further catalysis of the WGS reaction to occur. This process can be tailored to attain as high a $H_2$ concentration as possible. At the exit of the WGS reactor, the reacted $CaCO_3$ particles are captured using a high temperature solids separator 140h (e.g., a candle filter or a high temperature ESP) and separated fuel gas stream. The spent solids are now sent to a rotary calciner 140k to thermally decompose the $CaCO_3$ 140j back to CaO 140f and pure $CO_2$ 140m. The high purity $CO_2$ gas can now be economically compressed 140l, cooled, liquefied and transported for its safe sequestration 140m. The rotary calciner allows the calcium particles to remain segregated, which is crucial in maintaining a sorbent structure characterized by a higher porosity. It was previously observed in our studies that heaping of calcium sorbents leads to a lower porosity and consequently a lower reactivity over the next carbonation cycle. The calcination of the sorbent can also be effected under sub-atmospheric conditions that allow the removal of $CO_2$ as soon as it is formed from the vicinity of the calcining sorbent, thereby aiding further calcination. This vacuum can be created by means of ejector systems that are widely used in maintaining vacuum in large vacuum distillation units (VDU) in the petroleum refining industry. Lock and hopper combinations and appropriate seals ensure that the sorbent can be effectively separated from the CO₂ stream and re-entrained in the fuel gas duct. The hydrogen enriched fuel gas 140i can now be used to generate electric power in a fuel cell 140n or used to make fuels and chemicals 140q without any low temperature clean up. The fuel cell may receive a supply of air 140p and discharge steam 140o. The hydrogen enriched fuel gas may be sent to gas turbine 140r used to drive generator 140t to produce electricity and air compressor 140s to produce a stream of compressed air. The stream of compressed air may be sent to air separator 140x to produce the air/oxygen of 140y. The discharge from gas turbine 140t may be sent through heat exchanger 140u prior to being discharged at stack 140v. The absorbed heat may be collected by steam turbine 140w to produce additional electricity.

Thermodynamic Analysis

Primarily three important gas-solid reactions can occur when calcium oxide (CaO) is exposed to a fuel gas mixture obtained from coal gasification. CaO can undergo hydration, carbonation and sulfidation reactions with $H_2O$, $CO_2$ and $H_2S$, respectively. These can be stoichiometrically represented as:

Hydration: $CaO + H_2O \rightarrow Ca(OH)_2$      (5)

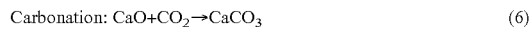

Carbonation: $CaO + CO_2 \rightarrow CaCO_3$      (6)

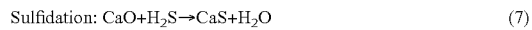

Sulfidation: $CaO + H_2S \rightarrow CaS + H_2O$      (7)

All these reactions are reversible and the extent of each of these reactions depends on the concentrations of the respective gas species and the reaction temperature. Detailed thermodynamic calculations were performed to obtain equilibrium curves for the partial pressures of $H_2O(PH_2O)$, $CO_2$ ($PCO_2$) and $H_2S$ ($PH_2S$) as a function of temperature, for the hydration, carbonation, and sulfidation reactions using HSC Chemistry v 5.0 (Outokumpu Research Oy, Finland). The equilibrium calculations were based on the fuel gas compositions that are typical of the different types of coal gasifiers. The details of the fuel gas mixtures are illustrated in Table 4.

TABLE 4

Typical fuel gas compositions obtained from different gasifiers. (Stultz and Kitto, 1992)

| | Moving Bed, dry | Moving Bed slagging | Fluidized Bed | Entrained Flow, slurry | Entrained Flow, dry |
|---|---|---|---|---|---|
| Oxidant | air | Oxygen | Oxygen | Oxygen | Oxygen |
| Fuel | Sub Bituminous | Bituminous | Lignite | Bituminous | Bituminous |
| Pressure (psi) | 295 | 465 | 145 | 615 | 365 |
| CO | 17.4 | 46 | 48.2 | 41 | 60.3 |
| H₂ | 23.3 | 26.4 | 30.6 | 29.8 | 30 |
| CO₂ | 14.8 | 2.9 | 8.2 | 10.2 | 1.6 |
| H₂O | . . . | 16.3 | 9.1 | 17.1 | 2 |
| N₂ | 38.5 | 2.8 | 0.7 | 0.8 | 4.7 |
| CH₄ + HCs | 5.8 | 4.2 | 2.8 | 0.3 | . . . |
| H₂S + COS | 0.2 | 1.1 | 0.4 | 1.1 | 1.3 |

Figure 15A:
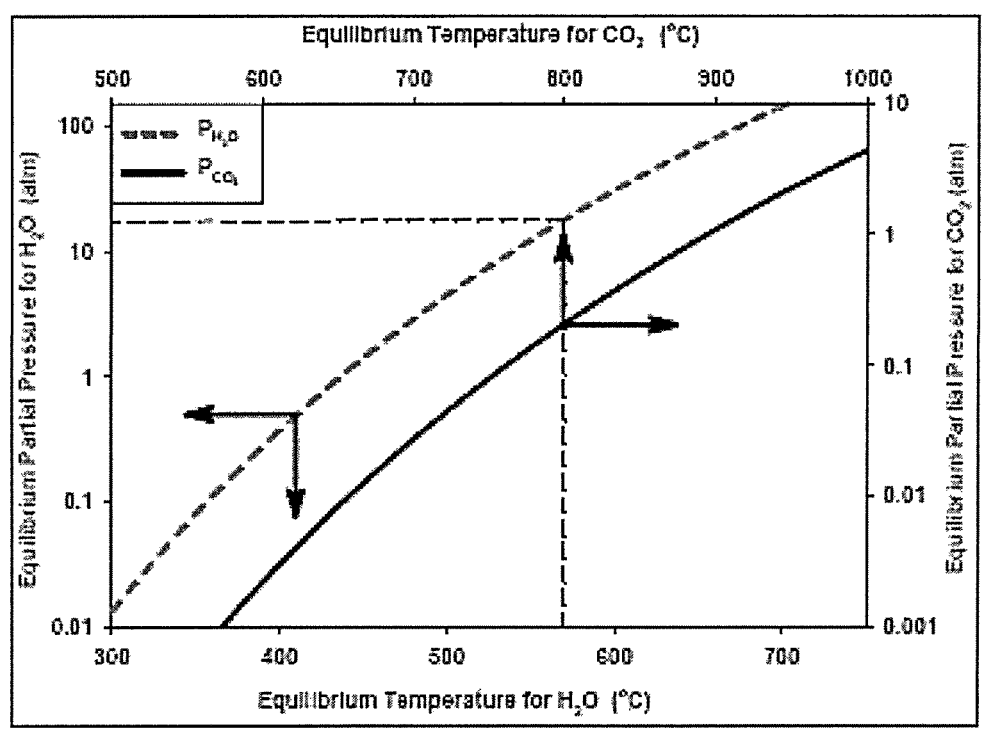
FIG. 15a illustrates thermodynamic data for predicting the temperature zones for hydration and carbonation of CaO.
Figure 15B:
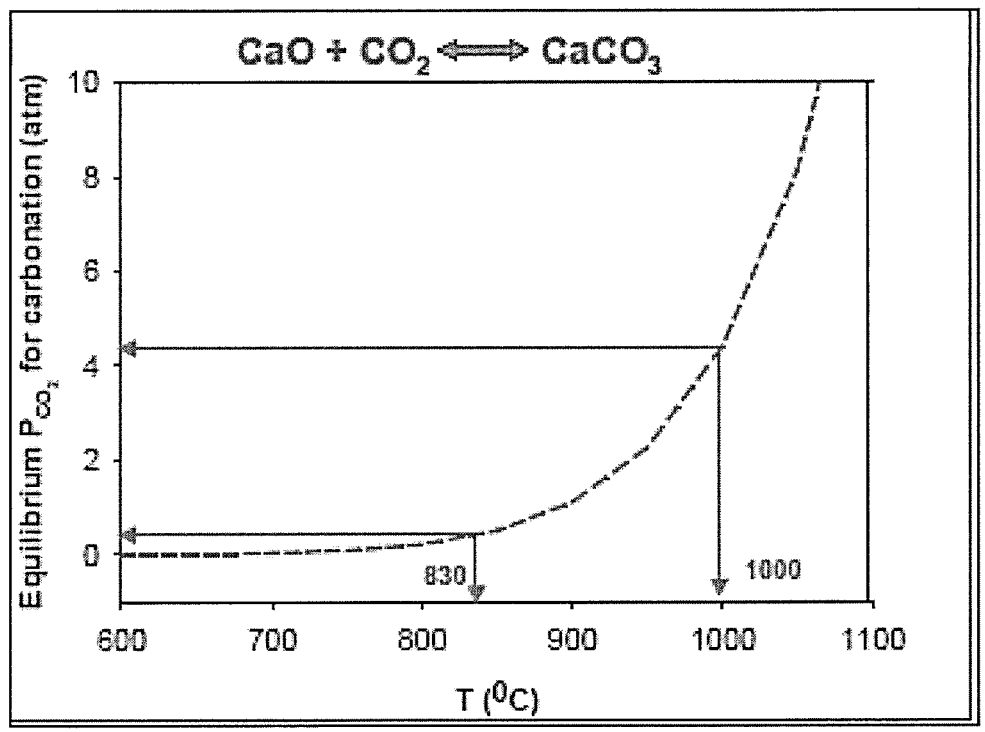
FIG. 15b illustrates the typical equilibrium $CO_2$ partial pressures ($PCO_2$) as a function of temperature.
Figure 16:
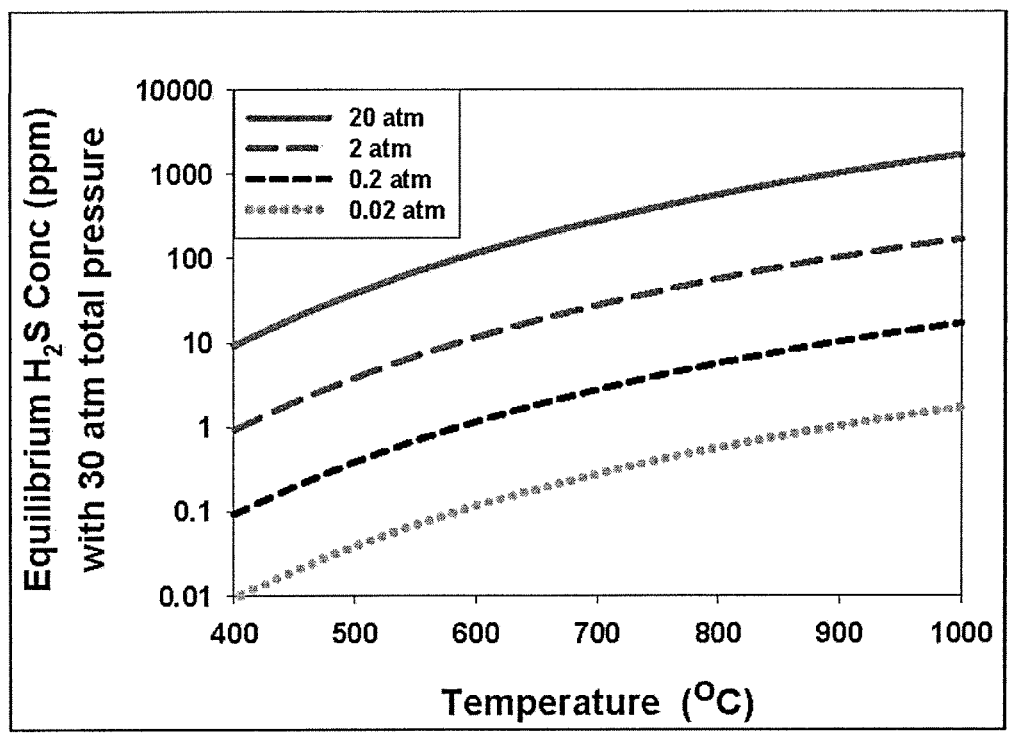
FIG. 16 illustrates thermodynamic data for predicting the equilibrium H2S concentration for CaO sulfidation with varying steam concentration (PTotal−1 atm).

The relationship between the reaction temperature and the equilibrium partial pressures of $H_2O$ and $CO_2$ for the hydration and carbonation reactions are shown in FIG. 15(a). For a typical gasifier moisture composition ranging from 12-20 atm ($PH_2O$) the hydration of CaO occurs for all temperatures below 550-575° C., respectively. By operating above these temperatures, the CaO-hydration can be prevented. FIG. 15(b) shows the typical equilibrium CO₂ partial pressures ($PCO_2$) as a function of temperature. From the data in Table 4, it can be inferred that the typical PCO2 in the gasifiers ranges from 0.4-4.3 atm for entrained flow (slurry) and entrained flow (dry) gasifier systems respectively. The equilibrium temperatures corresponding to those $PCO_2$ lie in the 830-1000° C. range as shown in FIG. 15(b). Thus, by operating below these temperatures, we can effect the carbonation of CaO. For the reversible sulfidation of CaO (eqn 7) the thermodynamic calculations depend on the concentration of moisture in the system. Hence, FIG. 16 depicts the equilibrium $H_2S$ concentrations in ppm for varying moisture concentrations ($PH_2O$) and 30 atm total pressure. For a typical operating temperature range of 800-1000° C. the equilibrium $H_2S$ concentration is between 5700-1700 ppm respectively for 20 atm $PH_2O$. Consequently, at 800° C. we need more than 5700 ppm $H_2S$ for the sulfidation of CaO to occur. This number changes to 570 ppm for a $PH_2O$ of 2 atm at 800° C. Thus, by changing the moisture/steam concentration in the system we can prevent the sulfidation of CaO from occurring.

Experimental

Sorbent and Catalyst Characterization

The high and low temperature water gas shift (WGS) reaction catalysts were procured from Süd-Chemie Inc., Louisville, Ky. The high temperature shift (HTS) catalysts comprises of iron (III) oxide supported on chromium oxide. Precipitated calcium carbonate (PCC) was synthesized by bubbling CO2 through a slurry of hydrated lime. The neutralization of the positive surface charges on the $CaCO_3$ nuclei by negatively charged N40V® molecules forms $CaCO_3$ particles characterized by a higher surface area/pore volume and a predominantly mesoporous structure. Details of this synthesis procedure have been reported elsewhere (Agnihotri et al., 1999). Hydrated lime from a naturally occurring limestone (Linwood Hydrate, LH) and a naturally occurring limestone (Linwood Carbonate, LC) was obtained from Linwood Mining and Minerals Co.

The sorbents and catalyst were analyzed to determine their morphologies using a BET analyzer. The BET surface areas, pore volumes, and pore size distributions of the catalysts and sorbents were measured at −196° C. using nitrogen as the adsorbent in a Nova 2200 Quantachrome BET analyzer. Special care was taken to ensure that all samples were vacuum degassed at 250° C. for 5 hours prior to BET analysis.

WGS Reactor Setup

Figure 17:
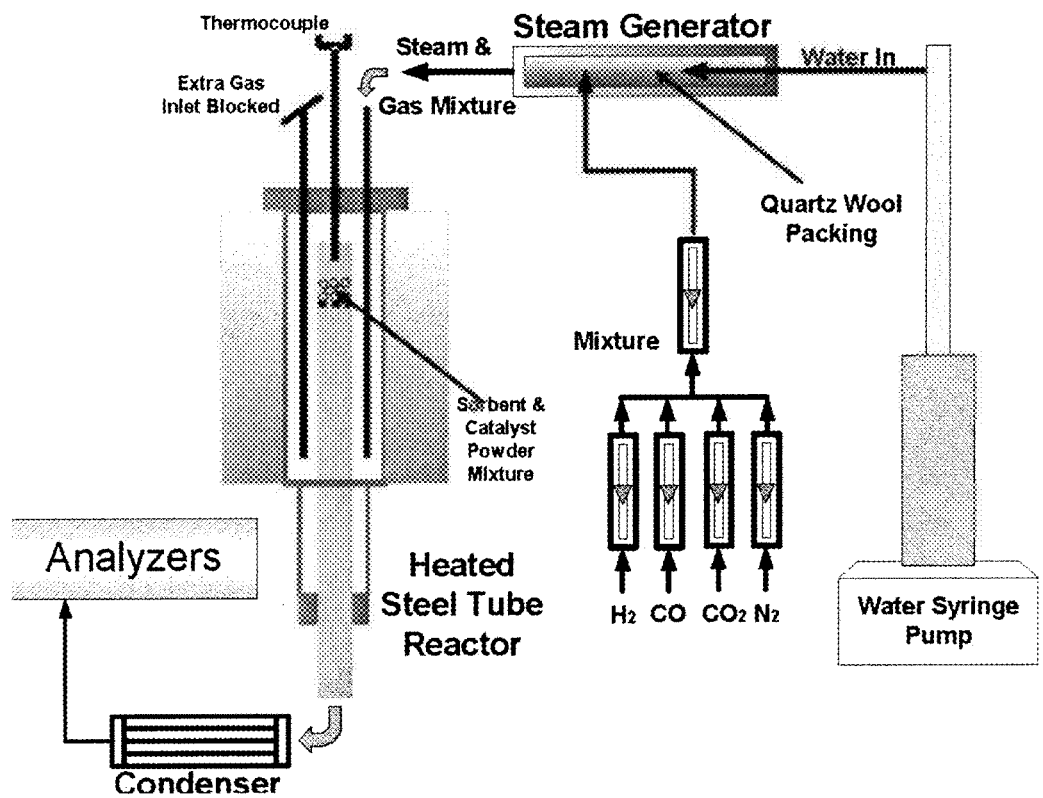
FIG. 17 shows a modified reactor set-up with steam generating unit for investigating WGS and carbonation reactions.

A reactor setup was designed, underwent several iterations and was assembled to carry out water gas shift reactions in the presence of CaO and catalyst. The reactor design assembly used to carry out these experiments is shown in FIG. 17. This setup enables us to carry out both the water gas shift reaction in the presence of CaO as well as the regeneration of the sorbent in flowing gas such as nitrogen and/or steam. The setup 170 consists of a tube furnace 170p, a steel tube reactor 170a, a steam generating unit 170c, a set of gas analyzers for the online monitoring of CO and CO₂ concentrations 170n, a condenser 170m to remove water from the exit gas stream and a high pressure water syringe pump 170b.

All the reactant gases ($H_2$, CO, $CO_2$, and $N_2$) are metered using modified variable area flowmeters 170e-h respectively. The syringe pump is used to supply very accurate flow-rates of water into the heated zone of the steam-generating unit in the 0.01-0.5 ml/min range. Once the steam is generated, it is picked up by the CO/N₂ gas mixture 170i and enters the main reactor where the sorbent/catalyst mixture 170o is loaded. All the lines connecting the steam-generating unit to the main reactor are heated using heating tapes. The steam generator is also packed with quartz wool 170*d* in order to distribute the water drops as they enter into the heating zone. The packing is utilized in order to provide greater surface for water evaporation and to dampen out fluctuations in steam formation. The main problem with a fluctuating steam supply is that the gas analyzers used to measure the exit CO and $CO_2$ concentrations are sensitive to gas flow rates. Even though the steam is being condensed out before the gas is sent into the analyzers, surges in the steam supply still affect the overall gas flow rate, causing the CO and $CO_2$ readings to fluctuate. The packing ultimately ensures a more continuous and constant overall gas flow rate into the main reactor and into the analyzers. Thermocouple 170*k* is used to monitor the temperature inside reactor 170*a*. Any extra gas inlets of reactor 170*a* are blocked 170*l*.

A steel tube reactor is used to hold the Ca-based sorbent and catalyst, and is kept heated using a tube furnace. The sorbent loading unit of the reactor is detachable which enables easy removal and loading of the sorbent and therefore minimizes the sorbent loading time between runs. Also, the sorbent can be changed without having to cool down the entire reactor. The gas mixture 170*j* entering the reactor is preheated to the reaction temperature before contacting the sorbent/catalyst particles. The gases exiting the reactor first flow through a condenser in order to separate out the moisture and then to a set of gas analyzers.

Sub Atmospheric Calcination Reactor Setup

Figure 18:
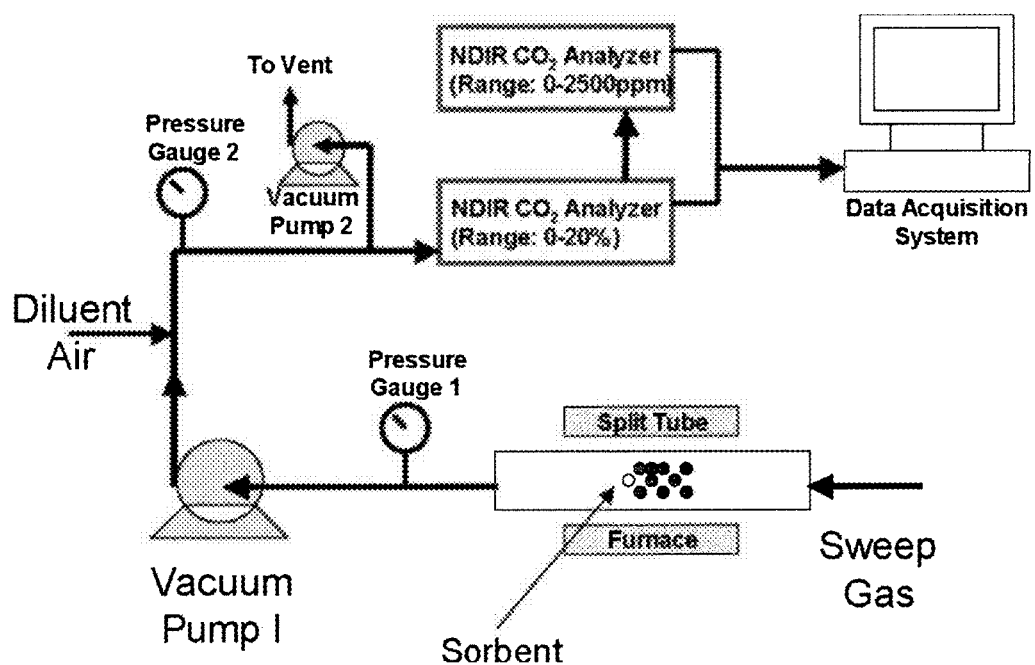
FIG. 18 illustrates the set-up for combined vacuum/sweep gas calcination experiments allowing the use of larger sorbent samples.

Once the Calcium based sorbent has reacted with the $CO_2$ being produced by the WGSR, the sorbent has to be regenerated for further use in subsequent cycles. During the regeneration of the sorbent, carbon dioxide is released from the sorbent. In order to minimize the necessity for further treatment of this released $CO_2$ before sending it to sequestration sites, it is necessary to regenerate the sorbent such that a pure stream of $CO_2$ is released. Vacuum calcination provides one method for ensuring that concentrated streams of $CO_2$ are release in the regeneration phase. The detailed setup is shown in FIG. 18. This setup 180 was assembled to handle the regeneration of large quantities of sorbent (~10-20 g per batch). The setup includes an alumina tube reactor 180*b*, which would hold the sorbent samples in a split tube furnace 180*c* that provides the heat necessary to calcine the sorbent 180*d*, two Non Dispersive Infra Red (NDIR) analyzers 180*k-l* to monitor the $CO_2$ concentration (ranges 0-2500 ppm and 0-20%) and two vacuum pumps 180*f* and 180*i*. 10 g of sorbent yields about 2.4 L of $CO_2$ at atmospheric pressure and temperature over the entire decomposition process. This gas needs to be diluted with air in order to ensure that the $CO_2$ concentration lies in the detection range of the $CO_2$ analyzers. Vacuum Pump 180*f* is a dry vacuum pump procured from BOC Edwards capable of achieving vacuum levels as low as 50 mtorr and gas flowrates of 6 m³/hr. The CO2 analyzers have their own inbuilt pumps and are capable of drawing up to 2 LPM from the header for online CO2 analysis. The second pump 180*i* is a smaller dry pump and is put in place to ensure that there is no pressure buildup in the ¼" lines connecting the vacuum pump to the analyzers. Pump 180*i* discharges to vent 180*j*. The temperature of the furnace is controlled with a thermocouple inserted into the central zone of the furnace. The temperature of the reactor was also monitored using a second thermocouple inserted into the center of the alumina tube. The setup is also capable of combining vacuum calcination with flow of sweep gas 180*a*. As it may not be feasible to supply very low vacuum levels for the calcination of the sorbent in industrial settings, it may be necessary to study the calcination process in combination with the addition of various sweep gases such as N2/steam. Pressure gauges 180*e, h* and volumetric flow meters are included to monitor the vacuum pressure in the reactor, the pressure in the ¼" lines and the flows of the sweep gases into the calciner and the flow of the air 180*g* used in the dilution of the exhaust $CO_2$ before sending it to the analyzers. The analyzers are also connected to a data acquisition system 180*m* that can record analyzer readings every second.

Introduction

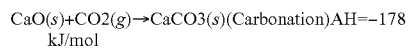

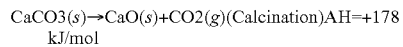

Thermodynamics of Calcination

Figure 1:
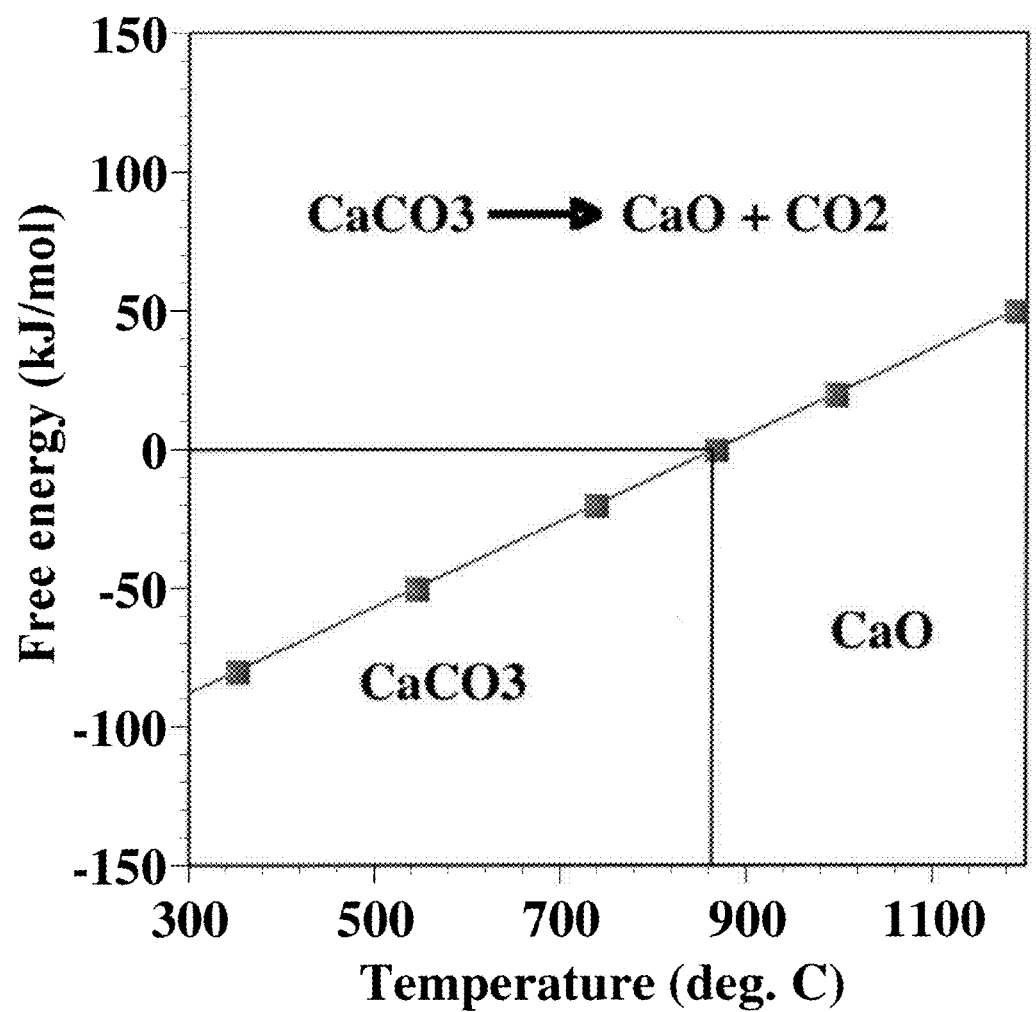
FIG. 1 depicts the Gibbs Free Energy diagram for the carbonation reaction, $CaCO_3 \rightarrow CaO+CO_2$, as a function of temperature.

The thermodynamics of calcination, evaluated by HSC chemistry software, is represented in the form of equilibrium partial pressure of CO2 as a function of temperature (FIG. 1). It indicates that carbonation is favored under process conditions above the curve and calcination occurs at conditions below the equilibrium curve.

It has been amply demonstrated that the ultimate CO2 capture capacity (W) of most sorbents employed at high temperature monotonically falls with increasing number of CCR cycles (Abanades and Alvarez, 2003, Iyer et al., 2004). While numerous studies have been conducted on the carbonation reaction to detail the sorbent reactivity, kinetics, mechanism and its mathematical modeling, sufficient emphasis has not been placed on the calcination process, as it relates to this CO2 separation process. Current calciner designs primarily involve the combustion of fuel with air inside the rotating tube to supply the sensible heat and heat of calcination directly. The exiting gases, still dominated by nitrogen, are enriched in $CO2_i$ which is released from the calcining limestone. However, this design is not amenable to generating a pure CO2 stream. It is thus imperative that the calcination designs and methods be optimized to maintain the sorbent structure to maximize reactivity, in a way that the purity of the eventual CO2 stream is not compromised.

Calcination Configurations

The CCR scheme can be carried out in two modes of operation viz. temperature and pressure swing and any combination thereof. Calcination can be induced by either increasing the temperature of the carbonated product or by reducing the PCO2 in the calciner such that the process conditions fall below the thermodynamic equilibrium curve. FIG. 2 shows various configurations of the calciner operation which detail the mode of heat input to the calciner. The usage of air in FIG. 2(*a*) represents direct calcination, which is representative of the commercial calcination process mentioned earlier. However, a similar reactor design can be implemented in the CCR scheme if pure oxygen is used in place of air. The fuel would then form only CO2 and H2O due to its combustion. The released CO2 from reacted product and the CO2 from the fuel combustion. can now be further purified by a simple condensation and removal of steam. Depending on the fuel used for the direct calcination, other trace gases such as SOx and NOx may be emitted, necessitating further control technologies. In particular, make-up calcium would be necessary to replace the sorbent consumed by SO2 in the calciner (Iyer et al., 2004)

Alternatively, in the absence of pure oxygen, the heat of calcination can be supplied indirectly as shown in FIG. 2(*b*). The addition of heat will induce calcination, which leads to CO2 buildup in the calciner. However, the flow of CO2 out of the reactor is possible only if the PCO2 becomes greater than 1 bar. Thermodynamically, Pco2 becomes greater than 1 bar only above 890° C. It is well known that high temperatures cause sorbent sintering, which reduces its porosity, thereby leading to a drastic reduction in reactivity. Pressure swing mode of operation enables lowering of the calcination temperature to circumvent the sintering problem. A lower PCO2, required by pressure swing operation, is achieved by either dilution of evolved CO2 or by an overall reduction in pressure of the calciner. For example, a reduction in PCO2 below 0.0272 bar would lower the calcination temperature to below 700° C. Lowering PCO2 can be accomplished by flowing diluent gas through the calciner. However, only steam is an acceptable diluent gas since any other gas such as air, nitrogen, etc. will mix with the evolved CO2 defeating the overall objective of isolating a pure CO2 stream. The reduction in overall calciner pressure, while maintaining 100% pure C02, can be achieved using a vacuum pump which removes CO2 as it evolves from calcination.

Literature Review

Past literature studies have shown that CaO resulting from the calcination under vacuum has a higher reactivity. Beruto and Searcy (1976) observed highly crystalline CaO structure characterized by rounded surfaces and neck areas indicative of severe sintering under air calcination at 650-800° C. In contrast, the sharp edges of calcite were retained in the CaO obtained under vacuum. However, this CaO did not possess a high degree of crystallinity and showed high reactivity towards hydration. Dash et al., (2000) also observed a metastablenanocrystalline calcia under vacuum as opposed to the formation of stable microcrystalline calcia under helium. Beruto et al., (1980) estimated the surface area and pore volume of limestone based CaO to be about 78-89 m$^2$/g and 0.269 ml/g respectively. Ingram and Marrier (1963) reported that the rate of reaction varies linearly with the difference between equilibrium partial pressure and the partial pressure of CO2 surrounding the solid. This further supports the need for sub-atmospheric calcination.

Rao et al. (1989) used thermo-gravimetric reaction data aloni with a grain model to arrive at the reaction rate constant expression of $1.18 \times 10^3 \exp(-1.85 \times 10/RT)$. Samtani et al. (2002) investigated the kinetics of calcite decomposition under an atmosphere of N2 and determined an activation energy of 192.5 kJ/mol and an 1 nA of 20.73 (where A is the pre-exponential value of the Arrhenius rate law). Calcite was determined to undergo a zero-order decomposition mechanism, and further investigation into the effect of flow rate, heating rate and sample size did not yield any deviation in the kinetic parameters and mechanism of the process.

Steam enhances calcination due to better thermal properties compared to air and possible catalysis of the reaction. Berger (1927) showed a 30% increase in calcination rate due to steam compared to air in the 600-1000° C. Further, the CaO resulting from steam calcination exhibited higher rates of slaking, indicating a higher reactivity product compared the CaO obtained from air calcination. MacIntire and Stansel (1953) obtained complete calcination at 700° C. as opposed to only 1.6% in air. The catalytic effect of steam, attributed to an activated calcium bicarbonate intermediate species, was responsible for a 20% increase in calcination rate at 834° C. (Terry and McGurk (1994)). Wang and Thompson (1995) hypothesized that the catalysis by steam occurs by the surface adsorption of H2O that weakens the CaO-CO2 bond. Dynamic XRD studies indicated a 35% increase in conversion due to an addition of 0.77% steam over that in dry helium.

This study demonstrates the role of calcination temperature, level of vacuum, thermal properties of diluent gas, effect of diluent flow, on the kinetics of calcination and the morphology of the resultant CaO sorbent. Previous studies have detailed the development of structurally altered precipitated calcium carbonate (PCC) sorbent which shows higher reactivity than CaO obtained from the calcination of naturally occurring limestone (Gupta and Fan, 2002).

Experimental

Reactor Design for Sub-Atmospheric Calcination

Rotary Vacuum Calciner

An important objective of this CO2 separation technology is to yield a pure/concentrated stream of CO2 during the calcination process. Vacuum calcination provides one method for meeting this objective. An indirect electrically heated rotary calciner was designed to carry out the necessary calcination studies. The calciner design and setup have undergone a number of modifications however FIG. 3 depicts the final setup which incorporates various aspects of prior configurations. The reactor setup as shown in FIG. 3 was assembled to handle a wide range of calcination conditions such as the calcination of 0.5-20 g sorbent samples under a variety of vacuum, vacuum+sweep gas conditions and calcination temperatures of up to 950° C. Since early experiments had shown that sorbent heaping affects both the calcination kinetics as well as sorbent morphology, the reactor was designed to allow the calcination to take place under rotary motion which disperses the sorbent thereby minimizing sorbent heaping.

A quartz tube reactor was used to carry out calcination kinetic studies. The reactor tube was designed to have a conical shaped tapered central zone in order to keep the particles from dispersing axially away from the heated zone. Baffles were incorporated to ensure particle dispersion. The reactor was placed on two sets of rotary rollers, and was attached to a motor via a rubber belt mechanism. An electric split tube furnace was used to provide the necessary heat of calcination. Rotary seals enabled the rotation to take place while maintaining the desired level of vacuum level in the reactor tube. A vacuum level of −28 in Hg was achieved in this configuration. The gas exiting the calciner was further diluted with air in order to ensure that the CO2 concentration fell in the detection range of the CO2 analyzers. A dry vacuum pump (Vacuum Pump 1) procured from BOC Edwards capable of achieving vacuum levels as low as 50 millitorr and gas flowrates of 6 m'/hr was used to supply the necessary reactor vacuum level. The second pump in the setup is a smaller dry pump and was put in place to ensure that there was no pressure buildup in the '/+" lines connecting the vacuum pump to the analyzers. Two Non Dispersive Infra Red (NDIR) analyzers were used to monitor the CO2 concentration (ranges 0-2500 ppm and 20%). These C02 analyzers have their own inbuilt pumps and are capable of drawing upto 2 LPM from the header for online CO2 analysis. The temperature of the furnace was controlled with a thermocouple inserted into the central zone of the furnace. The temperature of the reactor was monitored using a second thermocouple inserted into the center of the quartz/alumina tube. Pressure gauges and volumetric flow meters are included to monitor the vacuum pressure in the reactor, the pressure in the '/," lines and the flows of the sweep gases into the calciner and the flow of the air used in the dilution of the exhaust CO2 before sending it to the analyzers. The analyzers are also connected to a data acquisition system that can record analyzer readings every second.

The calcination studies were performed to investigate the role of calcination temperature, level of vacuum, thermal properties of sweep gas and effect of gas flow on the kinetics of calcination and the morphology of the resultant CaO sorbent. Experiments were also performed to compare the calcination kinetics of PCC and LC and also to investigate the role of sorbent heaping as it relates to scale-up considerations of the calciner.

Results and Discussion

Effect of Temperature

Sweep gas is necessary to aid calcination. Prior experiments carried out under high vacuum conditions in the absence of sweep gas revealed a longer time for calcination. Experiments were performed to determine the possibility of performing sub-atmospheric calcination in combination with the flow of gas. PCC and LC samples of 0.5 g were calcined with a sweep N2 gas flow of 50 ml/min under 25" Hg vacuum. FIGS. 4 and 5 show the conversion plots for LC and PCC at temperature ranges of 700° C. to 750° C. The resulting plots show that the calcination time for PCC is much lower than that for the naturally occurring LC. At 700° C. PCC takes about 2000 seconds to fully calcine whereas LC takes ~3500 seconds. Faster calcination kinetics essentially translates to energy savings in the calcination process which is yet another advantage of PCC.

Effect of Vacuum Level

Further studies were performed to determine the effect of vacuum on the kinetics of calcination. The kinetic conversion versus time plots curves were obtained for 0.5 g PCC at vacuum levels of 10", 15", and 25" Hg vacuum with N2 sweep flows of 50 ml/min. The results are plotted in FIG. 6 and clearly show that higher vacuum levels translate to faster calcination times.

Effect of Diluent Flow rate

It can be observed from FIG. 7 that the calcination time required for larger samples under pure vacuum conditions is too long. The heat of calcination under these conditions is predominantly supplied by radiative means. However, the addition of heat to the calcining sorbent through convective means also helps accelerate calcination. This is accomplished through the use of a preheated diluent gas flow over the calcining sorbent. FIG. 7 shows the effect of flow rate of diluent helium gas on the calcination behavior. It indicates that in the absence of diluent flow, we achieve only 78% calcination in 2000 s. In contrast a steady diluent flow of 120 ml/min attains ~93% in 2000 s. As the diluent flow is increased to 500 ml/min, 90% calcination occurs within 1200 s. It is also useful to note that an increase in diluent flow to 1000 ml/min does not decrease the heat transfer resistance significantly.

Effect of Diluent Type

Calcination experiments in the presence of different diluent gases were carried out to establish the influence of thermal properties (thermal conductivity, heat capacity) of gases on the calcination process. For example, at 1000K the thermal conductivity of He (0.354 W/m·K) is higher than that of N2 (0.0647 W/m·K) (Perry and Chilton, 1997), which could lead to a difference in the calcination rate FIG. 8 indicates the influence of helium, nitrogen and argon on the calcination of 10 g samples of Linwood carbonate. It can be observed FIG. 8 that helium indeed causes a faster calcination. In a commercial operation, we cannot use these particular gases because the gas mixture exiting the calciner will consist of C02, which is evolved from the calcination process and these diluent gases, thereby defeating the overall purpose of isolating a pure C02 stream. However, these experiments lay a foundation for the potential use of higher thermal conductivity gases such as steam (0.0978 W/m·K). Steam has the added advantage of ease of separation from steam/CO2 mixtures by its removal by condensation.

Results and Discussions

Catalyst and Sorbent Characterization

Figure 19:
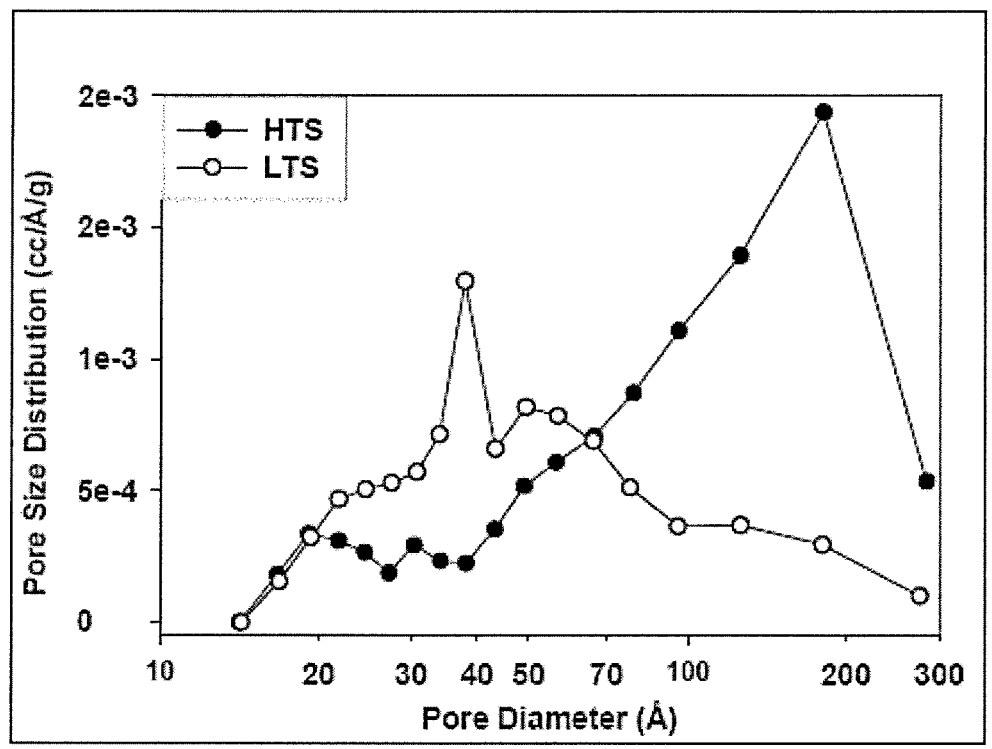
FIG. 19 is a pore size distribution of the HTS and LTS obtained from BET analysis.

The characterization of the high temperature shift (HTS) catalyst in a BET analyzer revealed that the catalyst has a BET surface area of 85 m$^2$/g and a total pore volume of about 0.3 cc/g. The majority of the pores were found to occur around 180 Å as evident from the maximum in its pore size distribution plot shown in FIG. 19. In contrast, the low temperature shift (LTS) catalyst has a BET surface area of 52 m$^2$/g and a total pore volume of about 0.1 cc/g. The majority of these pores were found to occur around 37 Å as evident from the maximum in its pore size distribution plot (FIG. 19).

Figure 20:
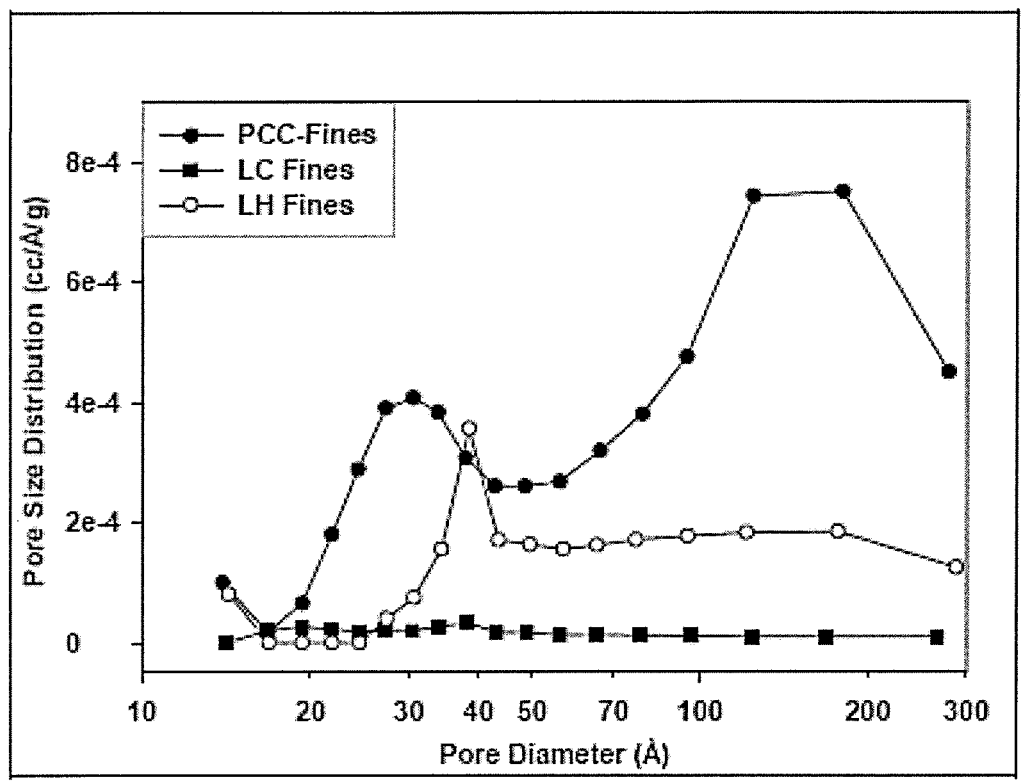
FIG. 20 shows the pore size distribution of various calcium oxide precursors.

The surface area (SA) and pore volume (PV) of the three different CaO precursors are provided in Table 5. FIG. 20 shows the pore size distribution (PSD) of these precursor fines. It can be seen that LC fines do not have high SA/PV. However, upon calcination and subsequent hydration, the SA/PV of the calcium hydroxide (LH) fines increase as can be observed for the LH sample. The porosity is maximized in the microporous range (30-50 Å range). In contrast, the SA/PV of the morphologically altered PCC are much higher. Further, most of the porosity lies in the 100-300 Å range.

TABLE 5

Morphological properties of the natural and synthesized CaO precursors and the HTS catalyst obtained from BET analyses.

| Sorbent | Surface Area (m2/g) | Pore Volume (cc/g) |
|---|---|---|
| Linwood Carbonate (LC) | 1.5 | 0.004 |
| Linwood Hydrate (LH) | 13.9 | 0.050 |
| Precipitated Calcium Carbonate (PCC) | 49.2 | 0.170 |
| High Temperature Shift (HTS) catalyst | 85 | 0.3 |

Water Gas Shift Reaction (WGSR): Catalyst Testing and Analysis

Figure 21:
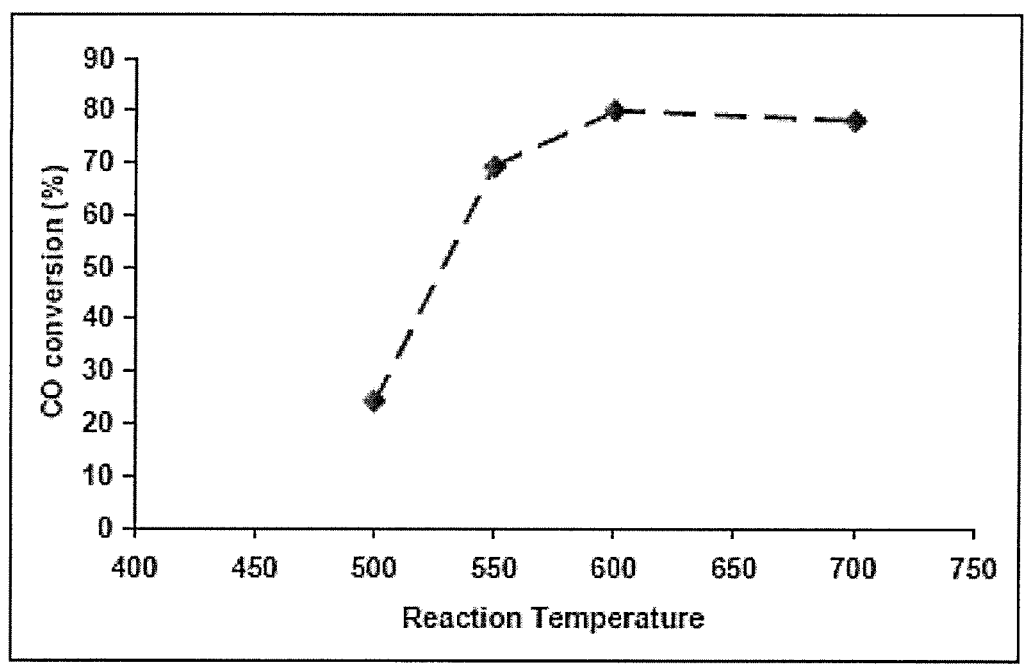
FIG. 21 shows the effect of reaction temperature on the CO conversion (0.5 g HTS catalyst, 3% C0, H2O/CO ration=3, total flow=1.5 slpm).

The HTS catalyst was tested for its catalyst activity towards the WGS reaction between 500-700° C. Blank runs (without any sorbent) were performed in a reaction mixture comprising of 3% CO and 9% H2O, the balance being 5.0 grade N2. The total gas flow-rate was maintained at about 1.5 slpm and the steam/CO ratio was set at ~3. Typically about 0.5 grams of the HTS catalyst was loaded in the reactor prior to each run. The catalyst activity increases monotonically with increasing reaction temperature. This is evident from FIG. 21 below. The CO conversion increases from 24.3% at 500° C. to 69.3% at 550° C. It finally reaches about 80% at 600° C. Beyond 600° C. the conversion does not change much but remains steady at ~78% at 700° C. This might be due to the equilibrium limitations governing the WGS reaction scheme is depicted in eqn (8) below:

$$CO + H_2O \rightarrow CO_2 + H_2 \tag{8}$$

The data were further analyzed to check if the system was operating within the domain of WGS equilibrium. The thermodynamic equilibrium constant (K) for any temperature for this reaction was computed using the software "HSC Chemistry v 5.0" (Outokumpu Research Oy, Finland). The observed ratio was computed from the experimental data by obtaining the ratio of the partial pressures of the products and the reactants as per the eqn (9) below:

$$1/K_{obs} = \frac{(P_{CO})(P_{H_2O})}{(P_{H_2})(P_{CO_2})} \quad (9)$$

Figure 22:
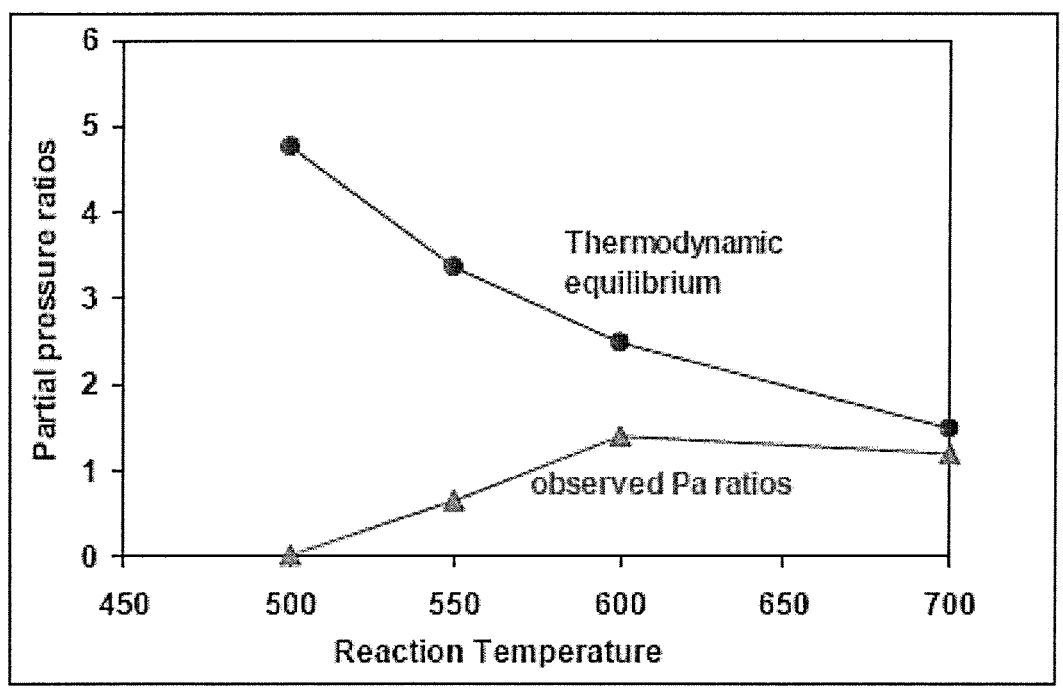
FIG. 22 shows the extent of reaction equilibrium as a function of temperature for the WGS reaction.

FIG. 22 illustrates the effect of temperature on the ratio of partial pressures (Kobs) obtained from the experimental data. This is compared with the thermodynamic equilibrium values ($K_{eq}$). From the figure it is evident that we are operating in the region that is below the thermodynamic equilibrium. At 500° C. the $K_{obs}$ is 0.028 while the corresponding $K_{eq}$ is 4.77. $K_{eq}$ monotonically decreases with increasing temperature. In contrast, $K_{obs}$ increases with temperature for our operating conditions. Thus, at 600° C. the $K_{obs}$ increases to 1.4 while the $K_{eq}$ moves down to 2.5. This trend continues and it is clearly evident from the figure that the system moves closer to equilibrium as we progressively increase the temperature from 500 to 700° C.

Combined Carbonation and Water Gas Shift Reaction:
Sorbent Testing and Analyses

The combined carbonation and WGS reaction was tested in the reactor assembly used for the catalyst testing. The experimental conditions were exactly identical to that used for testing the catalyst. The runs were performed in a reaction mixture comprising of 3% CO and 9% H$_2$O, the balance being 5.0 grade N$_2$. The total gas flow-rate was maintained at about 1.5 slpm and the steam/CO ratio was set at ~3. Typically about 0.5-1 g of the HTS catalyst was loaded in the reactor prior to each run. Different calcium oxide precursors were tested. Naturally occurring limestone, Linwood Carbonate (LC) and the corresponding hydrated lime, Linwood Hydroxide (LH) were obtained from Linwood Mining and Minerals Co. The structurally modified calcium carbonate (PCC) was prepared in-house and the details are outlined below.

Sorbent Testing without Catalyst

The sorbents were initially tested for catalytic activity towards WGSR and CO conversion without any HTS catalyst from 500-700° C. This would obviate the need for any catalyst in the system. However, detailed investigation resulted in very miniscule activity and hence it was concluded that HTS catalyst was required for further combined reaction testing.

Combined Reactions with PCC-HTS Catalyst System

Figure 23:
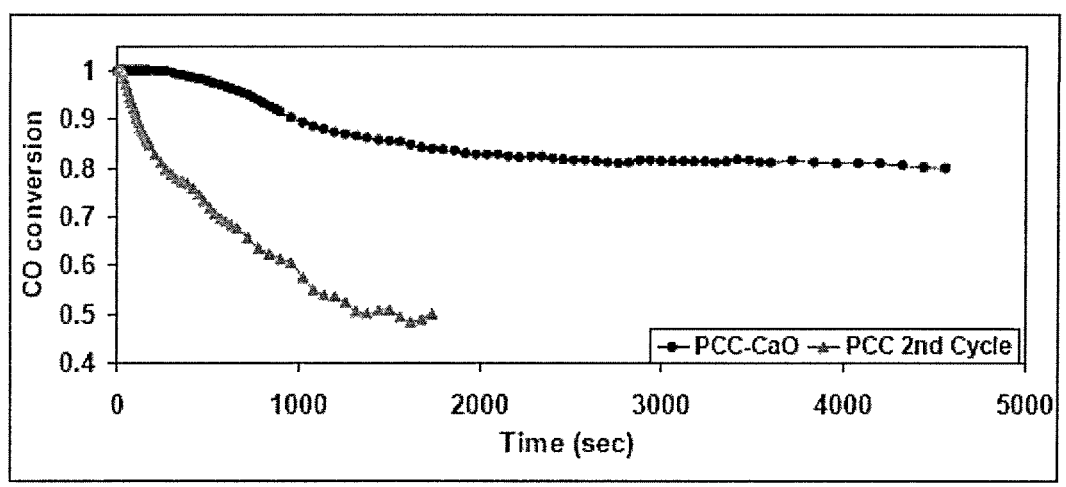
FIG. 23 is a breakthrough curve of CO conversion using a PCC-HTS catalyst system (T=600 C, 3% CO, 9% H2O, Total flow=1.5 slpm).

Typically about 0.5 g of HTS catalyst and 1.5 g of PCC were loaded in the reactor and the temperature was ramped till 700° C. in flowing N$_2$. This procedure ensured the calcination of the calcium carbonate to calcium oxide and it was monitored using CO$_2$ analyzer. Subsequently, the reaction temperature was lowered to 600° C. and the reaction gas mixture was allowed to flow through the system. The CO analyzer continuously monitored the CO flow through the system and the breakthrough curve depicting the CO conversion with time is as shown in FIG. 23 below. The system gives almost 100% conversion for first 240 seconds (4 min) following which the initial reactivity of the sorbent slowly falls to give about 90% CO conversion at 1000 seconds (16.5 min). The sorbent gradually achieves its maximum loading capacity with time and finally at around 2500 seconds (42 min) the sorbent reaches its breakthrough loading. Beyond this the CO conversion of 81% corresponds to that obtained with only the catalyst at 600° C. This can be validated from FIG. 21.

The system was then switched to pure N$_2$ flow and the reaction temperature was increased to 700° C. to drive the calcination of the CaCO$_3$ formed due to carbonation. Thus the reactions occurring in the system are:

Reaction phase:

WGSR: CO+H$_2$O→CO$_2$+H$_2$ (7)

Carbonation: CaO+CO$_2$→CaCO$_3$ (8)

Regeneration phase:

Calcination: CaCO$_3$→CaO+CO$_2$ (9)

The termination of the calcination was ensured by monitoring the CO2 released using a CO$_2$ analyzer. The reaction temperature was again lowered to 600° C. and the sorbent-catalyst system was subjected to the reaction mixture for a second reaction cycle. The $2^{nd}$ cycle CO breakthrough curve is also depicted in FIG. 23. It is evident from the figure that the CO conversion is not as superior as in the $1^{st}$ cycle. The CO conversion monotonically decreases to about 90% in 110 seconds, 80% in 240 seconds and gradually to about 50%. It is interesting to note that at the end of the breakthrough the sorbent-free catalytic CO conversion of 81% is not achievable. This could be attributed to the loss in the catalytic activity after the first regeneration cycle. This is because the catalyst is subjected to CO$_2$, an oxidizing atmosphere, during the calcination phase. Thus the deactivated catalyst is not able to augment the WGS reaction kinetics and hence we see a poor performance of the sorbent-catalyst system in the $2^{nd}$ cycle. The solitary sorbent has been subjected to numerous carbonation calcination cycles and has shown satisfactory performance (Iyer et al, 2004).

Combined Reactions with LH-HTS Catalyst System

Figure 24:
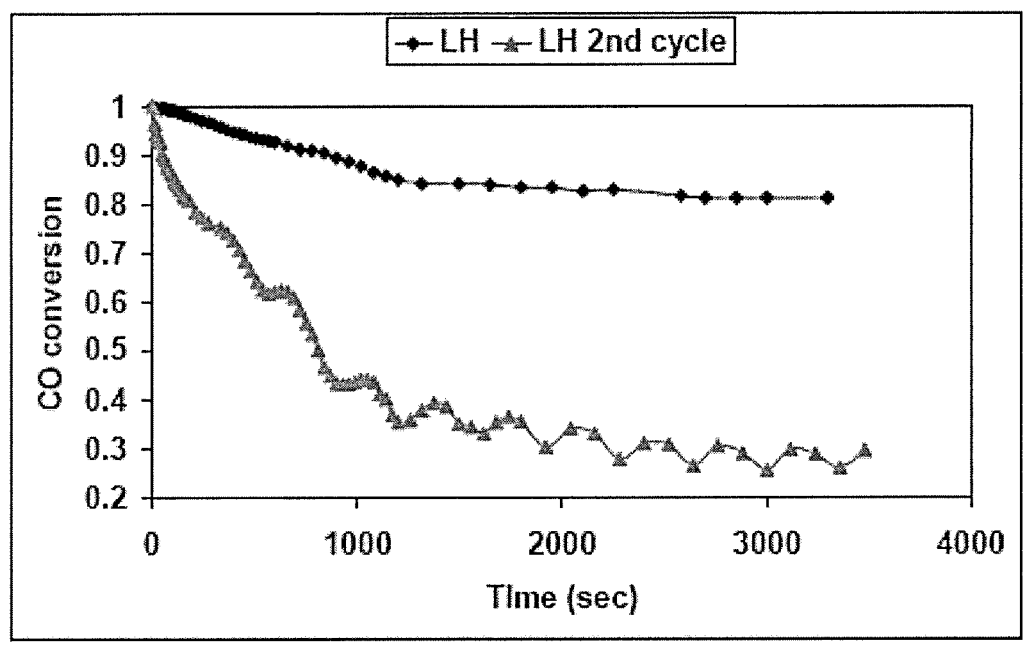
FIG. 24 is a breakthrough curve of CO conversion using a LH-HTS catalyst system (T=600 C, 3% CO, 9% H2O, total flow=1.5 slpm).

Typically about 1 g of the HTS catalyst and 1.3 g of LH were loaded in the reactor and the temperature was ramped up slowly till 600° C. in flowing N$_2$. This procedure ensured the calcination of the calcium hydroxide to calcium oxide. Calcium hydroxide decomposes above 400° C. Subsequently, the reaction gas mixture was allowed to flow through the system. The CO analyzer continuously monitored the CO flow through the system and the breakthrough curve depicting the CO conversion with time is as shown in FIG. 24 below. The system gives almost 100% conversion initially to give about 90% CO conversion at 900 seconds (15 min). The sorbent gradually achieves its maximum loading capacity with time and finally at around 3000 seconds (50 min) the sorbent has achieved its breakthrough loading. Beyond this the CO conversion of 81% corresponds to that obtained with only the catalyst at 600° C. as was shown in FIG. 21.

The system was then switched to pure N$_2$ flow and the reaction temperature was increased to 700° C. to drive the calcination of the CaCO$_3$ formed due to carbonation. Subsequently, the reaction temperature was lowered to 600° C. and the LH-CaO/catalyst system was subjected to the reaction mixture for a second reaction cycle. The $2^{nd}$ cycle CO breakthrough curve is also depicted in FIG. 24. It is evident from the figure that the CO conversion is not as superior as in the $1^{st}$ cycle. The CO conversion monotonically decreases to about 90% in 60 seconds, 80% in 180 seconds and gradually to about 30%. It is interesting to note that at the end of the breakthrough the sorbent-free catalytic CO conversion of 81% is not achievable. This could be attributed to the loss in the catalytic activity after the first regeneration cycle. This is because the catalyst is subjected to CO$_2$, an oxidizng atmosphere, during the calcination phase. Thus the deactivated catalyst is not able to augment the WGS reaction kinetics and hence we see a poor performance of the sorbent-catalyst system in the $2^{nd}$ cycle. The solitary sorbent had been subjected to numerous carbonation calcination cycles and has shown satisfactory performance over few cycles.

Comparison of the PCC and LH Sorbents

Figure 25:
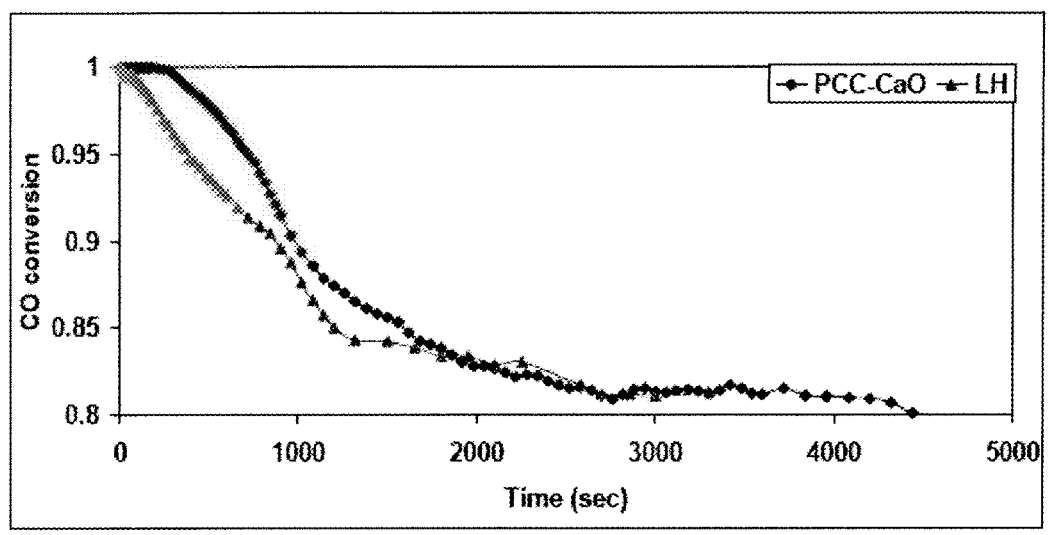
FIG. 25 provides a comparison of breakthrough curves for PCC-HTS and LH-HTS systems (T=600 C, 3% CO, 9% H2O, Total flow=1.5 slpm).

FIG. 25 compares the CO conversion breakthrough curves for the PCC and LH sorbent-catalyst systems. The curves are for the 1$^{st}$ reaction cycle. The CO conversion at any given time for PCC-CaO is always higher than that of LH-CaO. The PCC system gives almost 100% conversion for first 240 seconds (4 min) while the LH sorbent system sustains this conversion only in the initial few seconds. Subsequently, the PCC system gives about 90% CO conversion at 1000 seconds (16.5 min) followed by 85% in 1600 seconds (27 min). In contrast, the LH system gradually gives about 90% CO conversion at 900 seconds (15 min) and followed by 85% in 1200 seconds (20 min). Both the sorbent systems gradually achieve their maximum loading capacity with time and finally at around 2500-3000 seconds they reach their breakthrough loading. Beyond this the CO conversion of 81% corresponds to that obtained with only the catalyst at 600° C. Hence, it is evident from FIG. 24 that the PCC-CaO performance dominates over that of LH-CaO at any given time.

Figure 26:
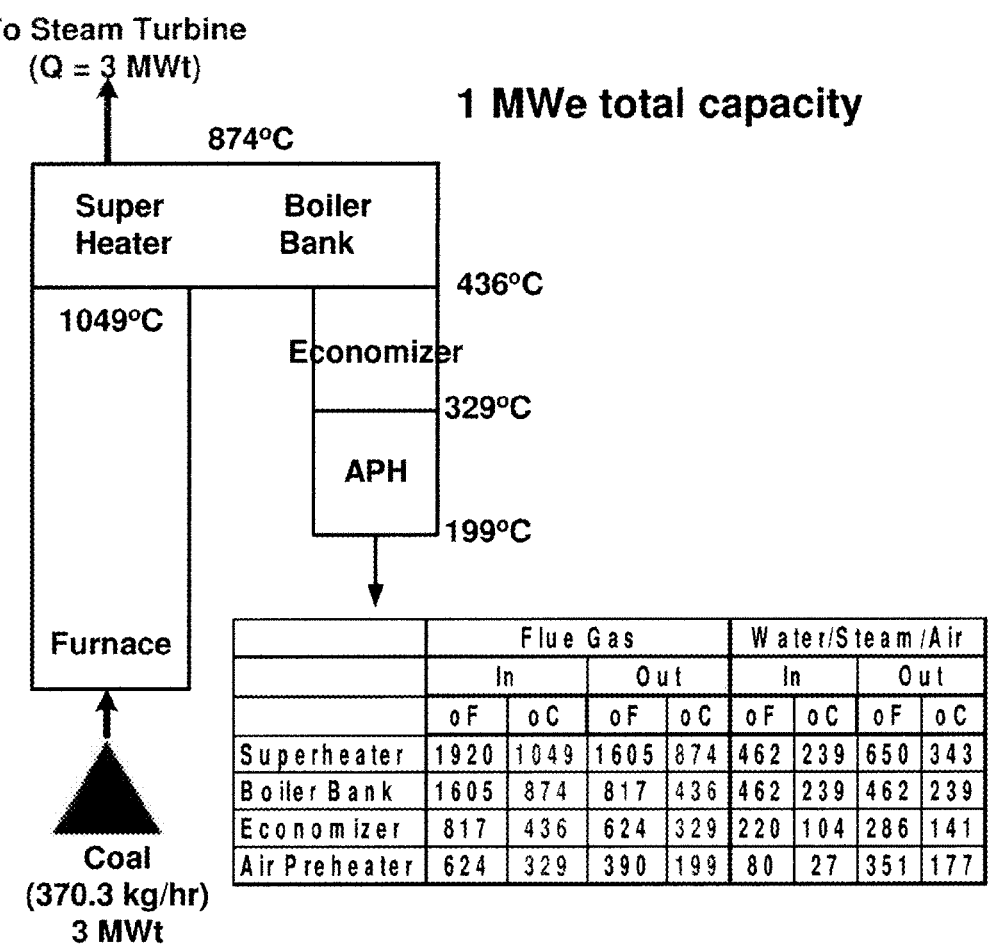
FIG. 26 depicts a typical steam generation scenario and use.

FIG. 26 illustrates the generation 1 MWe of steam.

Figure 27:
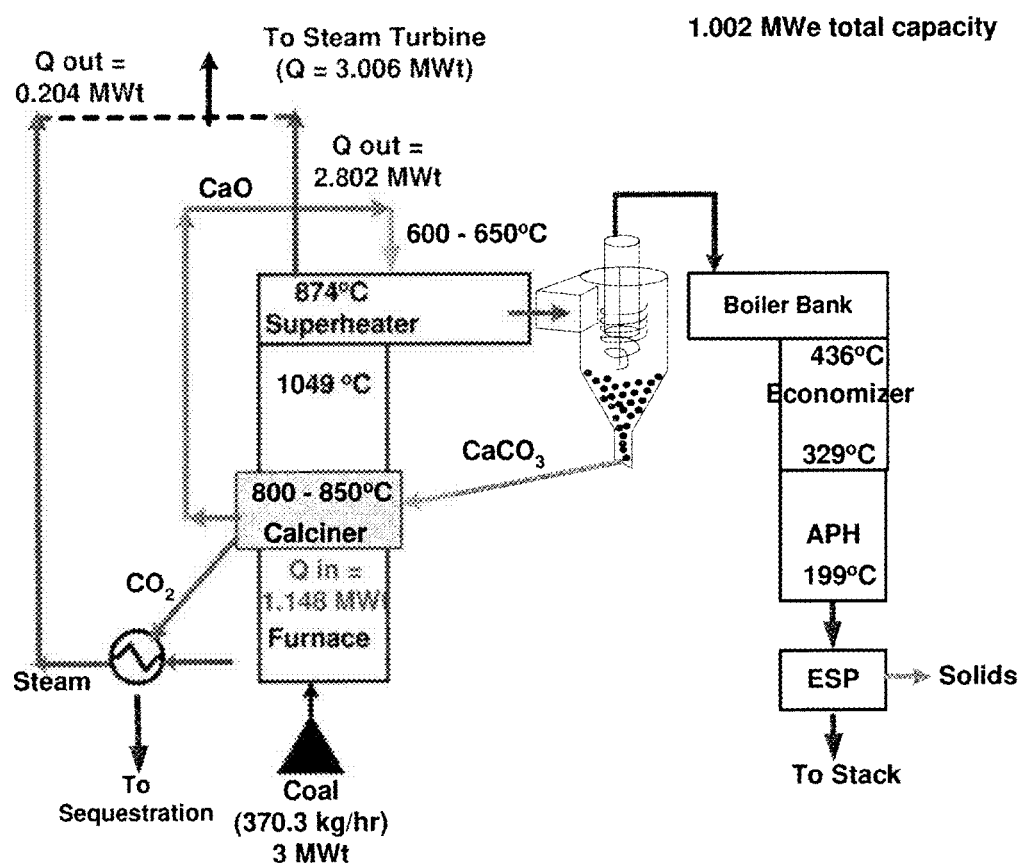
FIG. 27 depicts one implementation of one embodiment of the present invention.

FIG. 27 illustrates one embodiment of the present invention providing 1.002 MWe total capacity.

Figure 28:
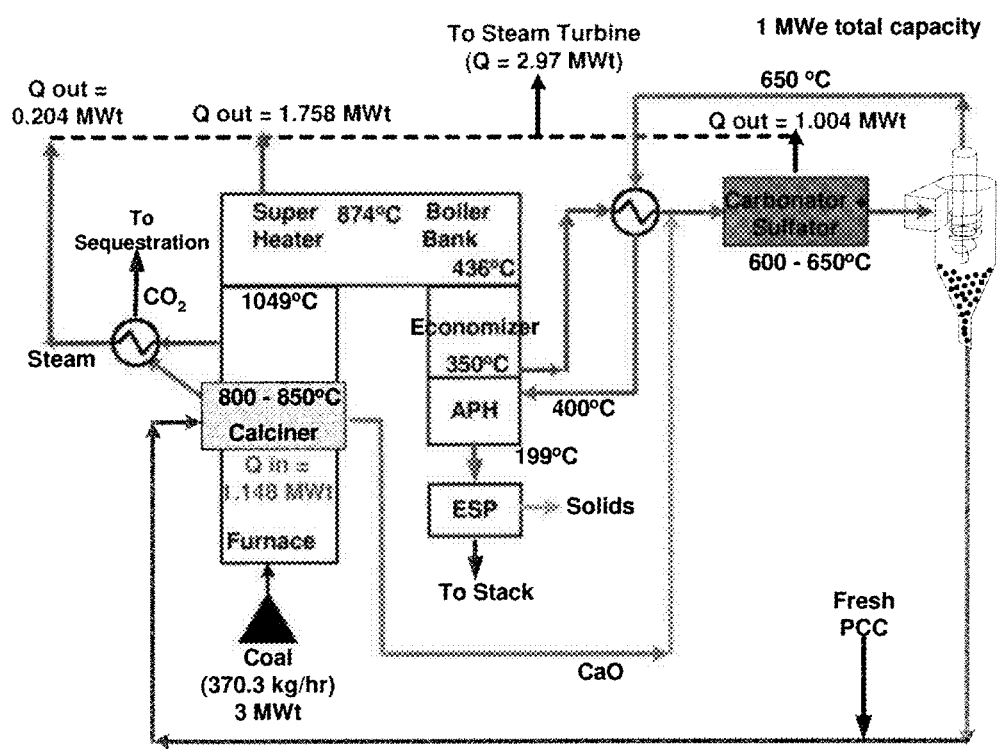
FIG. 28 depicts one implementation of one embodiment of the present invention.

FIG. 28 illustrates a second embodiment of the present invention providing 1 MWe total capacity.

Figure 29:
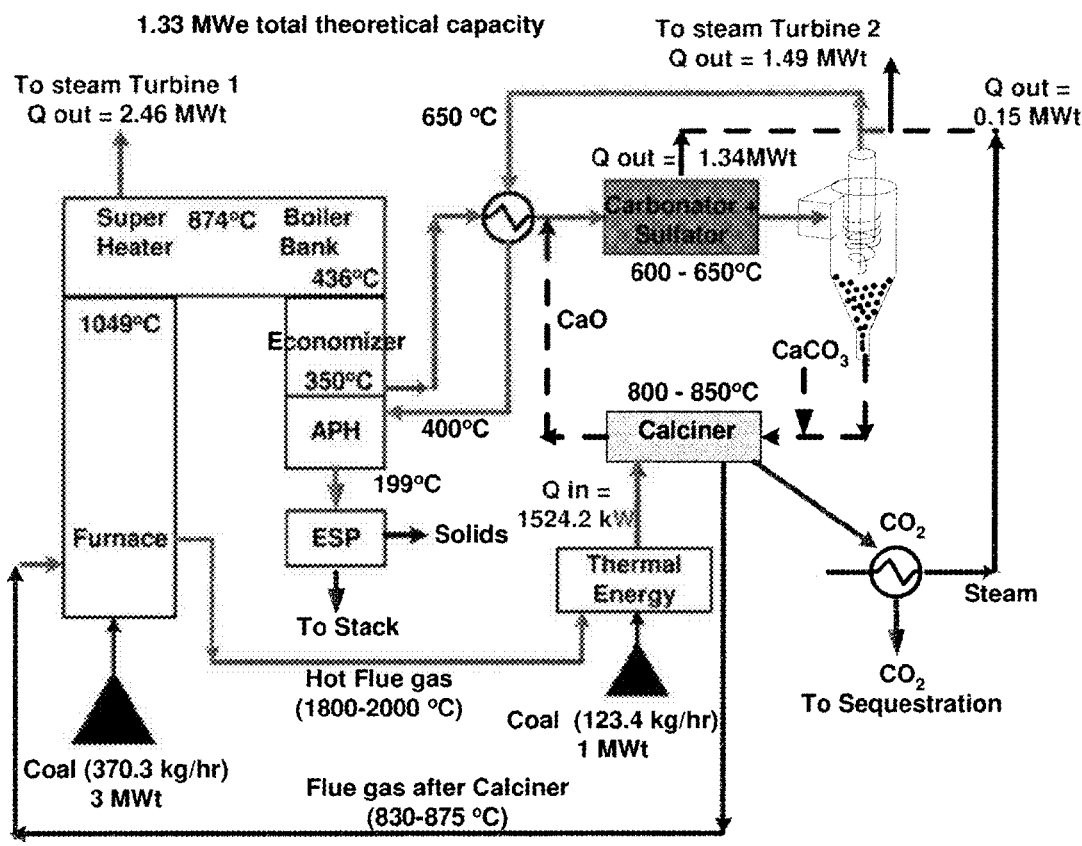
FIG. 29 depicts one implementation of one embodiment of the present invention.

FIG. 29 illustrates another embodiment of the present invention providing 1.33 MWe total capacity.

Figure 30:
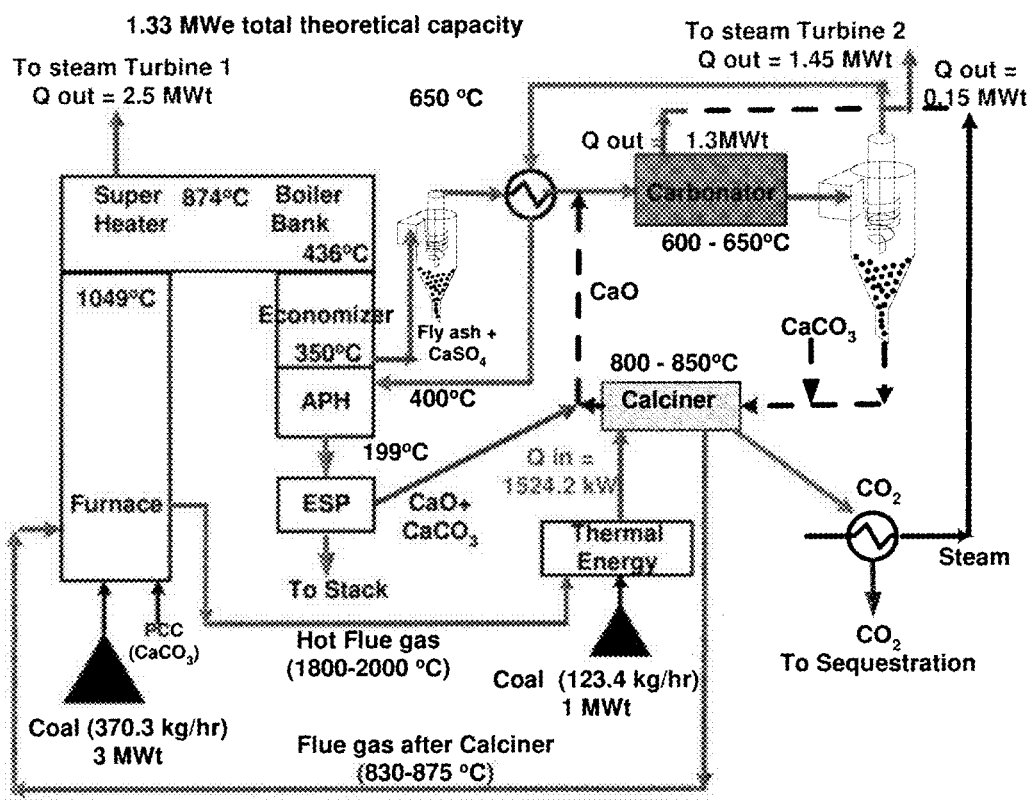
FIG. 30 depicts one implementation of one embodiment of the present invention.

FIG. 30 illustrates yet another embodiment of the present invention providing 1.33 MWe total capacity.

Figure 31:
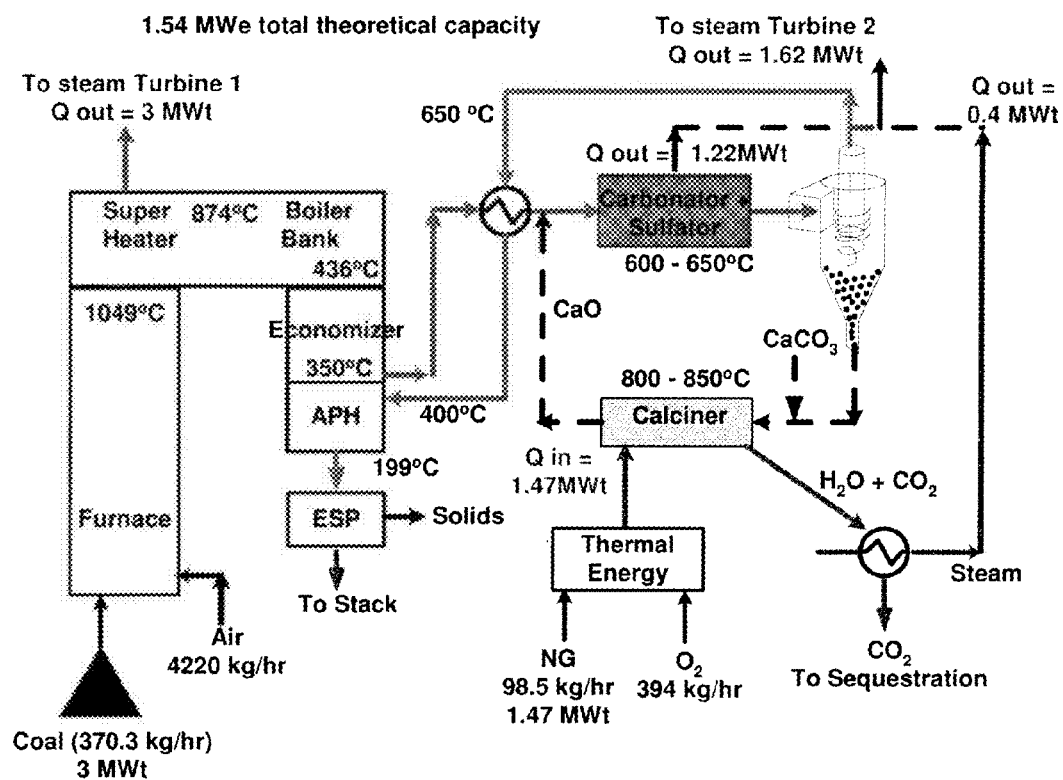
FIG. 31 depicts one implementation of one embodiment of the present invention.

FIG. 31 illustrates an alternative embodiment of the present invention providing 1.54 MWe total capacity.

Figure 32:
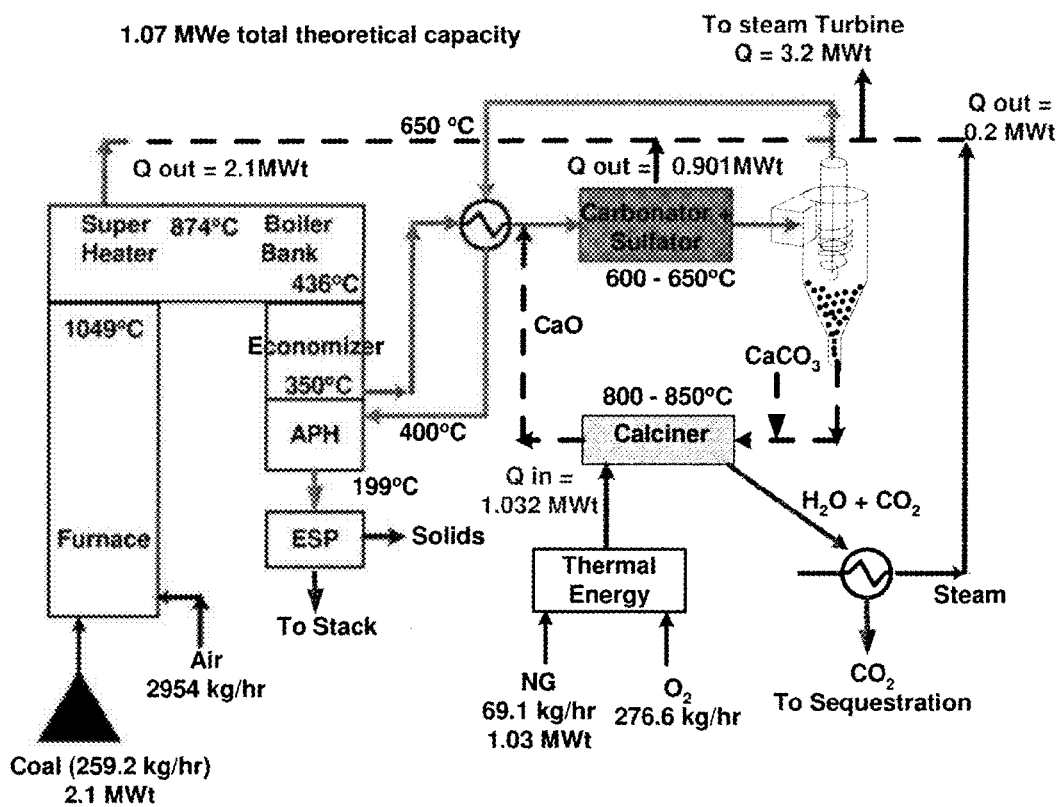
FIG. 32 depicts one implementation of one embodiment of the present invention.

FIG. 32 illustrates yet another alternative embodiment of the present invention providing 1.07 MWe total capacity.

Figure 33:
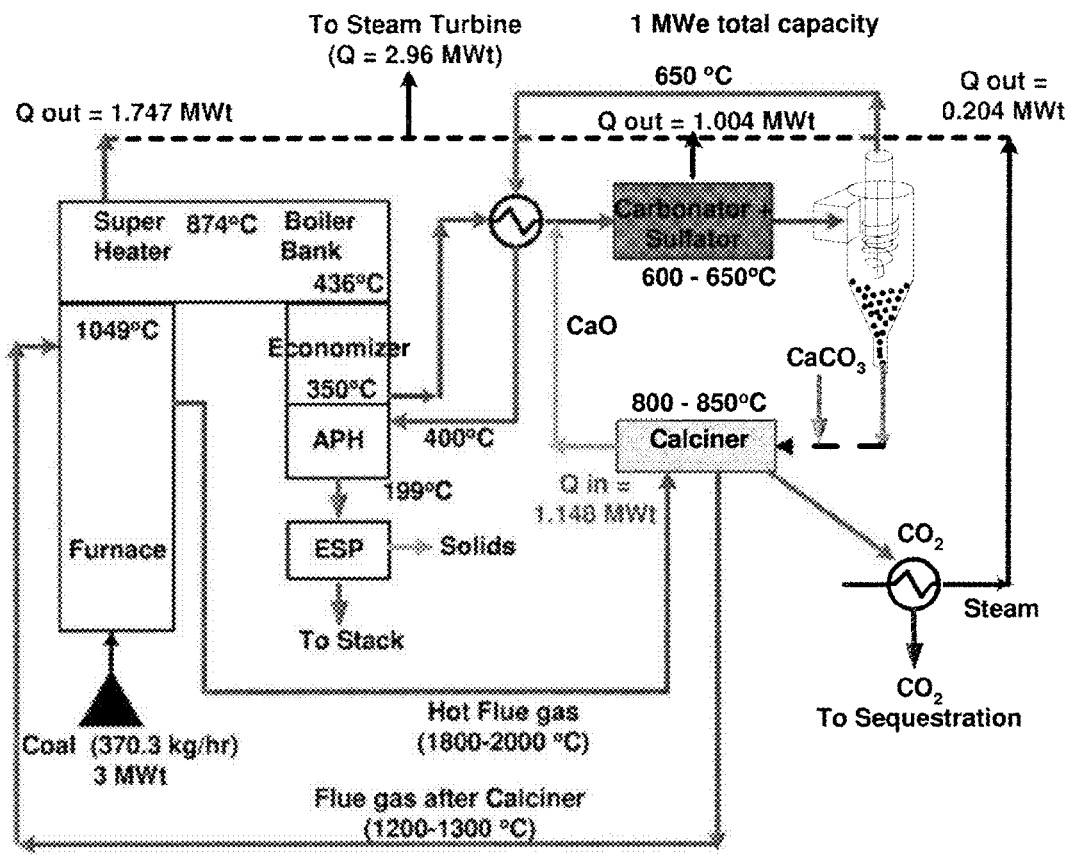
FIG. 33 depicts one implementation of one embodiment of the present invention.

FIG. 33 illustrates an alternative embodiment of the present invention providing 1 MWe total capacity.

Figure 34:
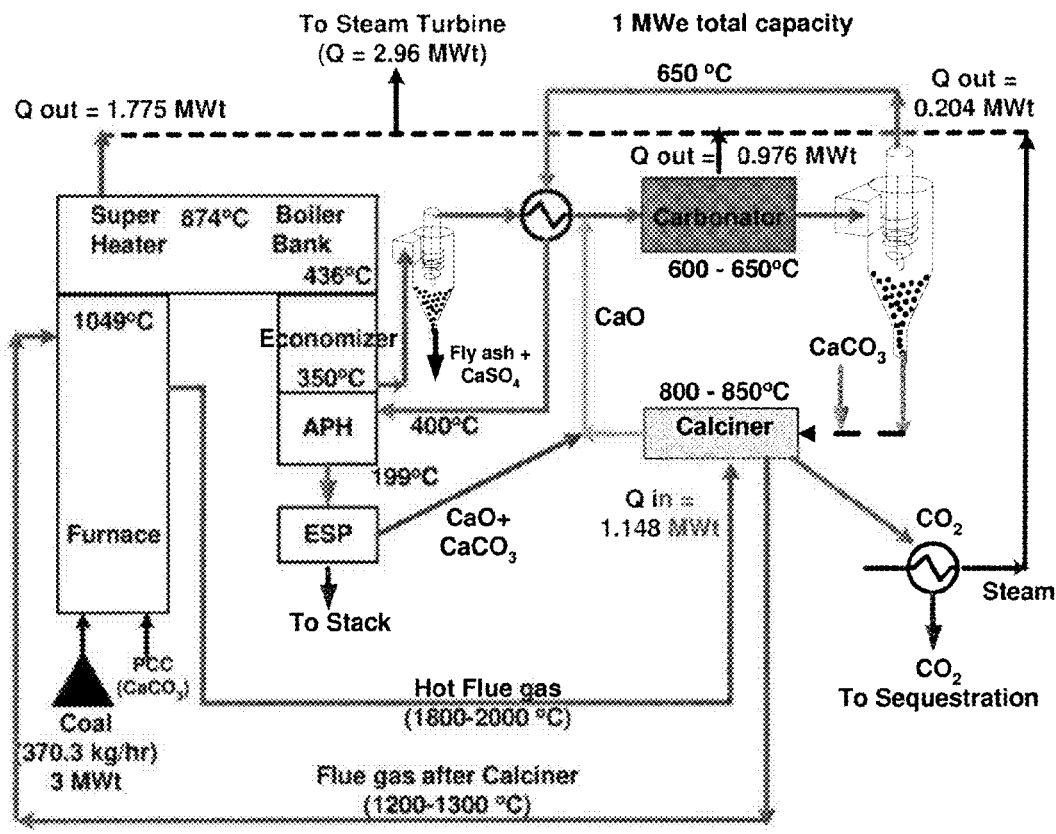
FIG. 34 depicts one implementation of one embodiment of the present invention.

FIG. 34 illustrates an alternative embodiment of the present invention providing 1 MWe total capacity.

Figure 35:
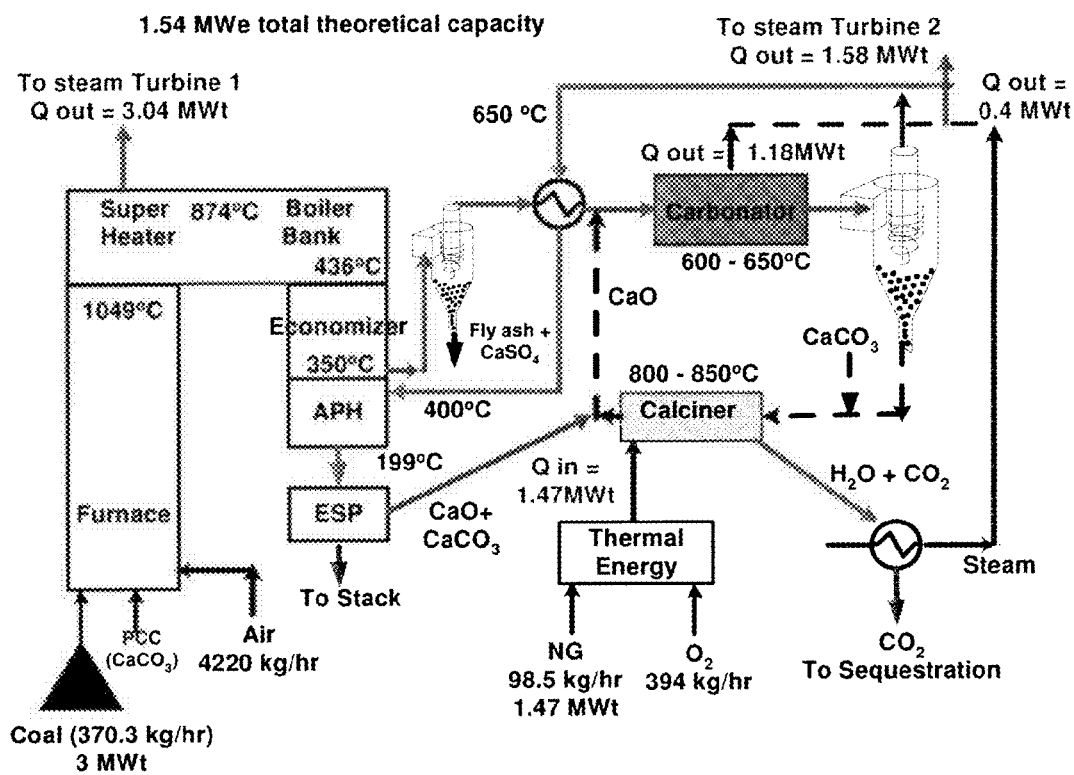
FIG. 35 depicts one implementation of one embodiment of the present invention.

FIG. 35 illustrates yet another embodiment of the present invention providing 1.54 MWe total capacity.

Figure 36:
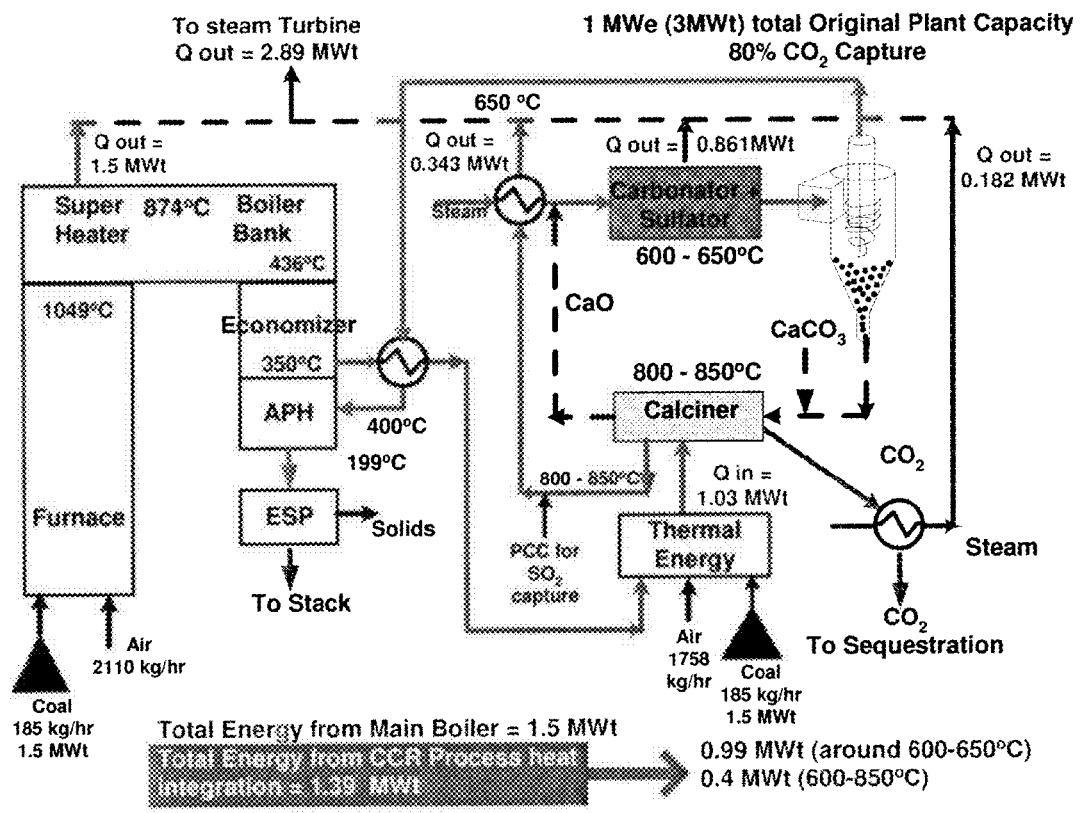
FIG. 36 depicts one implementation of one embodiment of the present invention.

FIG. 36 illustrates an alternative embodiment of the present invention providing 1 MWe total capacity at 80% $CO_2$ capture.

Figure 37:
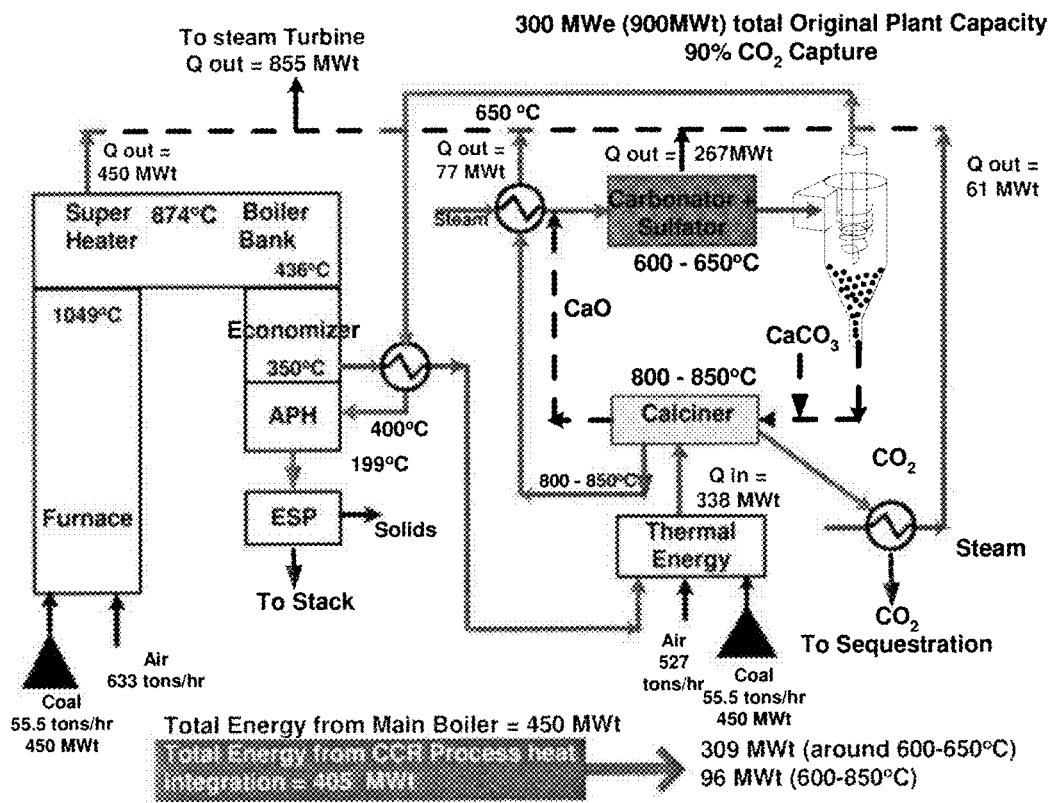
FIG. 37 depicts one implementation of one embodiment of the present invention.
Figure 38:
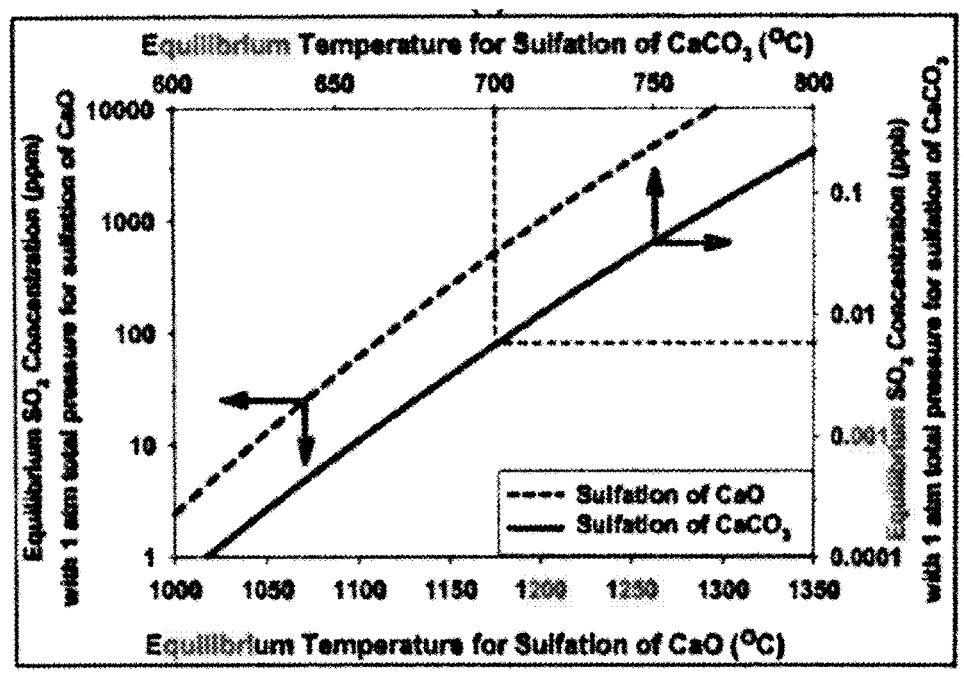
FIG. 38 illustrates thermodynamic data for predicting the temperature zones for sulfation of CaO as well as the direct sulfation of CaCO3. (Sulfation was considered at 1 atm total pressure, 4% O2 and 10% CO2).
Figure 39:
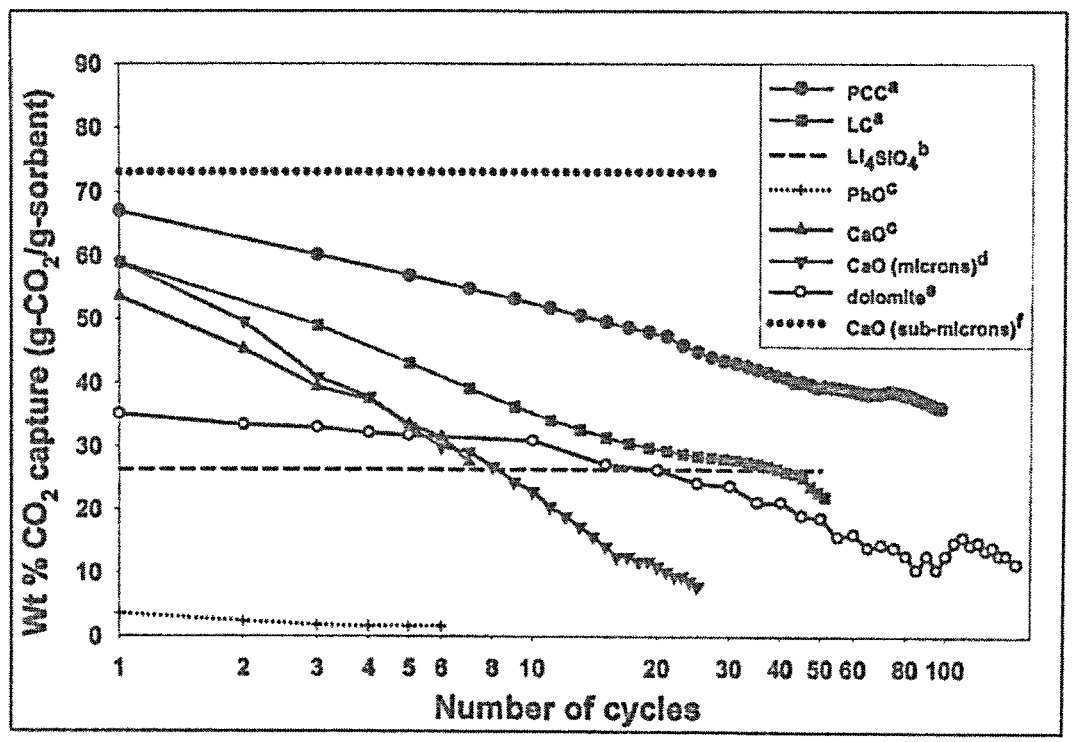
FIG. 39 illustrates CO2 capture capacity of various high temperature sorbents over multiple carbonation-regeneration cycles.
Figure 40:
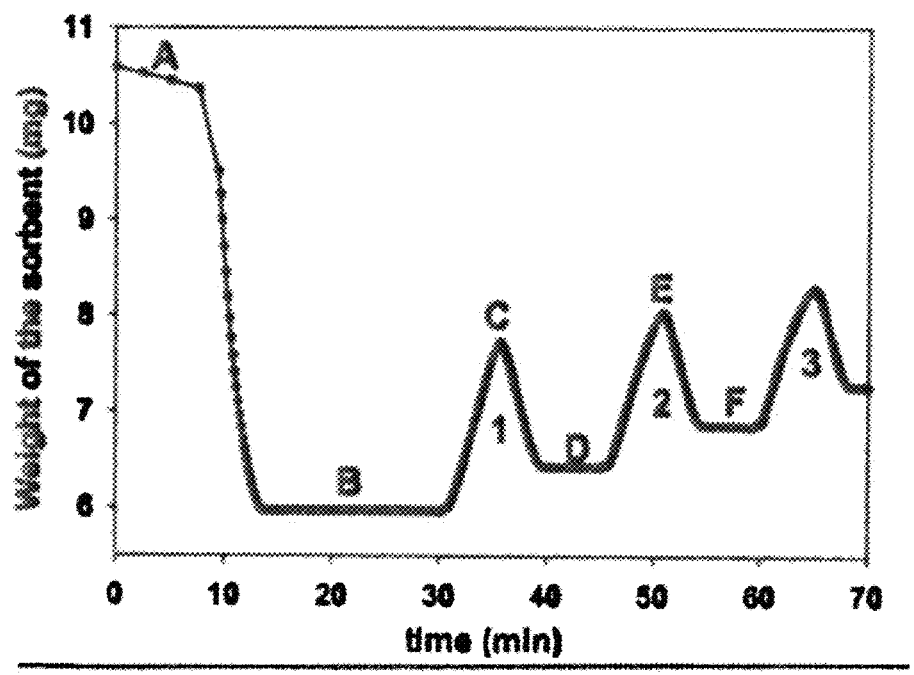
FIG. 40 provides a typical curve for combined carbonation and sulfation of PCC-CaO for 3 cycles at 700° C. for a residence time of 5 minutes (3000 ppm So2, 10% CO2, 4% O2).
Figure 41:
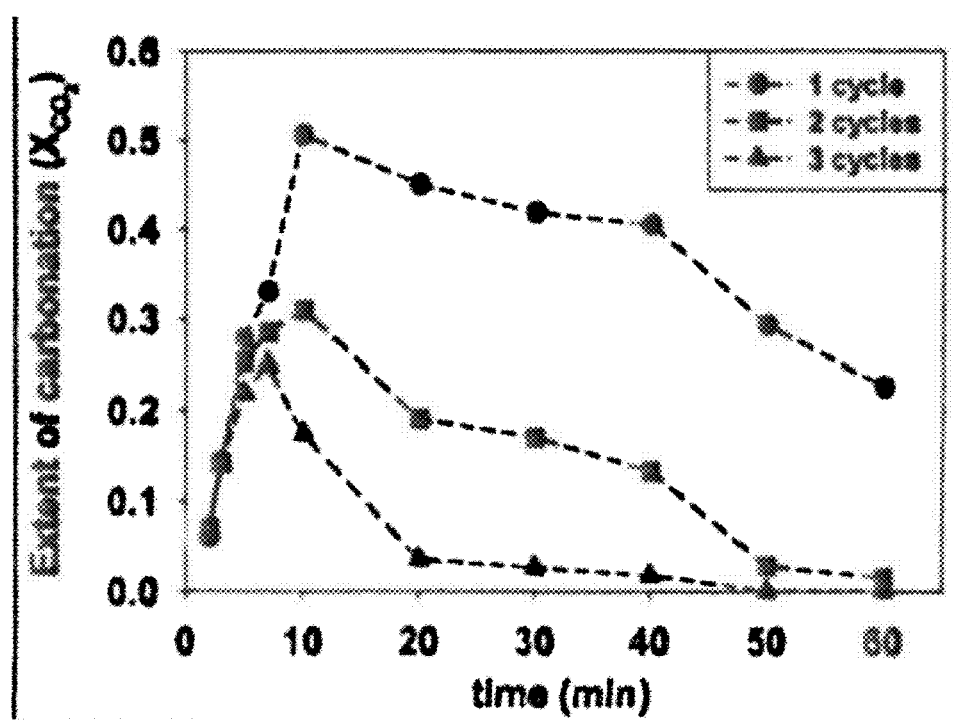
FIG. 41 shows the effect of residence time on the extent of carbonation (initial amount of CaO) of PCC-CaO for multiple cycles at 700 C (3000 ppm SO2, 10% CO2, 4% O2).
Figure 42:
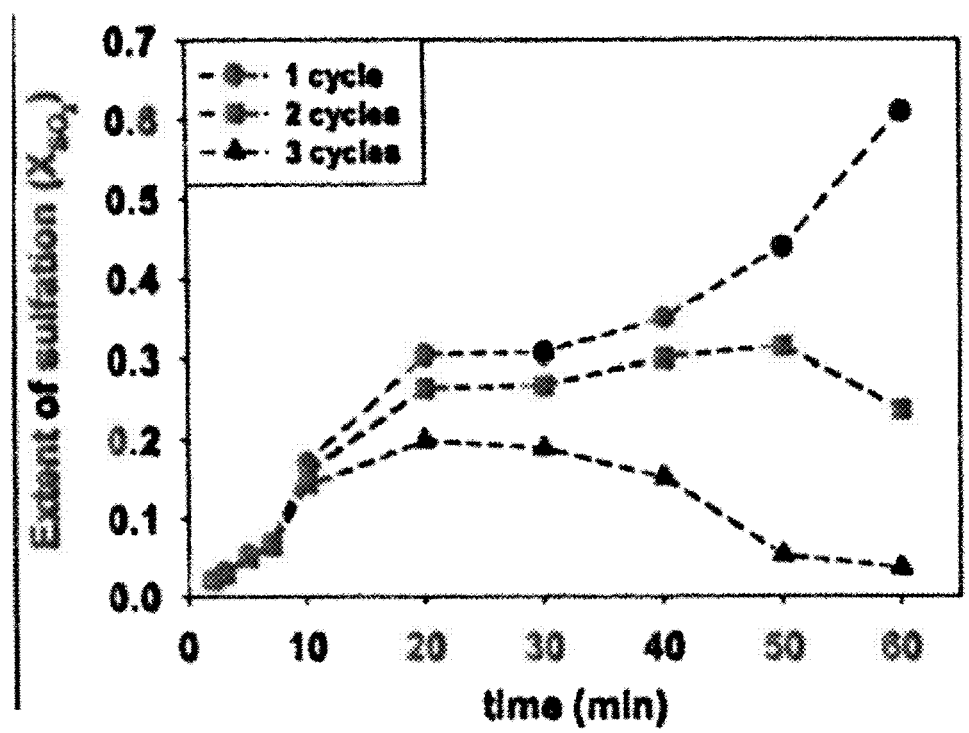
FIG. 42 shows the effect of residence time on the extent of sulfation (initial amount of CaO) of PCC-CaO for multiple cycles at 700 C (3000 ppm SO2, 10% CO2, 4% O2).
Figure 43:
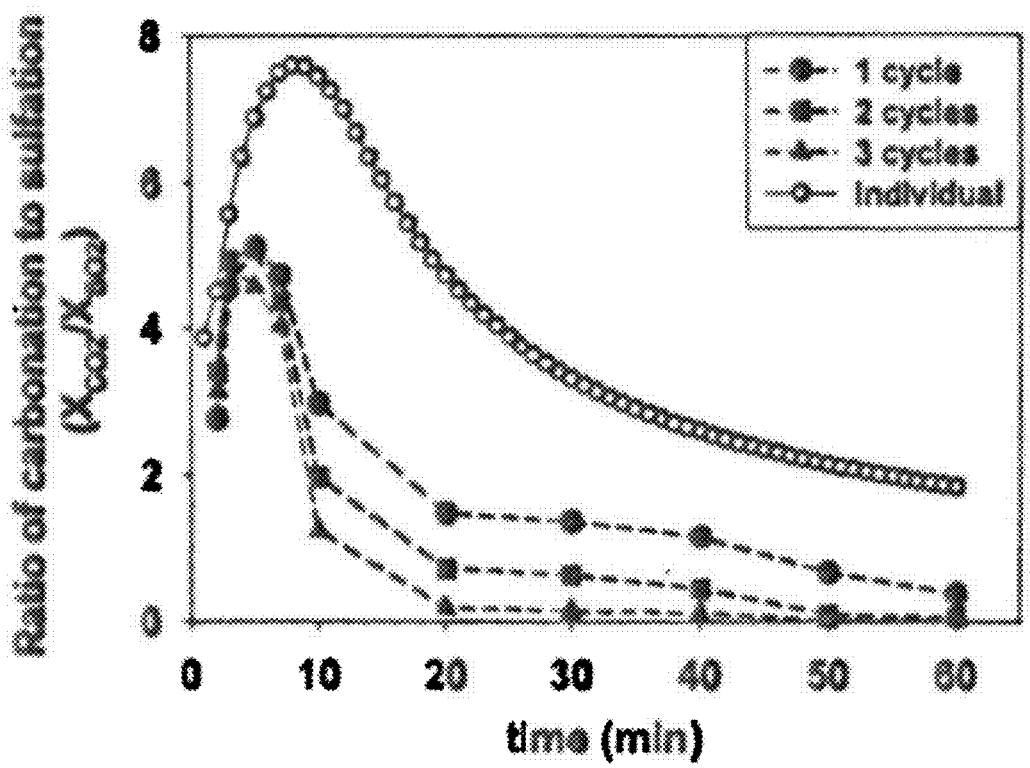
FIG. 43 shows the effect of residence time on the ratio of carbonation to sulfation of PCC-CaO for multiple cycles at 700 C (3000 ppm SO2, 10% CO2, 4% O2).
Figure 44:
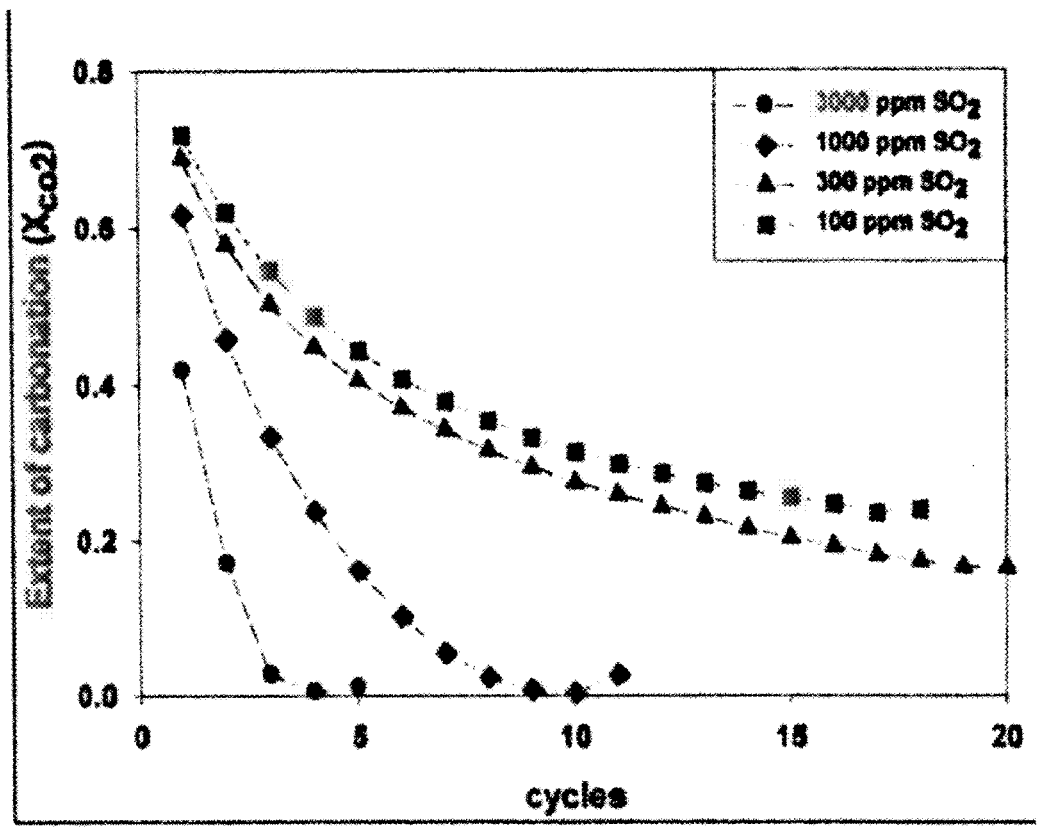
FIG. 44 illustrates the extent of carbonation of PCC-CaO for multiple cycles at 700 C (10% CO2, 4% O2).
Figure 45:
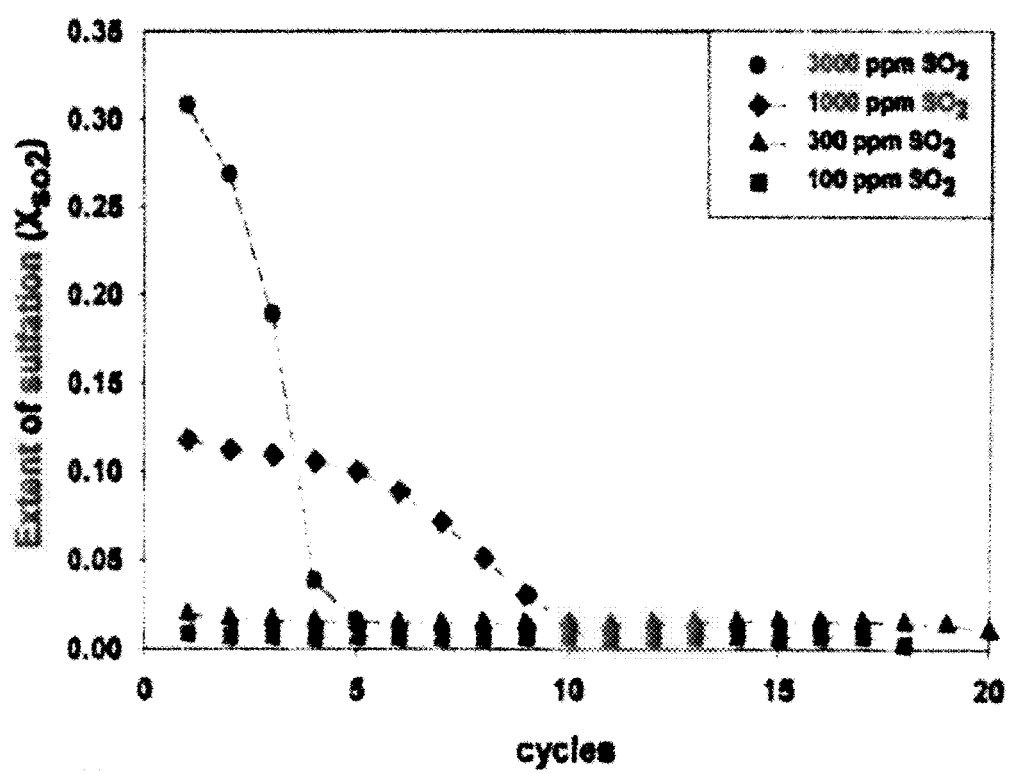
FIG. 45 illustrates the extent of sulfation of PCC-CaO for multiple cycles at 700 C (10% CO2, 4% O2).
Figure 46:
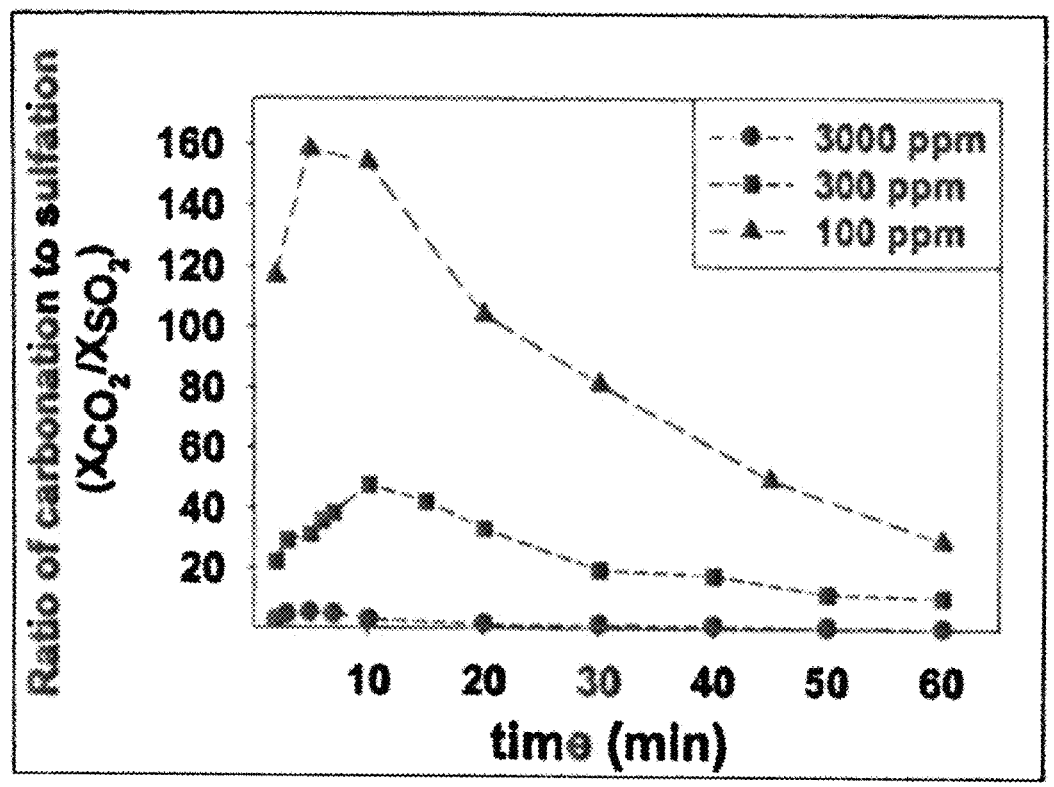
FIG. 46 shows the effect of residence time on the ratio of carbonation to sulfation of PCC-CaO for multiple cycles at 700 C for varying SO2 concentrations (3000–100 ppm So2, 10% Co2, 4% O2).
Figure 47:
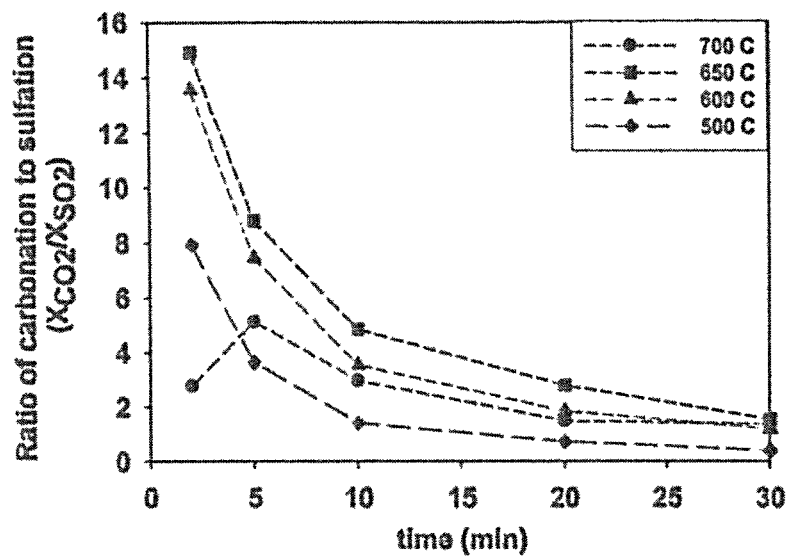
FIG. 47 shows the effect of reaction temperature on the ratio of carbonation to sulfation for increasing residence time (10% Co2, 3000 ppm SO2).
Figure 48:
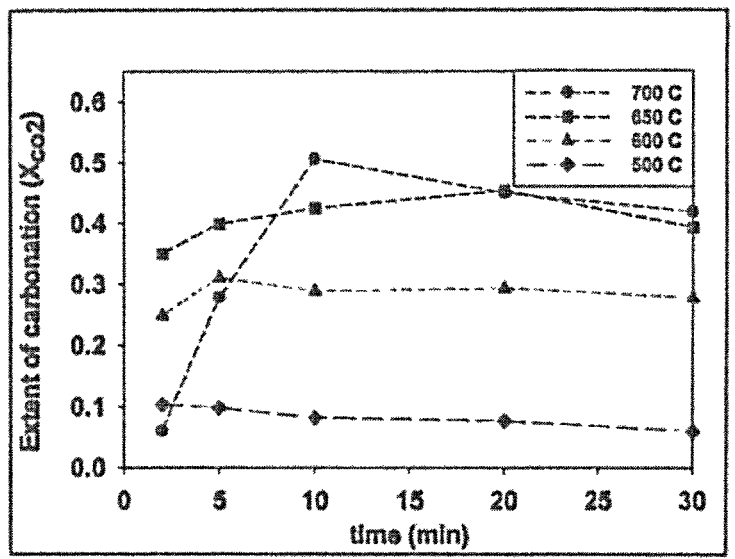
FIG. 48 illustrates the effect of reaction temperature on the extent of carbonation of PCC-CaO for increasing residence time (10% CO2, 3000 ppm SO2).
Figure 49:
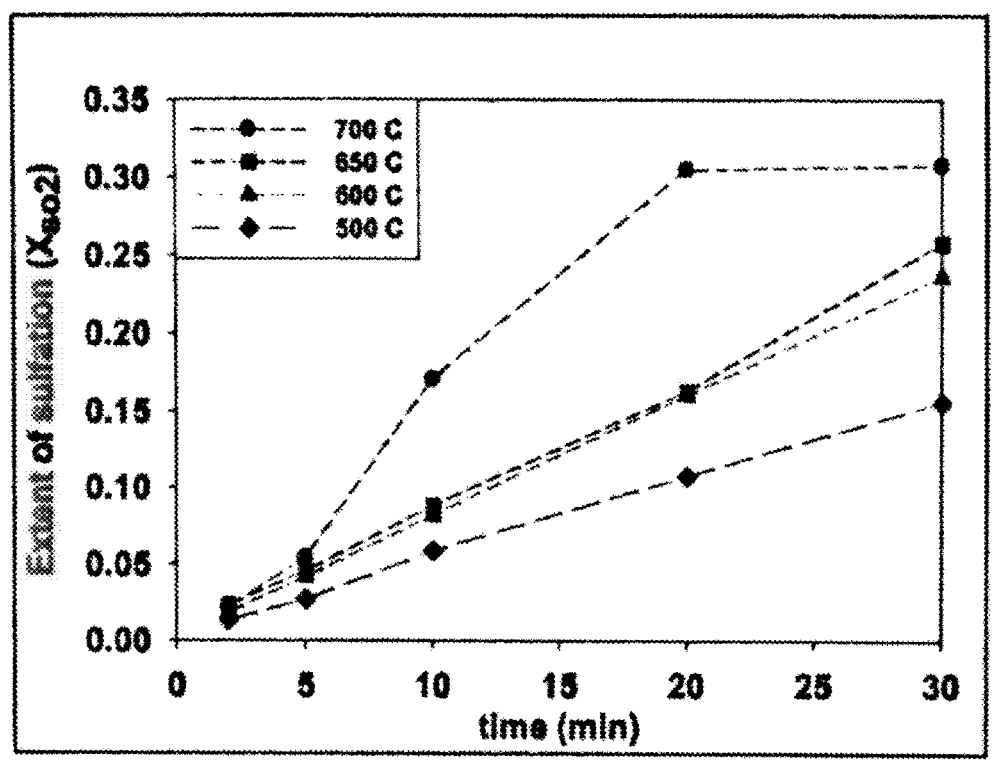
FIG. 49 illustrates the effect of reaction temperature on the extent of sulfation of PCC-CaO for increasing residence time (10% CO2, 3000 ppm SO2).
Figure 50:
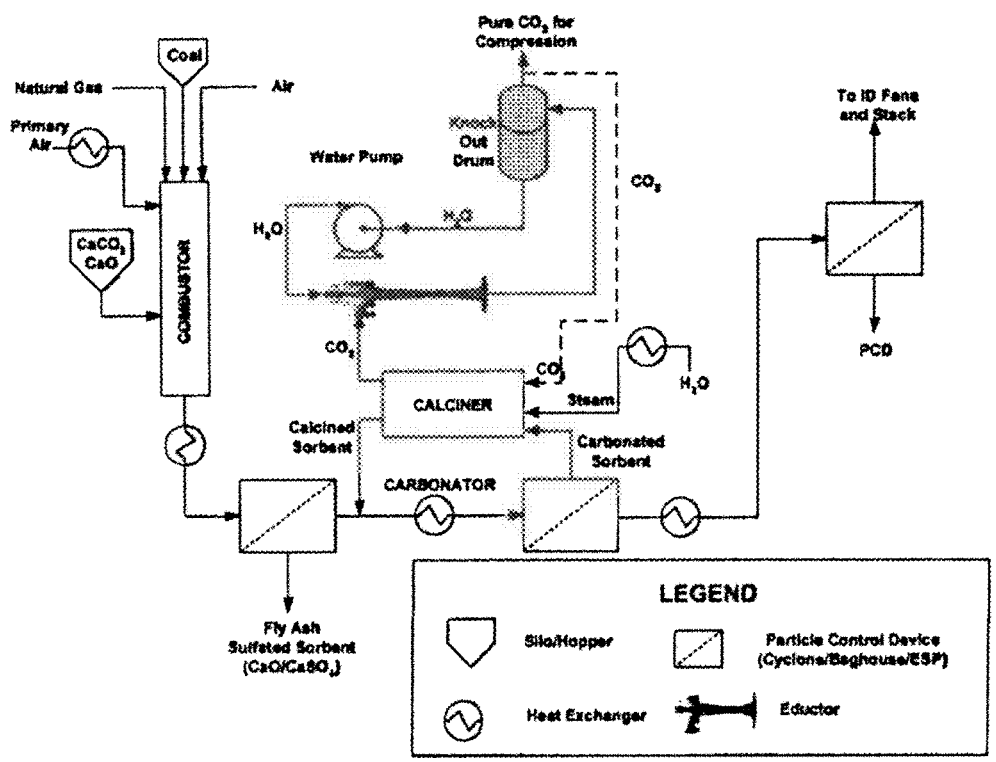
FIG. 50 provides a flow sheet for the integration of the CCR process in a coal fired utility.
Figure 51:
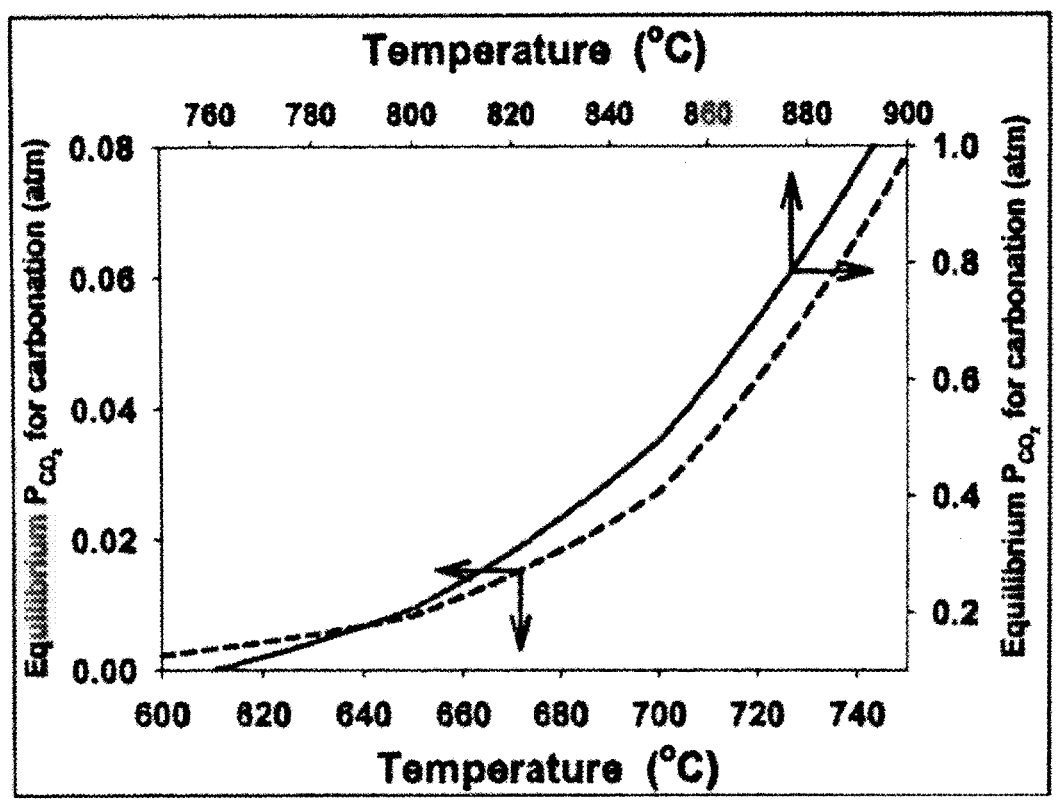
FIG. 51 illustrates the equilibrium partial pressure of CO2 as obtained by thermodynamics (0-1 atm).
Figure 52A:
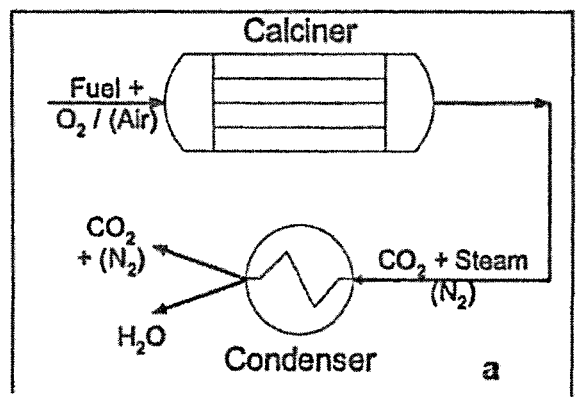
FIG. 52a illustrates a direct fired calcination configuration in accordance with one embodiment.
Figure 52B:
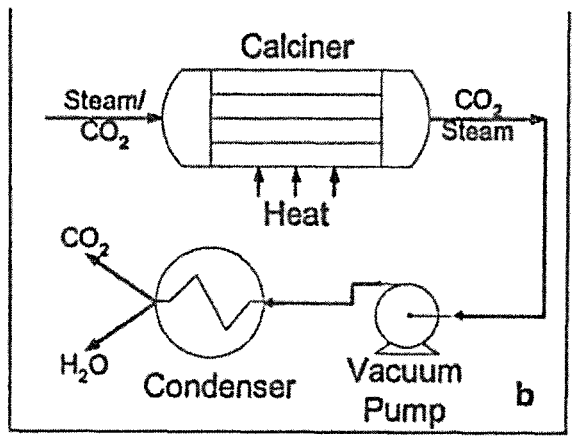
FIG. 52b illustrates an indirect fired calciner configuration in accordance with one embodiment.
Figure 53:
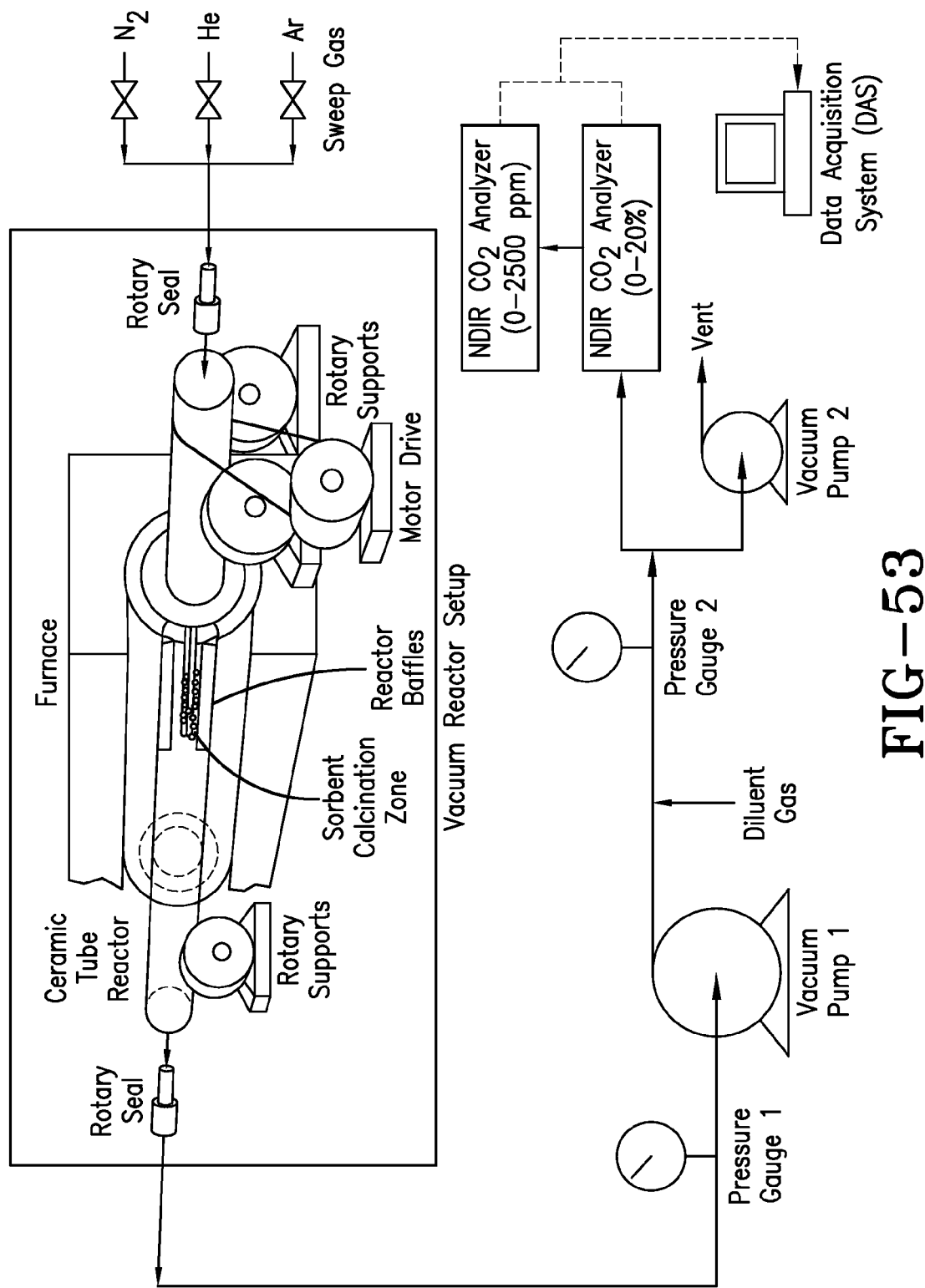
FIG. 53 illustrates a schematic diagram of one embodiment of a rotary calciner reactor set-up.
Figure 54:
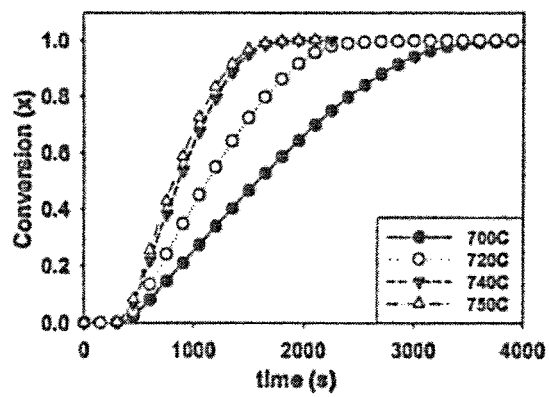
FIG. 54 shows the effect of temperature on LC calcination rate (sample size: 500 mg; T: 700-750 C; Pvac: 25" Hg; $F_{SG(N2)}$=50 ml/min).
Figure 55:
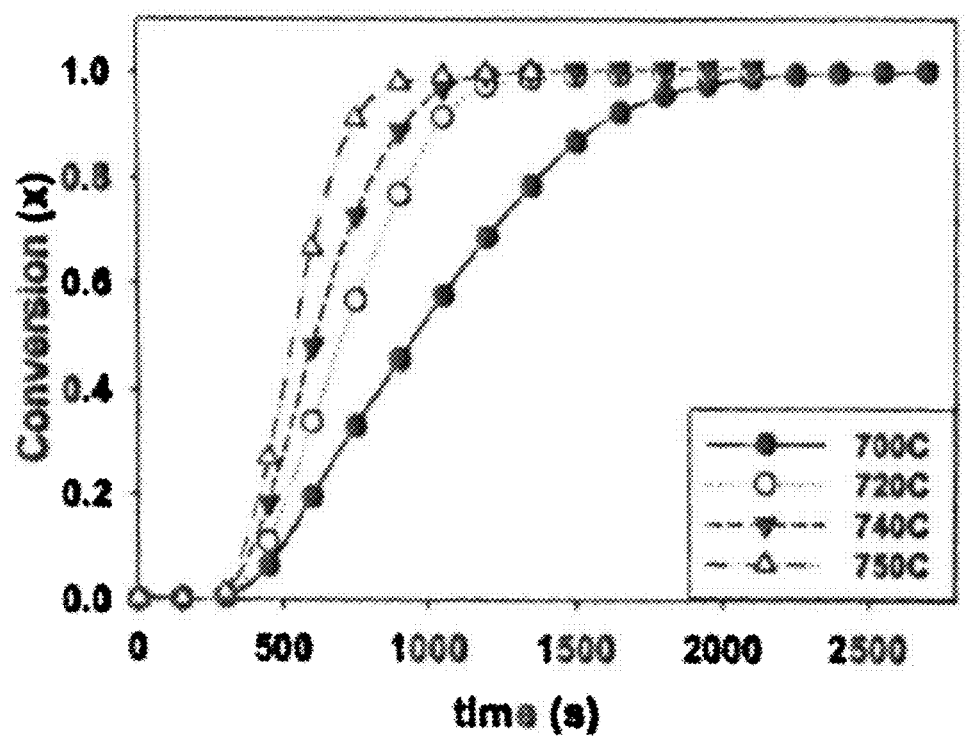
FIG. 55 shows the effect of temperature on the rate of PCC calcination (sample size: 500 mg; T: 700-750 C; Pvac: 25" Hg; $F_{SG(N2)}$=50 ml/min).
Figure 56:
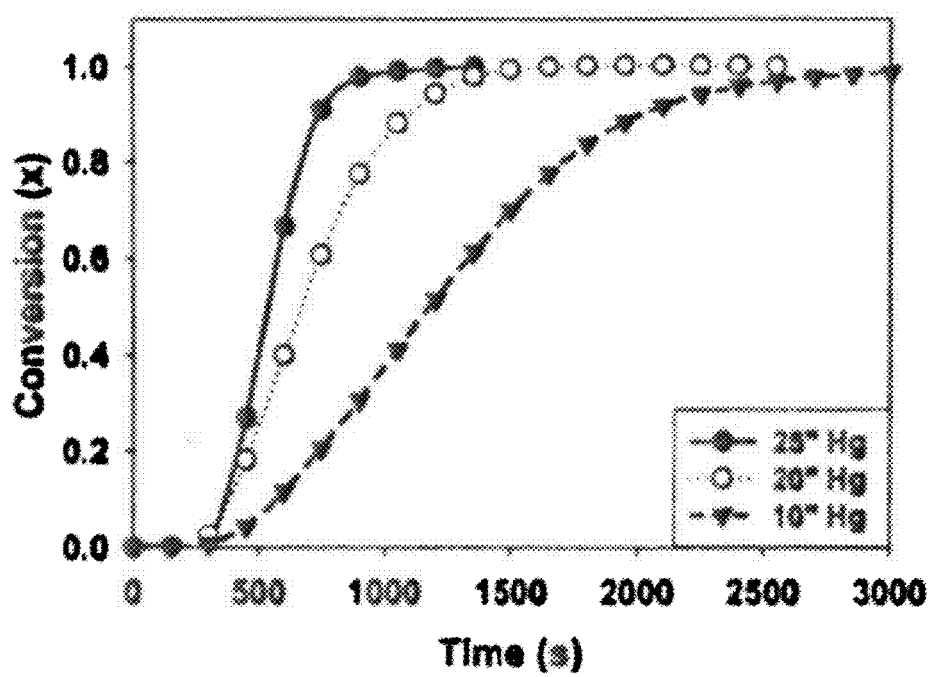
FIG. 56 shows the effect of vacuum on PCC calcination (Sample size: 500 mg; T: 750 C; Pvac: 10-25" Hg; $F_{SG(N2)}$=50 ml/min).
Figure 57:
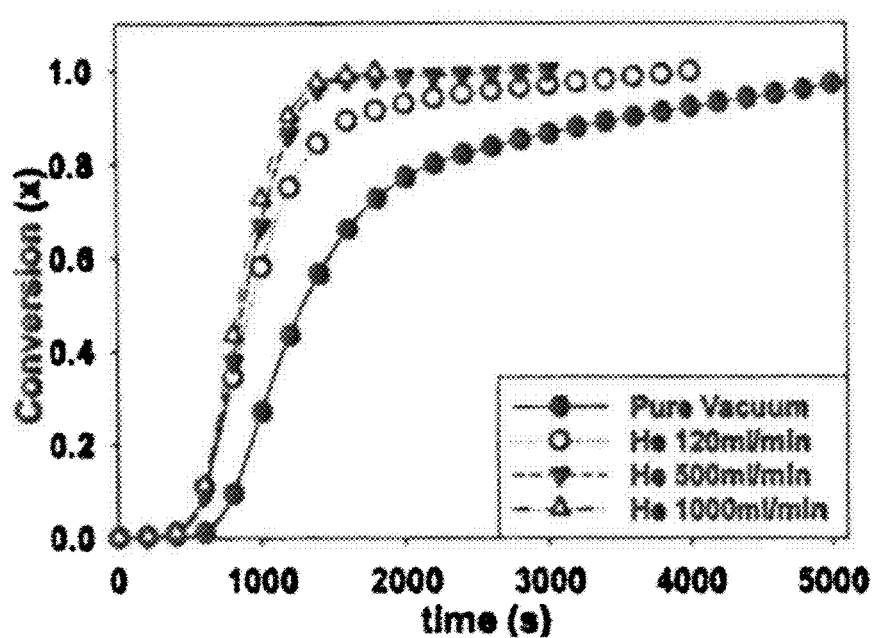
FIG. 57 shows the effect of sweep gas flow ($F_{SG}$) (Sample size: 10 g, T: 880 C; $P_{VAC}$: 28" Hg; $F_{SG(He)}$=0-1000 ml/min).
Figure 58:
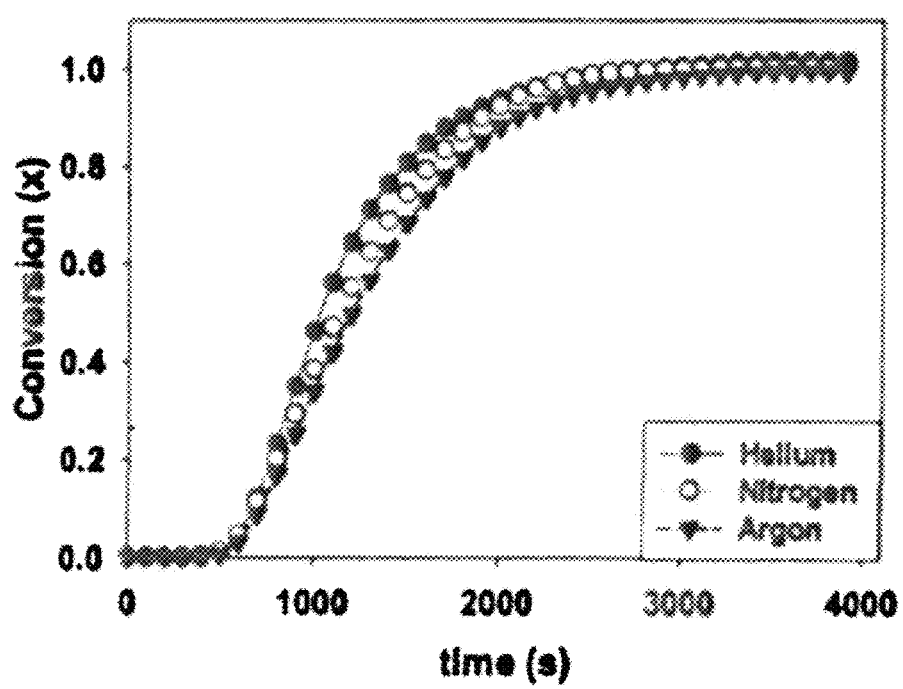
FIG. 58 shows the effect of diluent gas type (He, N2, Ar) (Sample size: 10000 mg, T: 800 C; $P_{VAC}$: 28" Hg; $F_{SG(He, N2, Ar)}$=120 ml/min).

FIG. 37 illustrates another embodiment of the present invention providing 300 MWe total capacity at 90 $CO_2$ capture.

CO2/SO2 Combined Reaction Optimization

Experimental

Chemicals, Sorbents and Gases

Naturally occurring limestone (CaCO3) was obtained from Linwood Mining and Minerals Company (Linwood Carbonate, LC). Precipitated calcium carbonate (PCC) was synthesized from Ca(OH)2, obtained from Fisher Scientific. The pore structure of the synthesized PCC sorbent was tailored using an anionic dispersant, N40V®, obtained from Ciba Specialty Chemicals, Corp. The details of the synthesis procedure is described elsewhere.[7,14] This structurally modified PCC yields a predominantly mesoporous structure in the 5-20 nm range with a surface area (SA) of 49.2 m/g and a pore volume (PV) of 0.17 cc/g obtained by BET analysis. N2 and C02, obtained from Praxair, Inc were 99.999% and 99.9% pure, respectively. Mixtures of 02 and SO2 in N2 were also supplied by Praxair, Inc. The BET SA, PV, and pore size distribution (PSD) were measured at −196° C. using nitrogen by a NOVA 2200 analyzer (Quantachrome Company).

Sorbent Reactivity Testing

The reactivity testing of the calcium-based sorbents was carried out in a Thermogravimetric Analyzer (TGA) procured from Perkin Elmer Corporation (Model #TGA-7). A simplified schematic diagram of the experimental setup is shown elsewhere (Iyer et al., 2004). The dome which houses the electronic parts of the balance was continuously flushed with a pure stream of N2 gas (TGA-N2) to ensure that corrosive gases do not adversely affect the equipment circuitry. The sensitivity of the balance is 1 µg. In these experimental runs, the weight of the sample was recorded every 1-10 second intervals. The gas flows were accurately maintained using variable area flow meters, obtained from Cole Parmer Instrument Company. A small sample of the sorbent (about 10-12 mg) was placed in a quartz sample holder and brought to 700° C. under nitrogen flow. The temperature of the TGA was then maintained at 700° C. throughout the experiment to effect the calcination of PCC. After the calcination step, the valve was switched to allow the flow of reactant gas mixture over the calcined sorbent (PCC-CaO). An automated multi-position valve (VICI Corporation, Model # EMTMA-CE) actuated by a programmable electronic timer (VICI corporation, Model # DVSP4) was used to switch between pure nitrogen stream and the reaction gas mixture at programmed time intervals in order to effect the cyclical calcination and carbonation and sulfation of the sorbent. The alternating flows are adjusted to minimize any variations in weight of the pan/sorbent system due to buoyancy changes. The reactant gas mixture enters the TGA from the side port and gets diluted by the TGA-N2 stream coming from the balance dome. The flow of the reactant gas mixture causes an immediate increase in the weight of the sorbent due to the formation of higher molecular weight products such as CaCO3 and CaSO4. At the end of the set reaction residence time, the automated valve toggles the flow back to the "calcination nitrogen". The sorbent weight starts dropping immediately due to the calcination of the CaCO3 product that is formed in the previous reaction step. The raw data is then analyzed to obtain the conversion plots.

Results and Discussion

Thermodynamic analysis was carried out to understand the effect of reaction temperature and gas concentration on the spontaneity of the various reactions.

Thermodynamic Analysis

Primarily four gas-solid reactions can occur when calcium oxide is exposed to flue gas from coal combustion. CaO can undergo hydration, carbonation and sulfation reactions with H2O, CO2 and SO2, respectively. In addition, SO2 can react with the CaCO3 formed due to the carbonation reaction, thereby causing direct sulfation of the carbonate. These can be stoichiometrically represented as:

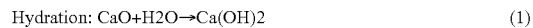
Hydration: CaO+H2O→Ca(OH)2    (1)

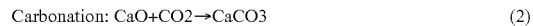
Carbonation: CaO+CO2→CaCO3    (2)

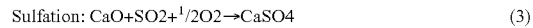
Sulfation: CaO+SO2+$^1/_2$O2→CaSO4    (3)

Sulfation: CaCO3+SO2+$^1/_2$O2→CaSO4+CO2    (4)

Thermodynamic calculations were performed to obtain equilibrium curves for the partial pressures of H20 ($P_{H2O}$), CO2 ($P_{CO2}$) and SO2 ($P_{so2}$) as a function of temperature for the hydration, carbonation, sulfation and direct sulfation reactions using HSC Chemistry v 5.0 (Outokumpu Research Oy, Finland). The equilibrium curves depicting the temperature dependent partial pressures of H2O and CO2 for the hydration and carbonation reactions are shown in FIG. 1(a). From these equilibrium curves, we can predict that moisture does not react with CaO beyond 350° C. in the 5-7% concentration range. At 10% CO2, the equilibrium temperature for CaO—CaCO3 system is 760° C. Therefore, the temperature of the carbonator needs to be kept below 760° C. in order to effect the carbonation of CaO in a 10% CO2 stream. A temperature of 700° C. offers a reasonable rate of carbonation and calcination reactions and enabled us to carry out multiple CCR cycles under isothermal conditions. Thermodynamic data for the equilibrium temperature versus SO2 concentration for the sulfation of CaO and direct sulfation of CaCO3 are shown in FIG. 1(b). The S02 concentration for the sulfation of CaO system is depicted in terms of ppmv for a total system pressure of 1 bar at 4% 02. At 700° C., the equilibrium partial pressure of SO2 is 1.84 and 5.72 ppt (parts per trillion) for the sulfation of CaO and the direct sulfation of CaCO3. Since SO2 concentration in the inlet flue gas is in the 500-3000 ppm range, sulfation of CaO and the CaCO3 will definitely occur until virtually all SO2 is consumed. Table 1 summarizes the temperature below which the three reactions are thermodynamically favored at the typical flue gas concentrations at 1 bar total pressure.

| Reaction with CaO | Hydration | Carbonation | Sulfation |
|---|---|---|---|
| Reactive component of the flue gas | $H_2O$ | $CO_2$ | $SO_2 + O_2$ |
| Typical flue gas concentration (vol %) | 5-7% | 10-15% | 500-3000 ppm $SO_2$, 3-4% $O_2$ |
| Equilibrium temperature below which the reaction can proceed (° C.) | 330-350 | 760-790 | 1175-1245 |

Extended Cyclical Carbonation and Calcination Experiments

Earlier studies from our group have shown that PCC-CaO achieves high conversions (>90%) towards carbonation as compared to 45-60% attained by CaO derived from naturally occurring calcium sources.[7] Life cycle testing on FCC-CaO, carried out in 100% CO2 for an hour, did not show a significant drop in reactivity for 2-3 CCR cycles. However, prior literature indicates a loss in reactivity over a higher number of CCR cycles. We carried out extended isothermal life cycle testing of LC and PCC sorbents at 700° C. The carbonation was carried out in a 10% CO2 stream while pure N2 was used for calcination. Each of the CCR steps was performed for 30 minutes. The sorption capacity of the sorbent is quantified as wt % CO2 captured by the calcined sorbent. Theoretically, 56 grams of unsupported CaO sorbent should react with 44 grams of CO2 corresponding to a maximum CO2 sorption capacity of 78.6 wt % at 100% conversion. The wt % capacity of the LC based sorbent towards CO2 capture reduces from 58% in the first cycle to 20% at the end of the 50 cycle. The microporous structure of LC, being susceptible to pore pluggage and pore mouth closure, does not attain high conversion.[7,24] This is due to the formation of CaCO3, whose molar volume (36.9 cc/mol) is higher than that of the reactant CaO (16.9 cc/mol). In contrast, we see that the conversion of PCC based sorbent over 100 cycles is distinctly higher. The capacity of PCC-CaO is 68 wt % in the first cycle, which drops to 40 wt % by the 50$^{th}$ cycle and then slightly to 36 wt % by the 100$^{xt}$ cycle (6000 minutes on stream). The high reactivity can be attributed to the predominant mesoporous structure of PCC, which allows the reactant gases to access the entire surface of particle through the larger pores. The extent of carbonation continues to rise significantly beyond the kinetic controlled regime. This fact was ascertained by extending the carbonation reaction time to 120 minutes over 40 cycles, during which the sorbent retains 45 wt % capture after 40 cycles (9600 minutes on stream). These results provide evidence that the reactivity of the FCC-CaO is governed solely by the reaction time provided and there is no structural limitation in attaining high conversion.

FIG. 2 depicts graphically the wt % CO2 capture attained by LC, PCC and a host of other high temperature sorbents reported in the literature for multiple CCR cycles.[30] While a variety of sorbents have been screened for this CCR process, a candidate sorbent that shows consistently high reactivity and sorption capacity over multiple cycles remains to be identified. The experimental conditions used in the studies referred to in FIG. 5 are detailed in Table 2. This table highlights important process conditions such as carbonation and calcination temperatures, solid residence times, number of cycles, sorption capacities (wt %), and the CO2 concentration in the gas mixture during the reaction and regeneration steps. FCC-CaO attains 68 wt % increase in 30 minutes and 71.5 wt % after 120 min at the end of the first cycle. In contrast, earlier studies have shown a sorption capacity of about 71 wt % (90% conversion) in a pure C02 stream after 60 min on stream at 650° C. Hence, factors like CO2 concentration, temperature and cycle time play a significant role in determining the sorption capacity for the same sorbent. The experiments conducted by Barker on 10 micron CaO powder demonstrate a drop in the sorption capacity from 59 wt % in the first carbonation cycle to 8 wt % at the end of 25$^t$ cycle.[10] This work suggests that, due to the formation of a 22 nni thick product layer, particles smaller than 22 nm in diameter should be able to achieve stoichiometric conversion. The author later proved this hypothesis by obtaining repeated 93% conversion (73% weight capture) of 10 nm CaO particles over 30 cycles with a carbonation time of 24 hours under 100% CO2 at 577° C.[31] In a PbO-CaO based chemical heat rump process, PbO attained 3.6 wt % CO2 capture in the first cycle, decreasing to 1.6 wt % by the 6 cycle and CaO showed a drop in CO2 capture from 53 wt % in the 1$^{t4}$ cycle to 27.5 wt % by the 5$^{th}$ cycle.[8] A lithium zirconate (Li2ZrO3) based sorbent provided 20 wt % capacity over two cycles.[32] In another study, researchers at Toshiba Corp. observed that the reactivity of lithium orthosilicate (Li4SiO4) was better than that of lithium zirconate. Extended cyclical studies performed on lithium orthosilicate samples attained 26.5 wt % sorption capacity over 50 cycles without any change in the reactivity.[34] Harrison and co-workers developed an enhanced hydrogen production process from the water gas shift reaction by removing CO2 from the gas mixture through the carbonation of CaO.[12] Dolomitic limestone based CCR process yielded a 35 wt % capacity in the first cycle that fell to 11.4 wt % by the 148$^{th}$ cycle when the carbonation experiments were performed in pure CO2 at 800° C. and calcination was conducted at 950° C. An explanation for the drop in capture capacity over multiple CCR cycles has been hypothesized by Abanades and Alvarez based on the changing microporosity within the grains and the mesoporosity surrounding them due to sintering.[16]

Simultaneous Carbonation and Sulfation

The sulfation of CaO and the direct sulfation of the CaCO3 product reduces the CO2 sorption capacity of the CaO due to the formation of "permanent" CaSO4, thereby reducing its efficiency for the CCR process as discussed earlier. This part of the study involves the simultaneous carbonation and sulfation reactions followed by calcination over multiple cycles. The goals of this set of experiments are:

(a) to identify the extent of carbonation (X o2) and sulfation ($X_{sm}$) during the simultaneous reactions (b) to determine and optimize the trend in the ratio of carbonation to sulfation as a function of residence time and reaction temperature (c) to quantify the reduction in the ultimate carbonation capacity for varying SO2 concentrations (3000-100 ppm) over multiple CCR cycles FIG. 3 shows a sample plot of raw data typical for all the experiments conducted in this section. The x-axis represents the residence time and the y-axis shows the actual weight of the sorbent at any given instant. In all the experiments, calcination of PCC was carried out typically for 20-30 minutes. The residence time for the reaction step was maintained for 5 minutes in each of the three cycles for this specific run. From point A to point B, calcination of PCC occurs and the −56% weight remaining confirms that the sorbent at point B is pure CaO. The flow through the TGA is then switched to the reactant gas mixture causing the weight of the sorbent to increase from point B to point C due to the carbonation and sulfation reactions. At the end of the 5-minute reaction time, gas flow is switched back to N2 to effect the decomposition of the CaCO3 formed due to carbonation in the first reaction cycle causing the weight to drop from point C to point D. In contrast to CaCO3 decomposition, CaSO4 formed in the first reaction step remains intact. The extent of carbonation is calculated from the weight loss during the calcination step C to D, and the extent of sulfation can be estimated based on the difference between the weight at point D and that at the starting point B. Similarly, points D-E-F represent the $2^{nd}$ cycle and so forth. The trend observed from B to C to D is seen in every cycle in each experiment. The details of the conversion calculations are reported elsewhere (Iver et al. 2004).

Carbonation and sulfation occur as heterogeneous non-catalytic gas solid reactions. Higher concentration of CO2 (10% or 100,000 ppm) compared to SO2 (3000 ppm) could result in a higher conversion towards the carbonation reaction. However, the higher free energy change associated with the sulfation reaction thermodynamically favors it over the carbonation reaction. The process conditions employed can have a significant impact on the relative rates of these two reactions. The data obtained in all experiments has been presented in the form Xco2, XS02 and the ratio of carbonation to sulfation, R (Xco2/Xso2) as a function of reaction residence time Effect of Residence Time FIGS. 4-6 show the data obtained on the extent of carbonation and sulfation as a result of simultaneous exposure of PCC-CaO to a gas mixture containing 10% C02, 3000 ppm S02 and 4% 02. X-ray diffraction analysis of the reacted sorbent revealed the presence of CaSO4, CaCO3 and CaO only. In the first cycle, XCO2 far exceeds the extent of sulfation (Xso2) during the initial part of the reaction, thereby establishing the viability of a CCR process for CO2 separation even in the presence of SO2. XCO2, which increased monotonically in the 0-10 minute range, started to fall due to the direct sulfation of the CaCO3 formed, consequently leading to a higher XS02 From thermodynamic analysis presented earlier, it is clear that SO2 concentration greater than 5.72 ppt will lead to direct sulfation at 700° C. In fact, XS02 attained under simultaneous exposure to CO2 and SO2 is higher than the X502 obtained by either the pure sulfation of CaO or the direct sulfation of CaCO3 reaction, which are the only possible routes for sulfation. This indicates that the nascent CaCO3, formed due to the parallel carbonation reaction, has a higher reactivity for SO2 than the CaCO3, which forms a part of the stable crystal structure that characterizes the original PCC. After 10 minutes, XC02 starts dropping, but it continues to be higher than Xs02 until it reaches 40 minutes. Beyond 40 minutes, XCO2 starts dropping even below XSO2 due to continued direct sulfation.

FIGS. 4 and 5 depict the effect of residence time over three CCR cycles on XCO2 and Xso2, respectively. PCC-CaO attains a maximum XCO2 of −50 wt % at 10 minute residence time. The data in FIGS. 4 and 5 show that XCO2 and XS02 decrease with increasing number of cycles for any residence time due to the formation of CaSO4 which reduces the availability of CaO in the subsequent cycle. The primary reason for this observation is the fact that there is a loss in the free CaO due to the formation of non-regenerable CaSO4. FIG. 5 shows that X502 remains virtually the same in each of the three cycles until a residence time of 10 minutes. In contrast, Xco2 shows a significant loss in reactivity over each subsequent cycle in the same duration. For a residence time of 60 minutes, XCO2, which was only 22.5% in the first cycle, reduced to almost zero in the second cycle, indicating a high extent of the direct sulfation reaction. In fact, the sorbent is completely spent at the end of the second cycle that it shows no reactivity to either gas in the third cycle. The overall XS02 for PCC-CaO at the end of three cycles was 88.2%

FIG. 6 illustrates the ratio R obtained from XCO2 and XS02 attained during simultaneous carbonation and sulfation. From FIG. 6, we can observe that the magnitude of R is smaller than that derived from the "individual" reactions and it shifts to 5 minutes instead of 8 minutes seen earlier. This is probably due to the fact that the rate of sulfation is enhanced due to the simultaneous sulfation of CaO and the higher reactivity of nascent CaCO3 as explained earlier. From FIG. 6, it is evident that the maximum in the ratio occurs at a reaction time of about 5 min for all the three cycles. The magnitude of the ratio falls with each subsequent cycle and longer residence time. This is due to the direct sulfation of the calcium carbonate product of carbonation reducing the XC02, increasing the Xs02, and thereby dropping the ratio.

Effect of S02 Concentration

FIGS. 7 and 8 below show the extent of carbonation and sulfation respectively on PCC-CaO at 700° C. with varying $SO_2$ concentration from 100-3000 ppm over multiple cycles. It is evident from the plots that the carbonation conversions decrease with increasing cycles and SO2 concentrations. The effect of sulfation is very drastic for 3000 ppm and not so severe with 100-300 ppm range. The extent of sulfation is also low in this range as can be observed from FIG. 8. FIG. 9 shows the ratio "R" for increasing CCR cycles with SO2 concentrations varying from 3000 to 100 ppm. It is evident from the plots that for each SO2 concentration curve there exists a maximum in the ratio, which depends on the residence time in the system. The ratio is maximum at 160 for a SO2 concentration of 100 ppm while it monotonically decreases and reaches a meager value of 5 for 3000 ppm SO2 as seen earlier.

Effect of Temperature

Figure 11:
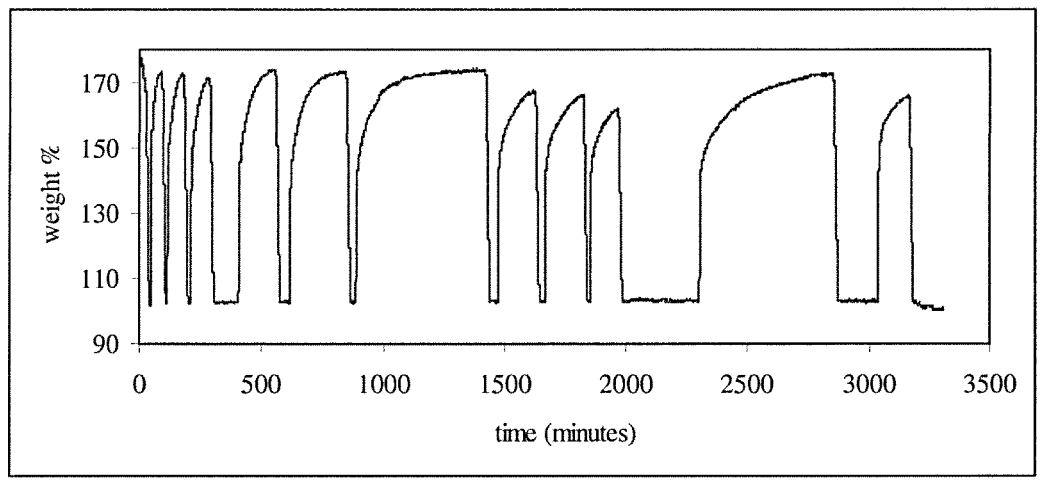
FIG. 11 shows extended carbonation-calcination cycles on precipitated calcium carbonate (PCC) powder at 700° C.

FIGS. 10-12 depict the effect of reaction temperature (500-700° C.) on the ratio of carbonation to sulfation (R=XCO2/XSO2), the extent of carbonation (XCO2) and the extent of sulfation (Xso2) for increasing residence times (0-30 min). The simultaneous experiments were conducted for a 3000 ppm SO2, 10% CO2 and 4% 02 stream. As observed in FIG. 10, the ratio (R) decreases with increasing residence time for all reaction temperatures (except for 700° C.). This is due to the onset of direct sulfation of CaCO3 product. It is interesting to note that for any given residence time the ratio for 650° C. is the highest, which is followed by 600° C. and subsequently by the values at 700° C. (except at 2 min). The R values at 700° C. are lower than that obtained at temperatures of both 600 and 650° C. as sulfation starts to dominate at higher temperatures and the kinetics between these two competing carbonation and sulfation reactions start to play a significant role in determining their ratios. Thus, 650° C. seems to be the optimal temperature to operate with minimal sulfation effects for a 3000 ppm SO2 and 10% CO2 stream.

Similarly, the optimal temperature for streams with varying SO2 concentrations (3000-100 ppm) needs to be identified.

At 650° C., the ratio starts with a value of 15 for a residence time (RT) of 2 min and subsequently starts to monotonically decrease to about 9 for 5 min, 5 for 10 min and finally 2 for 30 min. As illustrated in FIG. 11, the corresponding XCO2 is 34% for 2 min, which peaks to 45% at 20 min with a ratio of only 3. It is evident that the extent of carbonation is the highest for the temperature of 650° C. for any residence time. The only exception is the XC02 of 52% at 700° C. for a 10 min residence time. However the R corresponding to this point is around 3. Hence, 650° C. is still the preferred temperature of operation with optimal residence times of 2-5 min giving XCO2 of 34-40% with corresponding ratios of 15-9 respectively. Thus, working at the optimum temperature where R as well as XCo2 is the highest can maximize the overall CO2 capture capacity with minimal SO2 effect.

A pilot scale plant, that integrates the CCR process with an actual coal fired combustor will be designed, installed and operated as part of this pilot demonstration. B&W stoker boiler will be used in this process. A schematic of the process flow diagram is shown in FIG. II.C-1. Please note that the process flow diagram could be altered based on future process modifications. It consists of a coal combustion unit that generates actual flue gas. The flue gas is then lowered in its S02 content by the injection of PCC. This FSI mode of sulfur capture has been investigated in an earlier OCDO-OSU sponsored OSCAR project. Results from that project will be factored in to use an optimal Ca/S ratio for SO2 control. The optimum temperature for PCC injection is about 800 1000° C. The entrained fly ash and partially sulfated solids (containing CaSO4 and unreacted CaO) are then physically removed from the flue gas through the use of a cyclone. The use of a single cyclone effectively separates >99% of all solids. This solid mixture is then safely disposed.

The solids depleted flue gas is then subjected to CO2 removal. This is accomplished by injecting hot CaO powder through nozzles. The CaO injection would occur in the 550-700° C. temperature range. The carbonator reaction, like sulfation, is extremely fast, with the majority of reactions occurring in less than one second. This translates to an approximately 1.4 m long flue gas duct requirement under the process conditions assuming a residence time of 1 second. The current equipment under consideration provides ample opportunity for this residence time. The carbonation reaction releases tremendous quantity of heat causing a significant increase in flue gas temperature. However, adequate heat extraction surface would be provided and the actual heat transferred would be accurately quantified. This is one of the main outcomes of this project.

The carbonated sorbent is removed from the flue gas by an identical cyclone, downstream of the carbonation reactor. Attempts would be made to maintain the flue gas flowing between the two cyclones under isothermal conditions. This will be achieved by providing adequate heat transfer extraction to absorb the heat liberated during carbonation. Hence the flue gas temperature at both cyclones would be the same. This is advantageous as identical design can be used for the two cyclones. The use of identical cyclones enhances reliability of the CCR process and reduces design and testing costs associated with cyclones. The flue gas leaving the second "carbonation" cyclone is cooled and sent through another lower temperature particle capture device (PCD) and finally vented out of the building.

The carbonated hot solids are then sent to the calciner, which provides the heat required to raise the temperature of the solids to 770-830° C. and calcine the carbonated portion of the solids. Prior laboratory data indicates that the calcination under sub-atmospheric conditions aids in maintaining a higher porosity CaO sorbent, which also exhibits higher reactivity. A water ejector will generate vacuum for the calcination. The water flowing through the throat of the eductor causes the absolute pressure to fall, allowing the suction of C02 out of the calciner. The two-phase fluid is then sent to a knockout drum, where water is separated from the "separated" C02. The water stored in the knockout drum is continuously recycled through the water pump for continuous vacuum building.

CONCLUSIONS

The enhanced water gas shift reaction for $H_2$ production with in-situ carbonation was studied at 600° C. using HTS catalyst and calcium sorbents. A naturally occurring calcium precursor (Linwood hydrate, LH) and a modified mesoporous Precipitated Calcium Carbonate (PCC) were used for capturing $CO_2$ for two successive cycles. The PCC system gives almost 100% conversion for first 4 min followed by 90% at 16.5 min. In contrast, the LH sorbent system sustains 100% conversion only in the initial few seconds and gradually gives about 90% CO conversion at 15 min. Experimental evidence clearly shows that the PCC-CaO performance dominates over that of LH-CaO at any given time.

While the invention has been described in connection with what is presently considered to be the most practical and preferred embodiments, it is to be understood that the invention is not to be limited to the disclosed embodiment(s), but on the contrary, is intended to cover various modifications and equivalent arrangements included within the spirit and scope of the appended claims, which are incorporated herein by reference.

What is claimed is:

1. A facility separating carbon dioxide and sulfur dioxide from a flow of gas comprising carbon dioxide and sulfur dioxide, comprising:
    a gas-solid contact reactor receiving said flow of gas;
    a sorbent within said gas-solid reactor, comprising a metal oxide, said sorbent reacting with said carbon dioxide and said sulfur dioxide so as to convert at least a portion of said sorbent to a metal carbonate and at least a portion of said sorbent to a metal sulfate; and
    a calcinator, said calcinator receiving said at least a portion of said metal carbonate, said calcinatory calcining said metal carbonate to form said metal oxide and carbon dioxide,
    wherein said sorbent is replenished in said gas-solid reactor with said metal oxide formed in said calcinatory.

2. The facility of claim 1, further comprising a cyclone, said cyclone separating said metal carbonate from said flow of gas.

3. The facility of claim 1, wherein said gas-solid reactor is operated at between about 600° to about 650° Celsius to facilitate the reaction between said carbon dioxide and said sulfur dioxide with said sorbent.

4. The facility of claim 1, further comprising an apparatus to sequester said carbon dioxide formed is said calcinatory.

5. The facility of claim 1, wherein said metal oxide is calcium oxide that has a surface area of less than 22 $m^2$/g, a pore volume of at least 0.005 $cm^3$/g, and a mesoporous pore size distribution.

6. The facility of claim 1, wherein said calcinator is under at least a partial vacuum when said metal carbonate is calcined.

7. The facility of claim 1, wherein steam is used to calcine said metal carbonate in said calcinator.

8. The facility of claim 1, wherein metal oxide is selected from the group consisting of: ZnO, MgO, $MnO_2$, NiO, CuO, PbO, and CaO.

9. The facility of claim 1, wherein said sorbent has a sorption capacity of at least about 70 grams of carbon dioxide per kilogram of sorbent.

10. The facility of claim 1, wherein said sorbent has a sorption capacity of at least about 300 grams of carbon dioxide per kilogram of sorbent.

11. The facility of claim 1, wherein said sorbent has substantially the same sorption capacity after calcining as said sorbent had prior to absorbing said carbon dioxide.

12. The facility of claim 1, wherein said calcinator is operated at temperatures in the range of from about 800° to about 850° Celsius to calcine said metal carbonate.

* * * * *